(12) United States Patent
Schmidt et al.

(10) Patent No.: US 10,892,607 B2
(45) Date of Patent: Jan. 12, 2021

(54) CABLE PULLER HAVING DUAL CAPSTANS

(71) Applicant: Greenlee Tools, Inc., Rockford, IL (US)

(72) Inventors: James Donald Schmidt, Rockford, IL (US); Matt Stephen Hayes, Rockford, IL (US); Gerald Jonathan Tully, Hampshire, IL (US); Avery Paul Rosenbloom, Loves Park, IL (US)

(73) Assignee: GREENLEE TOOLS, INC., Rockford, IL (US)

( * ) Notice: Subject to any disclaimer, the term of this patent is extended or adjusted under 35 U.S.C. 154(b) by 296 days.

(21) Appl. No.: 15/406,193

(22) Filed: Jan. 13, 2017

(65) Prior Publication Data

US 2018/0191141 A1    Jul. 5, 2018

Related U.S. Application Data

(60) Provisional application No. 62/440,675, filed on Dec. 30, 2016.

(51) Int. Cl.
*H02G 1/08* (2006.01)
*H02G 1/06* (2006.01)

(52) U.S. Cl.
CPC ............... *H02G 1/085* (2013.01); *H02G 1/06* (2013.01); *H02G 1/08* (2013.01)

(58) Field of Classification Search
CPC ......... F16L 55/1658; H02G 1/06; H02G 1/08; H02G 1/085
USPC ........................................ 254/280, 134.3 FT
See application file for complete search history.

(56) References Cited

U.S. PATENT DOCUMENTS

| | | | |
|---|---|---|---|
| 3,224,733 A | 12/1965 | Ensley | |
| 4,456,225 A * | 6/1984 | Lucas | H02G 9/10 254/134.3 FT |
| 4,555,093 A * | 11/1985 | Plummer | B66D 1/7447 254/275 |
| D307,965 S | 5/1990 | Eley et al. | |
| 7,070,168 B2 * | 7/2006 | Plummer | B66D 1/28 254/134.3 FT |
| 7,216,848 B2 * | 5/2007 | Plummer | H02G 1/08 254/134.3 FT |
| 7,384,023 B2 * | 6/2008 | Plummer | B66D 1/7447 254/134.3 FT |
| 7,661,655 B2 * | 2/2010 | Tjader | F16L 55/1658 254/280 |
| 8,246,009 B2 | 8/2012 | Plummer | |

(Continued)

OTHER PUBLICATIONS

Cannon 6K (TM) Cable Puller; Product No. C6K; iToolco, LLC; Oak Ridge, TN, 2016, http://itoolco.com/products/cannon-6k.

(Continued)

*Primary Examiner* — Orlando E Aviles
*Assistant Examiner* — Seahee Hong
(74) *Attorney, Agent, or Firm* — Klintworth & Rozenblat IP LLP

(57) ABSTRACT

A cable puller in accordance with some example embodiments is configured to pull rope or cable through a conduit. The cable puller includes a puller frame having a first side and a second opposite side, first and second capstans rotatably mounted on the frame, and a motor operatively coupled to the first and second capstans and configured to rotate the first and second capstans. The first and second capstans extend outwardly from the same side of the frame.

20 Claims, 69 Drawing Sheets

(56) References Cited

U.S. PATENT DOCUMENTS

| | | | |
|---|---|---|---|
| 9,172,224 B2 | 10/2015 | Jordan et al. | |
| 2007/0221896 A1* | 9/2007 | Jordan | H02G 1/08 254/134.3 FT |
| 2009/0039193 A1* | 2/2009 | Plummer | B66D 1/36 242/407 |
| 2009/0078921 A1* | 3/2009 | Plummer | H02G 1/08 254/134.3 FT |

OTHER PUBLICATIONS

Maxis (R) 6K Cable Puller, M6KM, Southwire (TM) Tools & Equipment, 2015, http://www.southwiretools.com/tools/file.get.do?file_id=423.

\* cited by examiner

CABLE PULLER HAVING DUAL CAPSTANS

This application claims priority to U.S. provisional application Ser. No. 62/440,675, filed on Dec. 30, 2016, the contents of which are incorporated herein in its entirety.

FIELD OF THE DISCLOSURE

The present disclosure relates to a cable puller having dual capstans which reduces the amount of time necessary to complete a cable pull.

BACKGROUND

Cable pulling is a commonly used technique whereby a pulling rope is attached to a cable or wire that is to be pulled through conduit by a cable puller. The pulling rope is wound by a user around a capstan of the cable puller and tails off the capstan. The capstan is powered by a motor and acts as a frictional force multiplier. The motor and capstan are usually referred to as being part of the puller head of the cable puller. Use of the cable puller to pull the cable through the conduit allows the user to exert only a small force on the rope that tails off of the capstan. This relatively small force is translated into a large force of several thousand pounds which is exerted on the incoming pulling rope and which provides enough force on the pulling rope and the cable to pull them through the conduit.

SUMMARY

A cable puller in accordance with some example embodiments is configured to pull rope or cable through a conduit. The cable puller includes a puller frame having a first side and a second opposite side, first and second capstans rotatably mounted on the frame, and a motor operatively coupled to the first and second capstans and configured to rotate the first and second capstans. The first and second capstans extend outwardly from the same side of the frame.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which.

DETAILED DESCRIPTION

Figure 1:
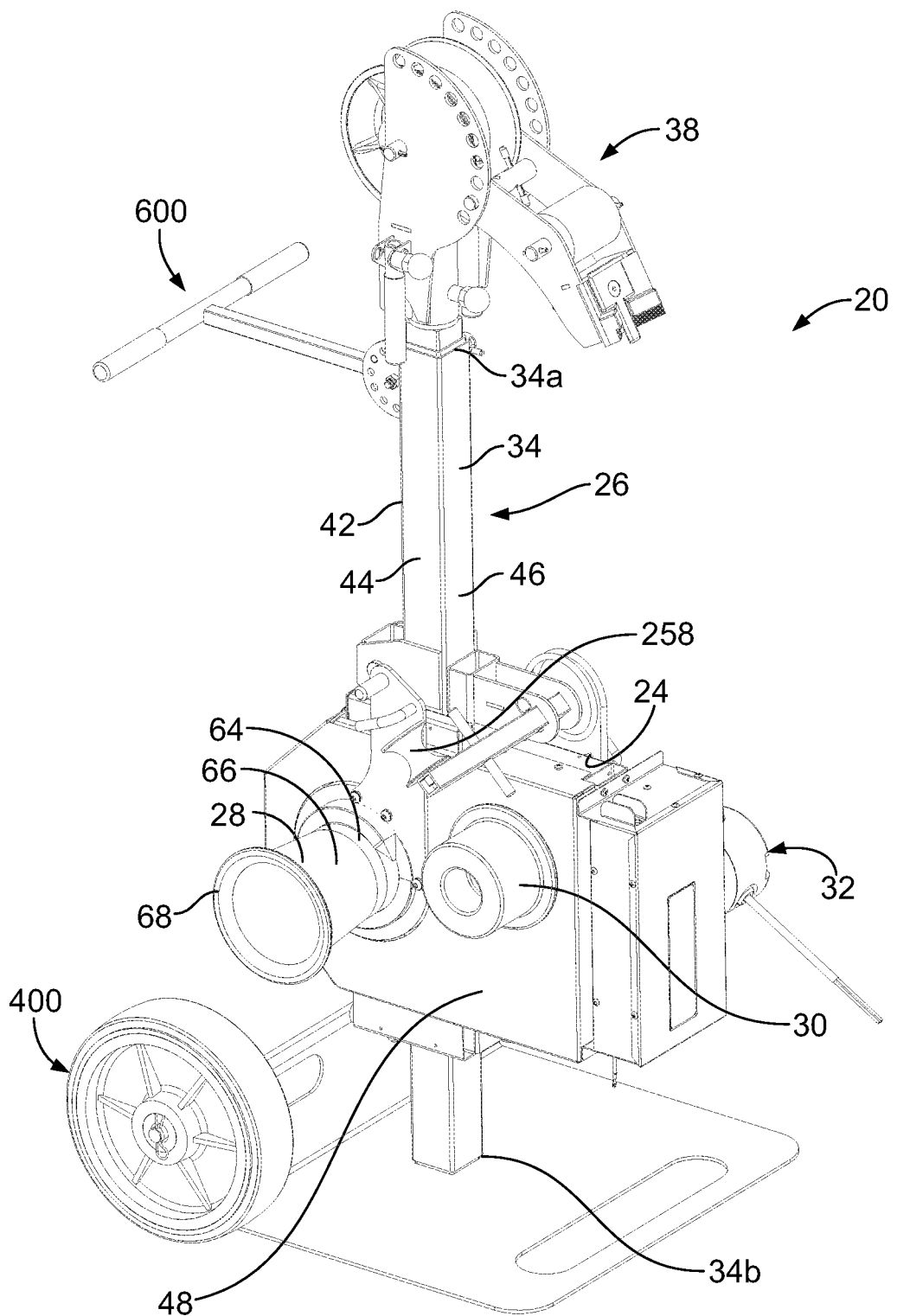
FIG. 1 is a perspective view of a cable puller, a boom, an attachment system and a wheel assembly in accordance with some example embodiments of the present disclosure.
Figure 2:
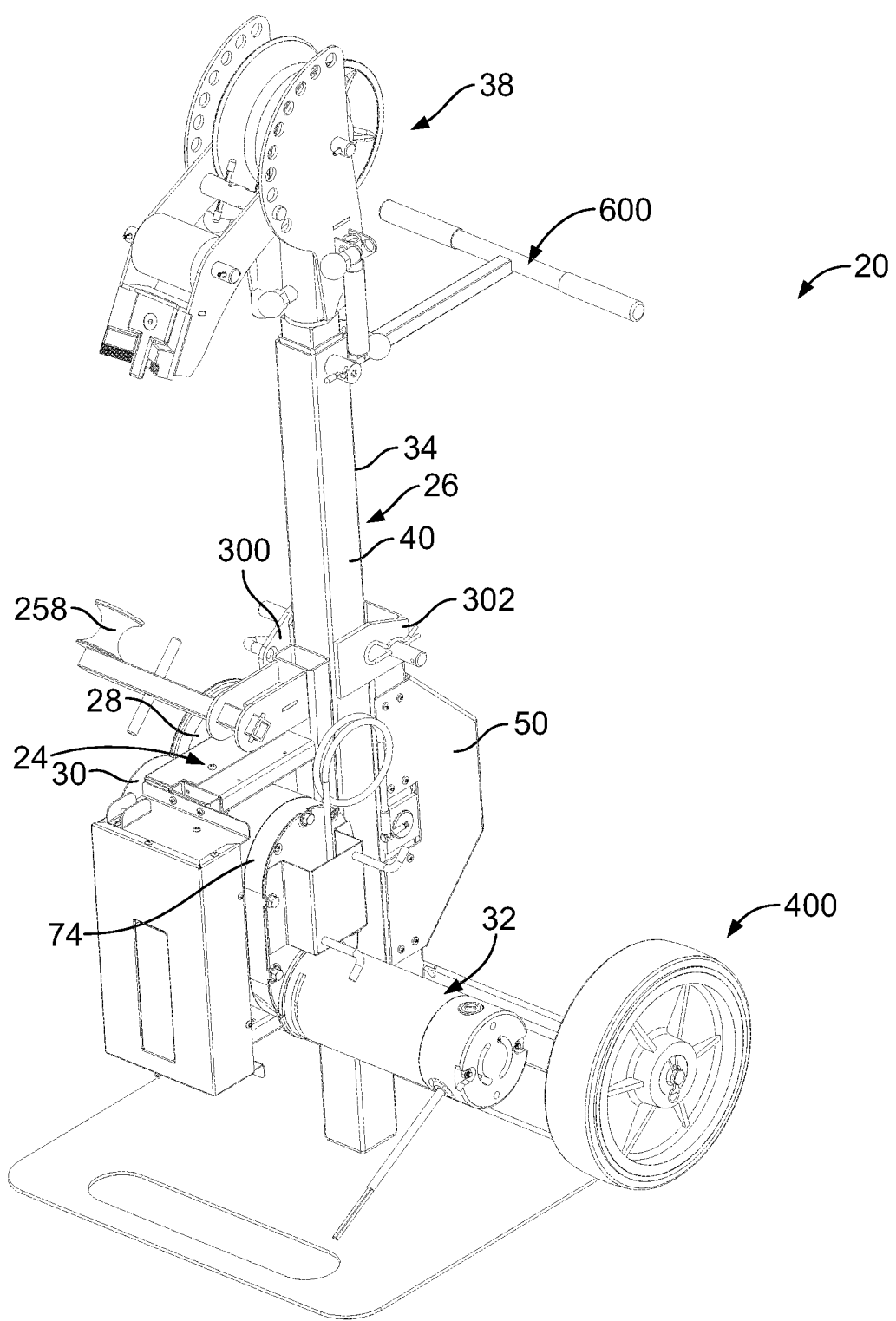
FIG. 2 is an alternate perspective view of the cable puller, the boom, the attachment system and the wheel assembly.
Figure 3:
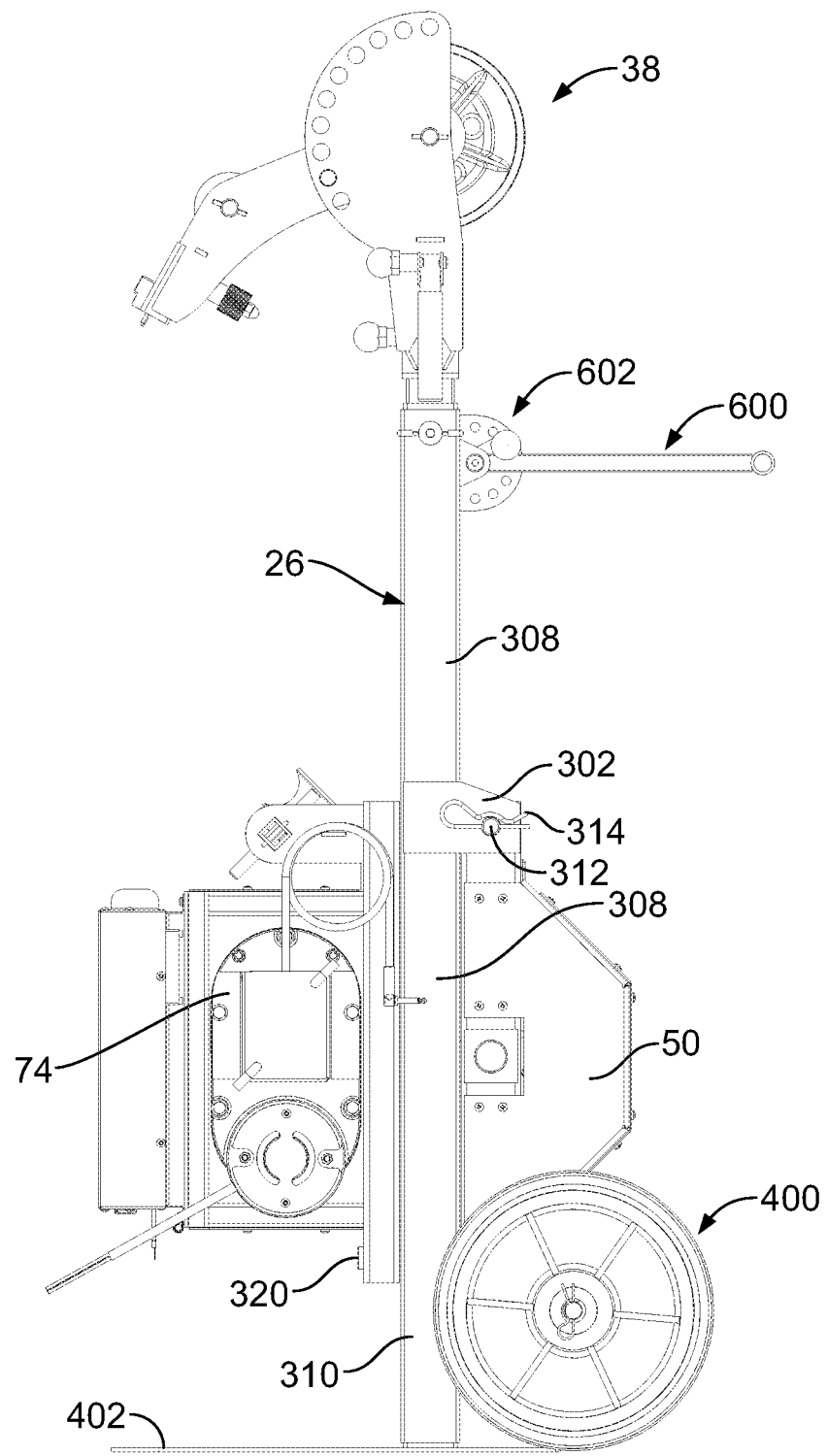
FIG. 3 is a side elevation view of the cable puller, the boom, the attachment system and the wheel assembly.

While the disclosure may be susceptible to embodiment in different forms, there is shown in the drawings, and herein will be described in detail, a specific embodiment with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

A cable puller 20 is provided to pull a pulling rope and/or cable 22 attached to a cable or wire through conduit 23. In an embodiment, the cable puller 20 is mounted on the floor or ground 25.

Dual Capstan Cable Puller

The cable puller 20 of some embodiments includes a puller frame 24, first and second capstans 28, 30 provided on the puller frame 24, and a driving assembly 32 mounted on the puller frame 24 for driving the capstans 28, 30. In use, a free end of the boom 26 is positioned adjacent an end of a conduit 23 through which a length of pulling rope and/or cable 22 is desired to be pulled. A segment of the length of the pulling rope and/or cable 22 is routed over the free end of the boom 26, along the length of the boom 26 and is wrapped about one of the capstans 28, 30. Upon rotation of the capstans 28, 30 by the driving assembly 32, the length of pulling rope and/or cable 22 is pulled through the conduit 23 and toward the capstan 28, 30.

Figure 4:
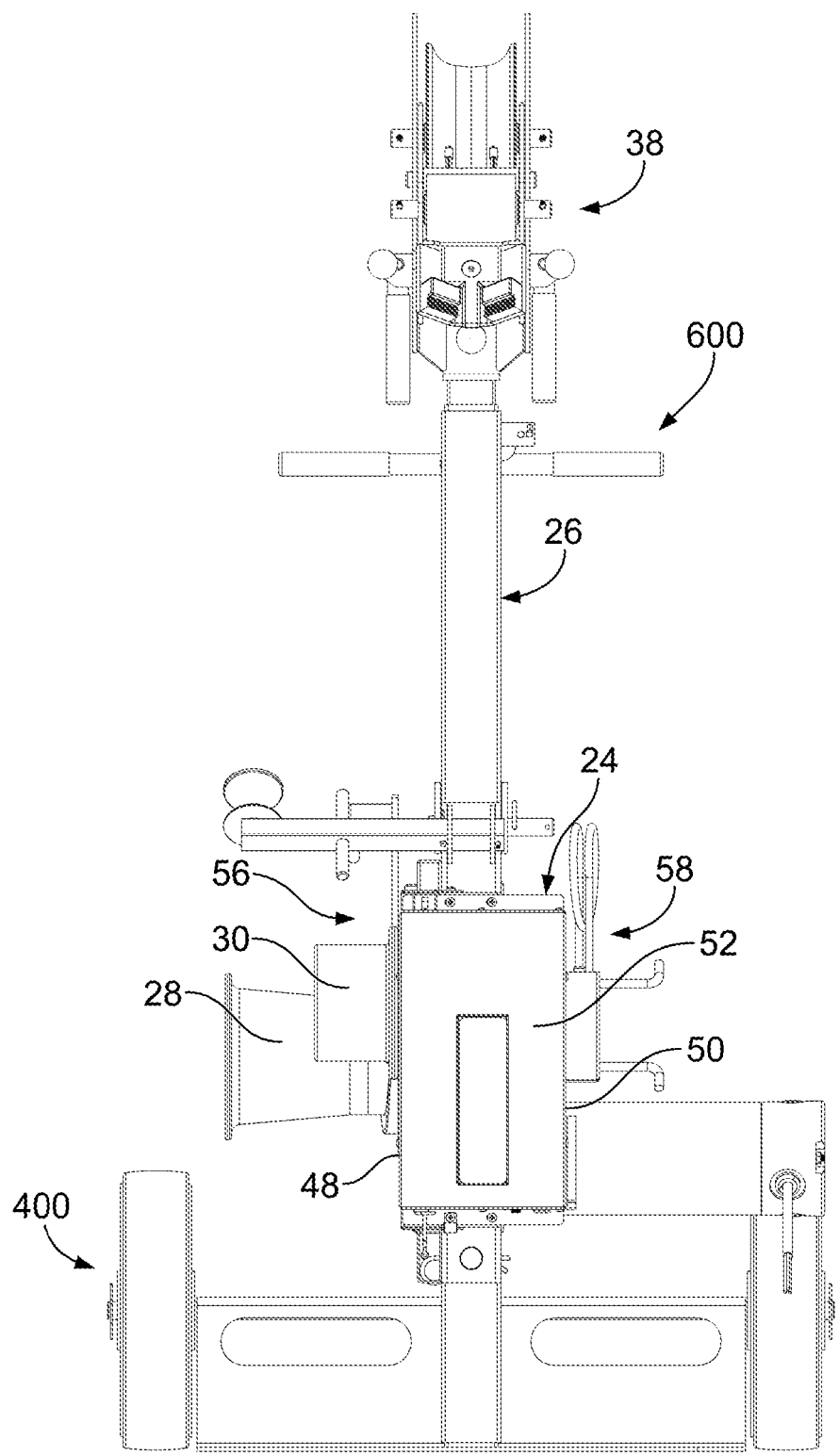
FIG. 4 is a front elevation view of the cable puller, the boom, the attachment system and the wheel assembly.
Figure 5:
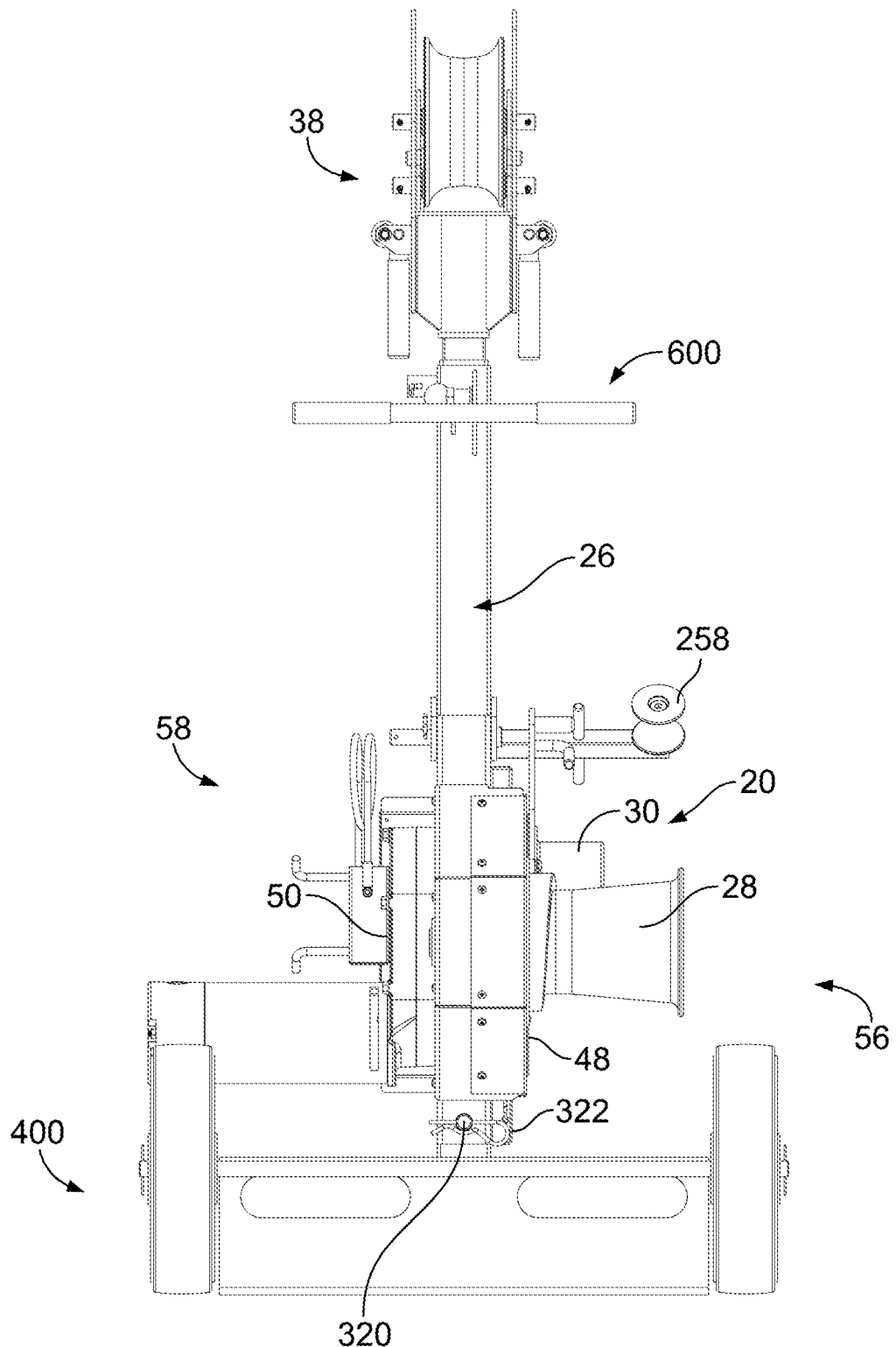
FIG. 5 is a rear elevation view of the cable puller, the boom, the attachment system and the wheel assembly.

The puller frame 24 has a first upright wall 48, a second upright wall 50 and side walls 52 extending between the upright walls 48, 50 to which form a cavity 54 therebetween. As shown in FIGS. 4 and 5, the first wall 48 defines a first side 56 of the puller frame 24 and the second wall 50 defines a second side 58 of the puller frame 24. A shaft 60 is provided on the second wall 50 and extends through an aperture 62 provided through the first wall 48. In an embodiment, the shaft 60 is non-rotatably affixed to the second wall 50. In an embodiment, the shaft 60 is rotatably attached to the second wall 50.

Figure 13:
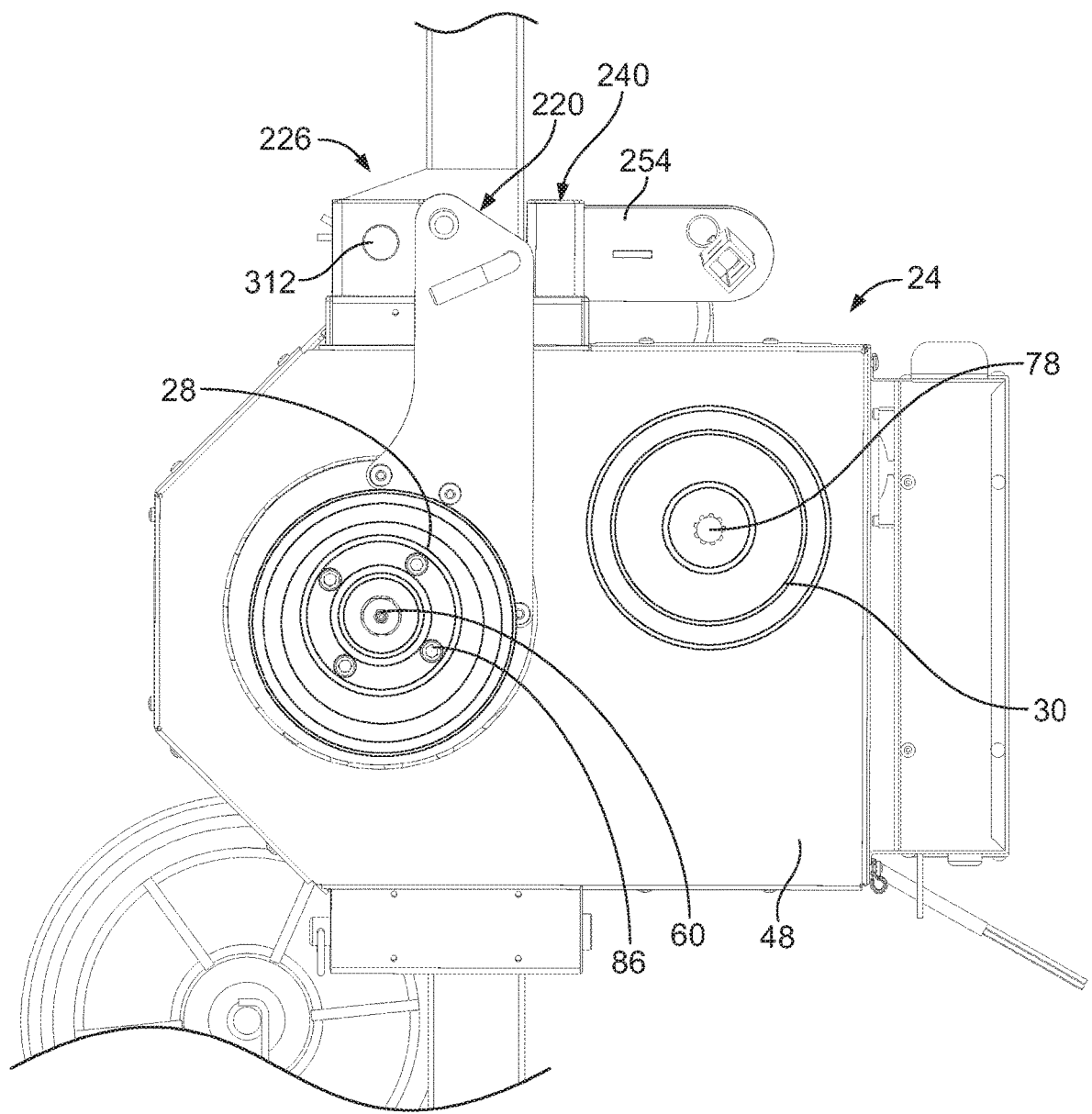
FIG. 13 is a side elevation view of the puller frame, the capstans and the drive assembly of the cable puller.
Figure 21:
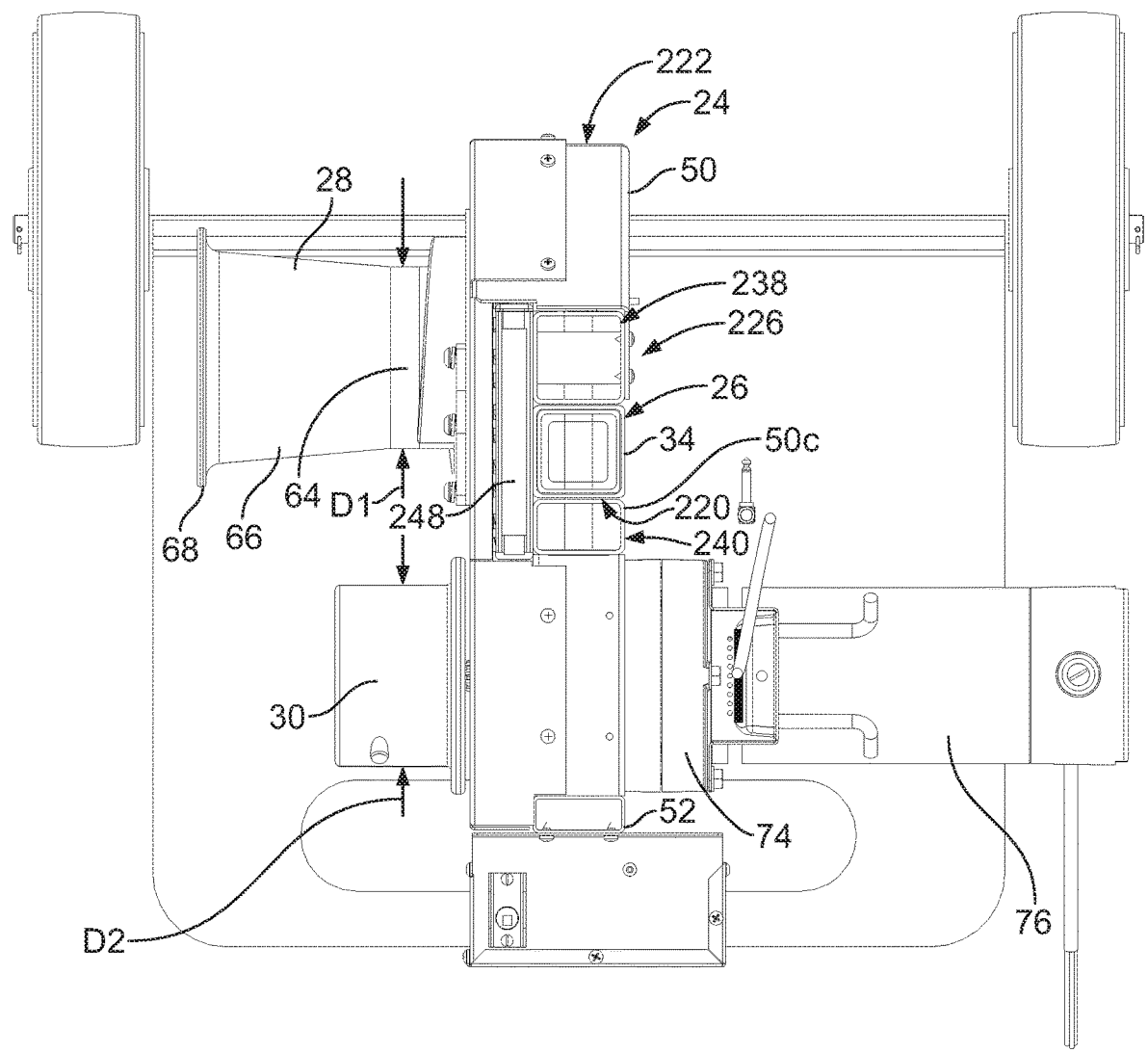
FIG. 21 is a cross-sectional view of the cable puller, the boom, the attachment system and the wheel assembly showing a pocket formed by the puller frame.
Figure 27:
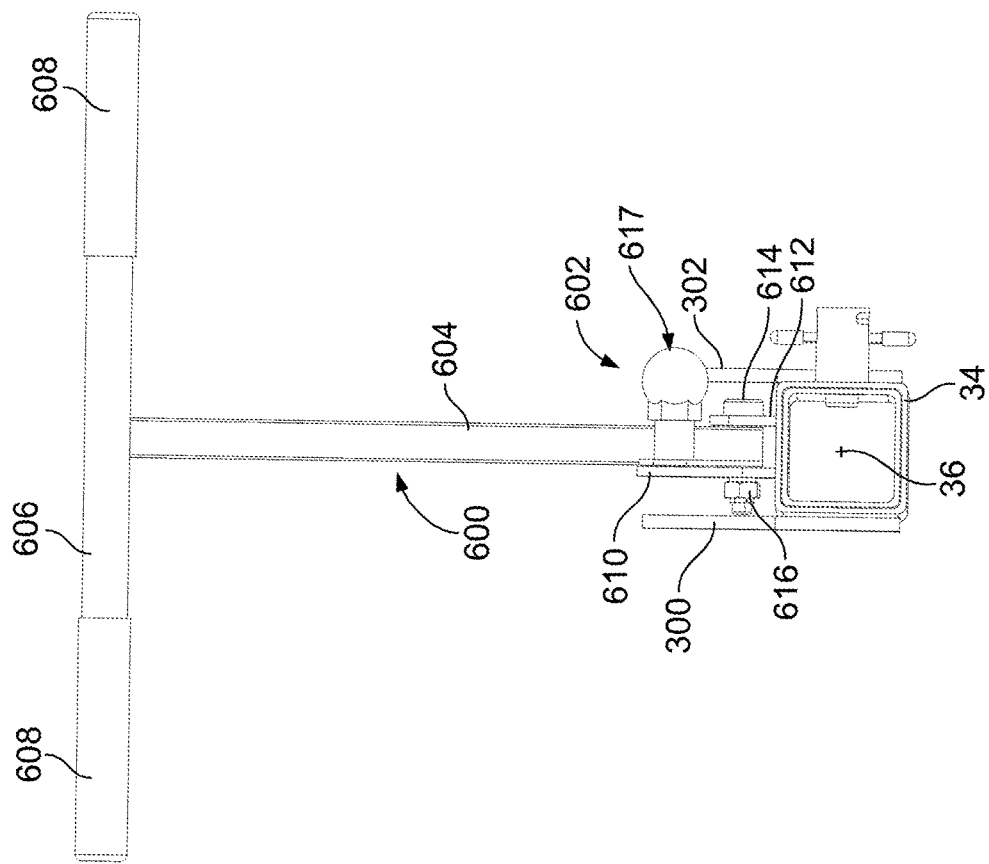
FIG. 27 is a top plan view of the boom of FIG. 22.
Figure 22:
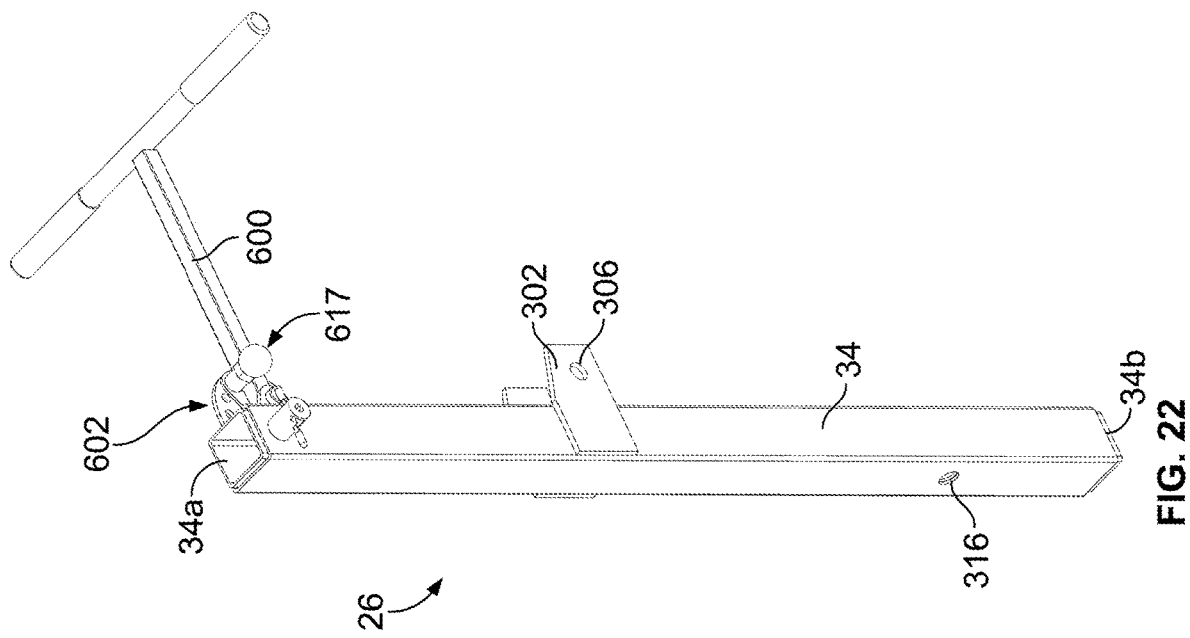
FIG. 22 is a perspective view of an embodiment of the boom.
Figure 23:
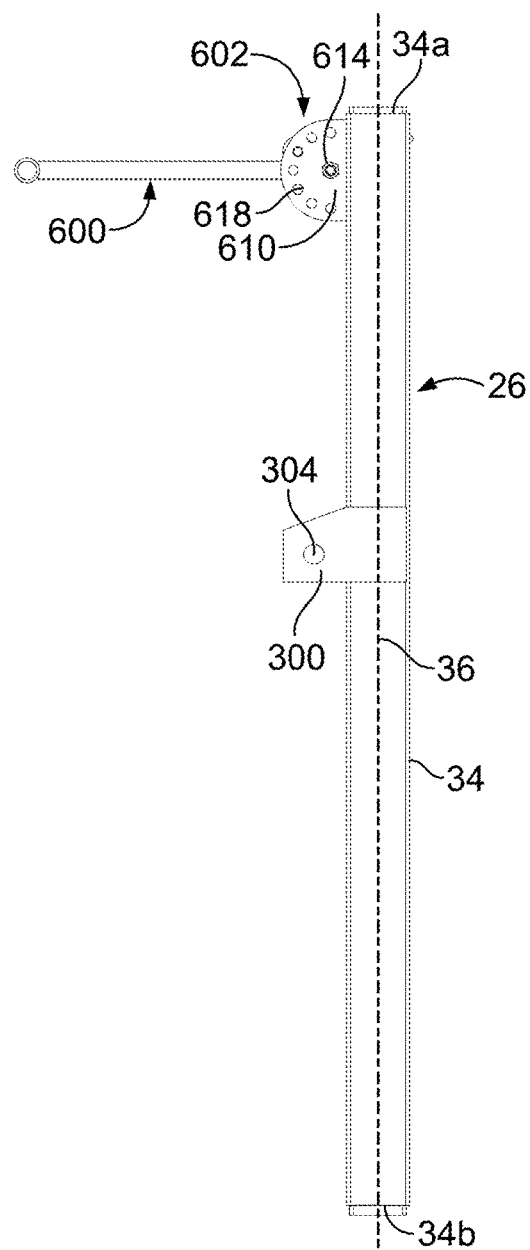
FIG. 23 is a first side elevation view of the boom of FIG. 22.
Figure 24:
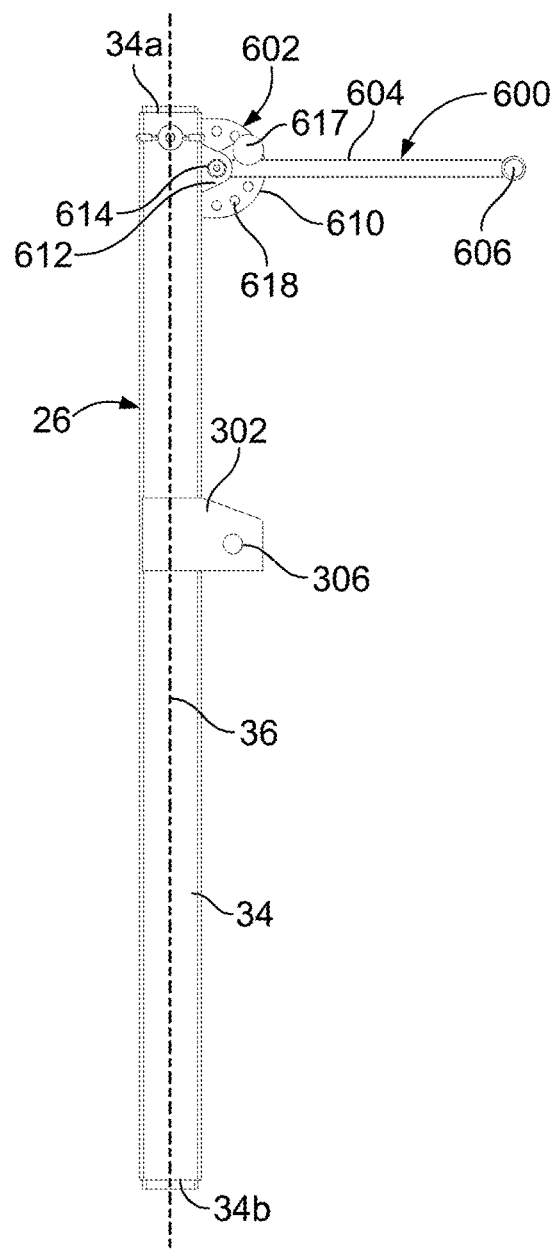
FIG. 24 is a second side elevation view of the boom of FIG. 22.
Figure 25:
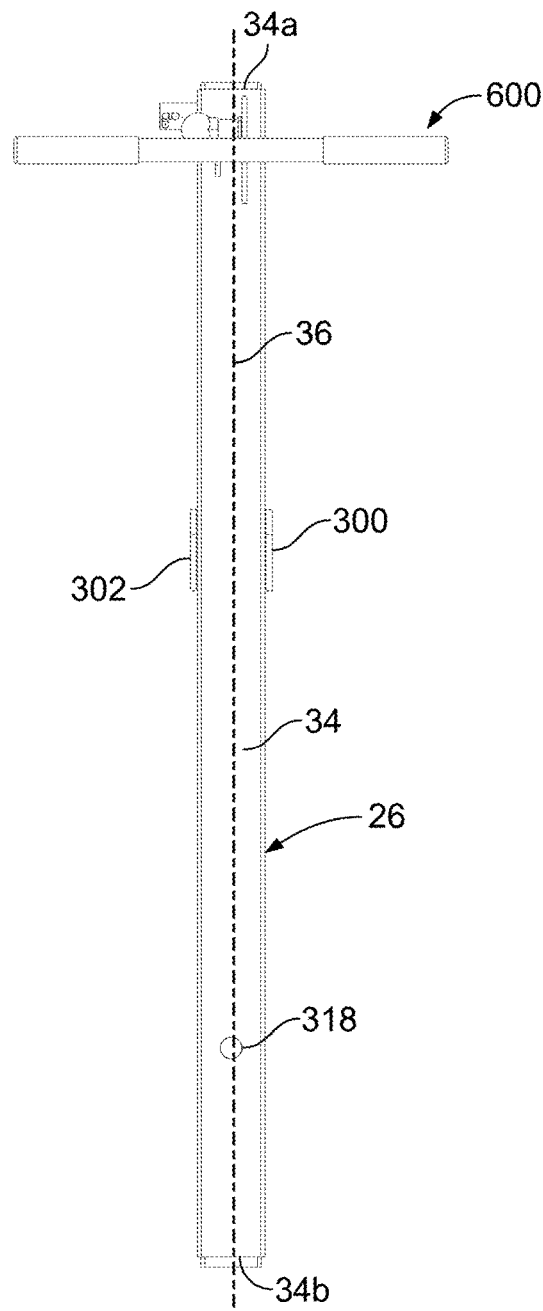
FIG. 25 is a front elevation view of the boom of FIG. 22.
Figure 26:
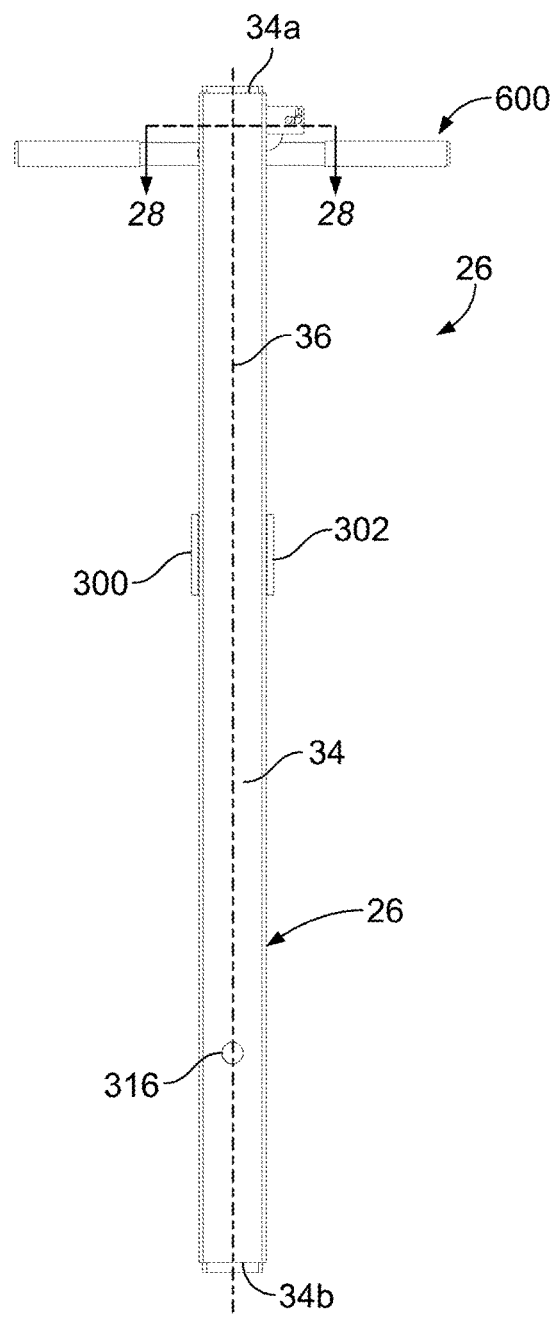
FIG. 26 is a rear elevation view of the boom of FIG. 22.

In an embodiment, as shown in FIGS. 1, 13 and 21, the capstan 28 has a first portion 64 which has a cylindrical outer surface, a second portion 66 extending from the first portion 64 and which has a conical outer surface, and a flange 68 extending outwardly from the end of the second portion 66. The capstan 28 defines a rotational axis which is substantially parallel to the underlying floor or ground 25 upon which the cable puller 20 rests. A diameter D1 of the capstan 28 is defined along the cylindrical first portion 64. The capstan 28 is rotatably mounted on the shaft 60.

In an embodiment, the capstan 30 has a cylindrical outer surface which defines a diameter D2. The capstan 30 defines a rotational axis which is substantially parallel to the rotational axis of the first capstan 28 and which is substantially parallel to the underlying floor or ground 25 upon which the cable puller 20 rests.

The capstans 28, 30 are provided on the first side 56 of the puller frame 24 and are spaced apart from each other; that is, both capstans 28, 30 extend outwardly from the first side 56 of the cable puller 20 in the same direction. The capstan 28 is used to pull at higher loads, and the capstan 30 is used to pull at lower loads. As a non-limiting example, such a load pulled by capstan 28 would be three times more than the load pulled by capstan 30. The boom 26 is provided on the second side 58 of the puller frame 24.

A pair of aligned apertures 70, 72 are provided through the first and second walls 48, 50 and are spaced apart from the aperture 62. In an embodiment, the centerline 62a of the aperture 62 is positioned further from a top end 24a of the puller frame 24 than the centerline 70a of the aperture 70.

Figure 12:
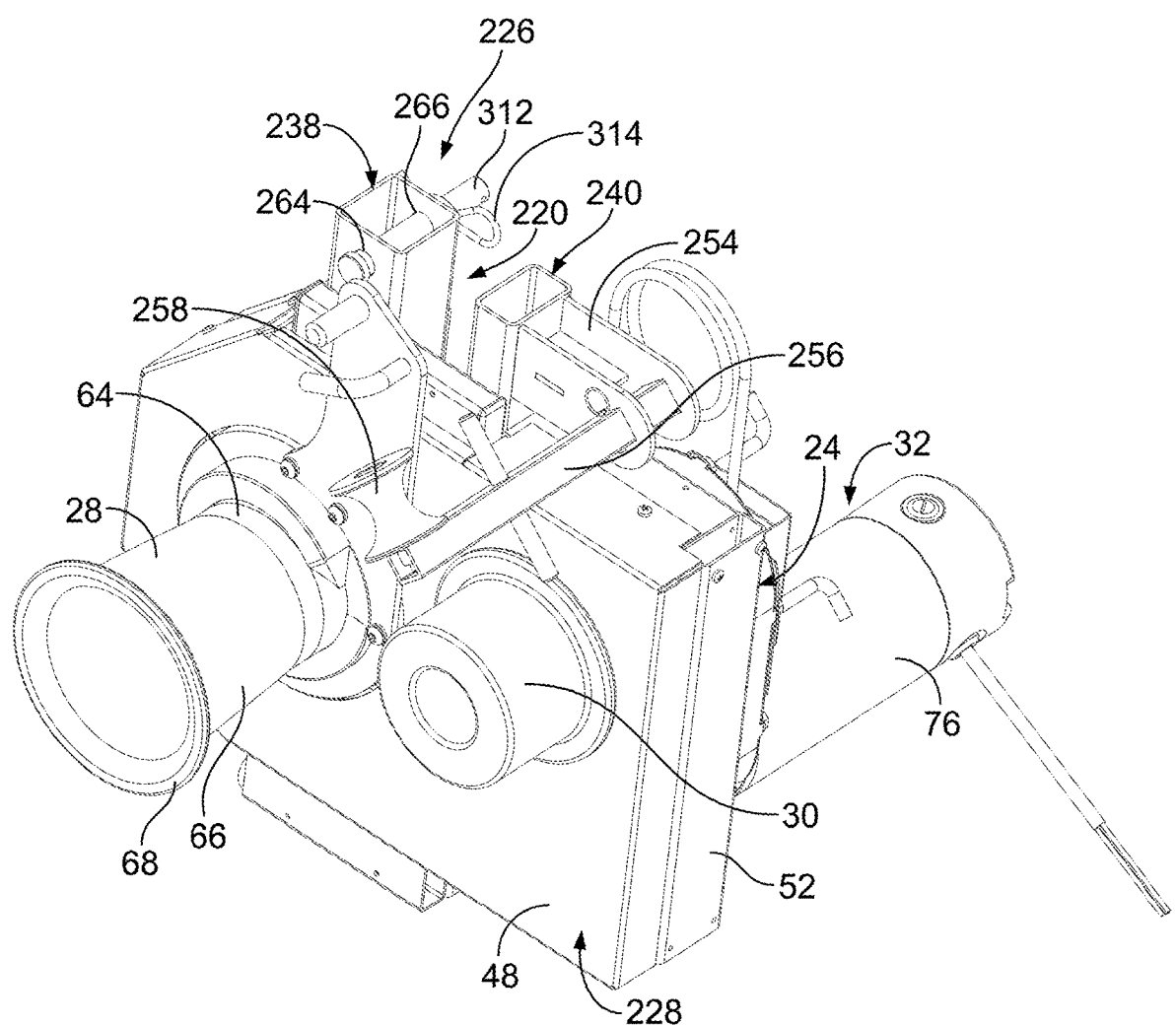
FIG. 12 is a perspective view of a puller frame, capstans and a drive assembly of the cable puller.
Figure 14:
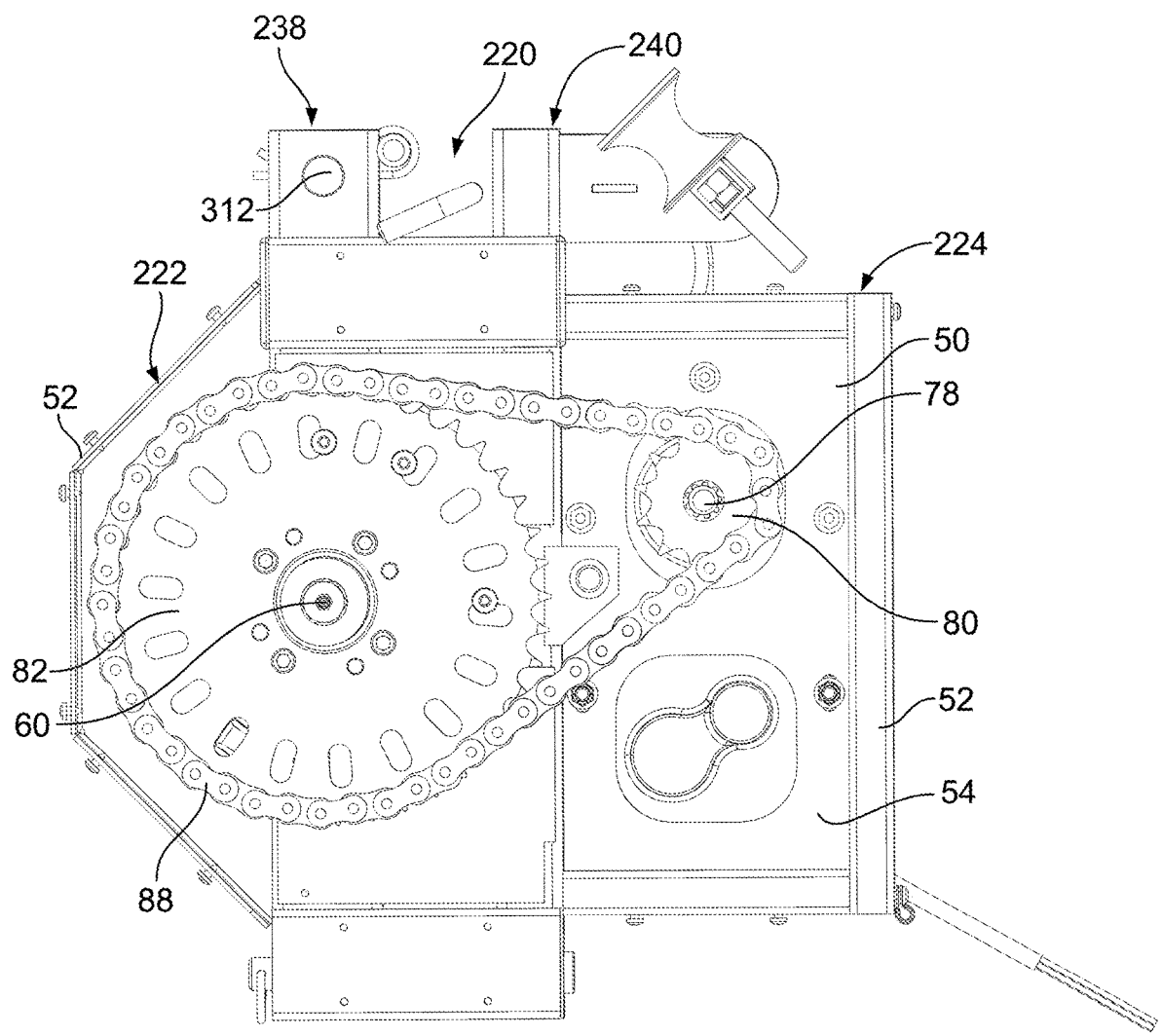
FIG. 14 is a side elevation view of the puller frame with a portion of the puller frame removed so that the internal components are shown, the capstans and the drive assembly of the cable puller.

An embodiment of the driving assembly 32 is described with the understanding that other driving assemblies may be provided. The driving assembly 32 includes a gearbox 74 and a motor 76 mounted to the second wall 50, see FIGS. 12-14, and which has a motor output shaft 78 extending through the second pair of aligned apertures 70, 72 in the puller frame 24. The driving assembly 32 further includes a toothed driving sprocket 80 mounted on the motor output shaft 78 which rotates with the motor output shaft 78. In an embodiment, the motor output shaft 78 is non-rotatably coupled with the driving sprocket 80. In an embodiment, the motor output shaft 78 is splined and engaged with a correspondingly shaped passageway through the driving sprocket 80. The driving sprocket 80 is within the cavity 54. The driving assembly 32 further includes a toothed driven sprocket 82 which is rotatably mounted on the shaft 60. The capstan 28 of the example embodiment is non-rotatably attached to the driven sprocket 82 and is rotatably mounted on the shaft 60. In some embodiments, the capstan 28 is non-rotatably attached to the driven sprocket 82 by pins 84 and fasteners 86, which in an embodiment are bolts. The driven sprocket 80 is within the cavity 54. A chain 88, see FIG. 14, which in an embodiment is formed of a plurality of links, surrounds the sprockets 80, 82 and engages with the teeth of the sprockets 80, 82. The chain 88 is within the cavity 54.

When the motor 76 is actuated, the motor output shaft 78 rotates. Rotation of the motor output shaft 78 causes rotation of the capstan 30 which is affixed thereto. In addition, rotation of the motor output shaft 78 causes rotation of the driving sprocket 80, which in turn, causes rotation of the driven sprocket 82 and its associated capstan 28 via the chain 88.

Figure 6:
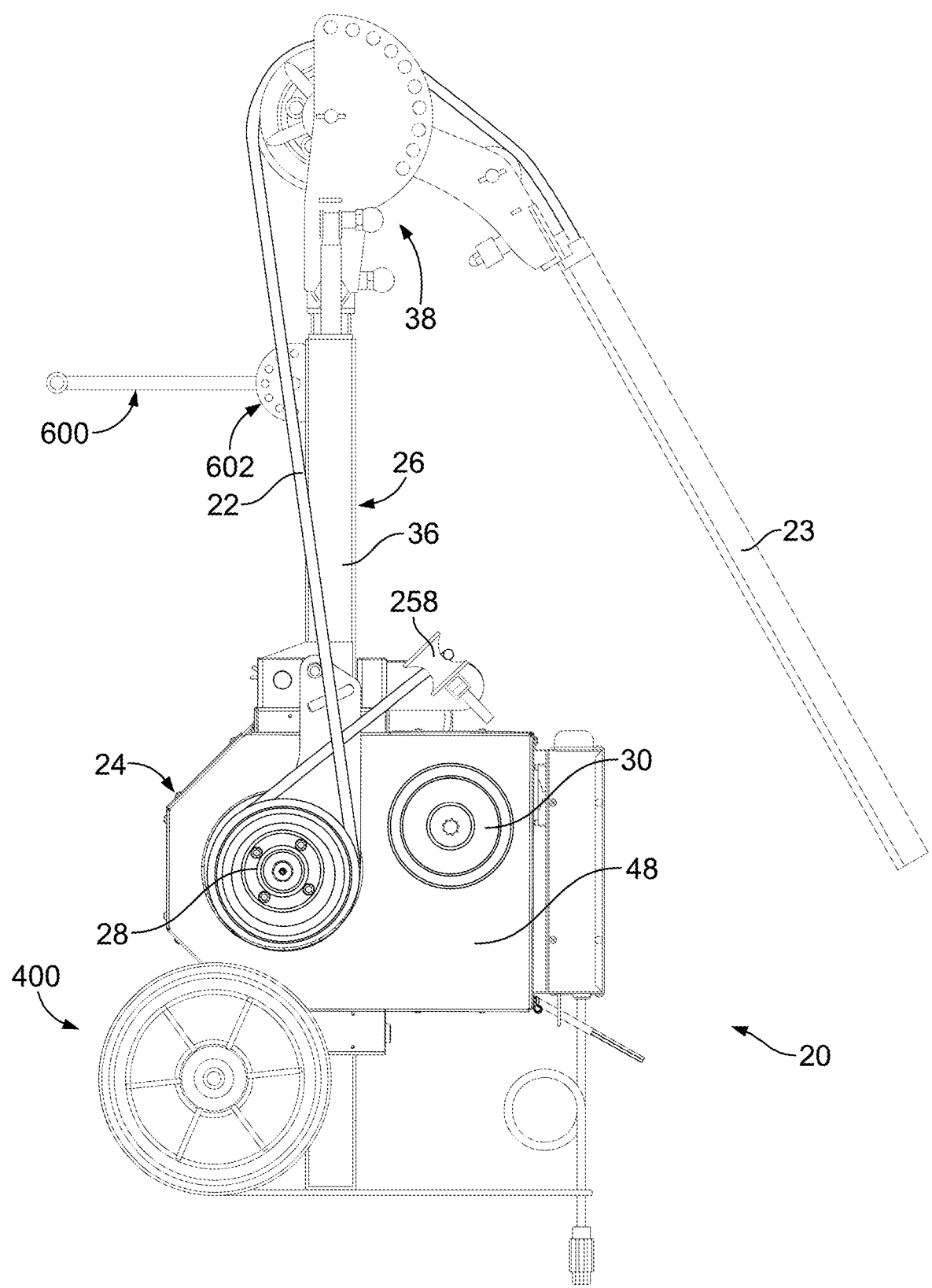
FIG. 6 is a side elevation view of the cable puller, the boom, the attachment system and the wheel assembly shown attached to a conduit with pulling rope and/or cable routed therethrough in a first orientation.
Figure 7:
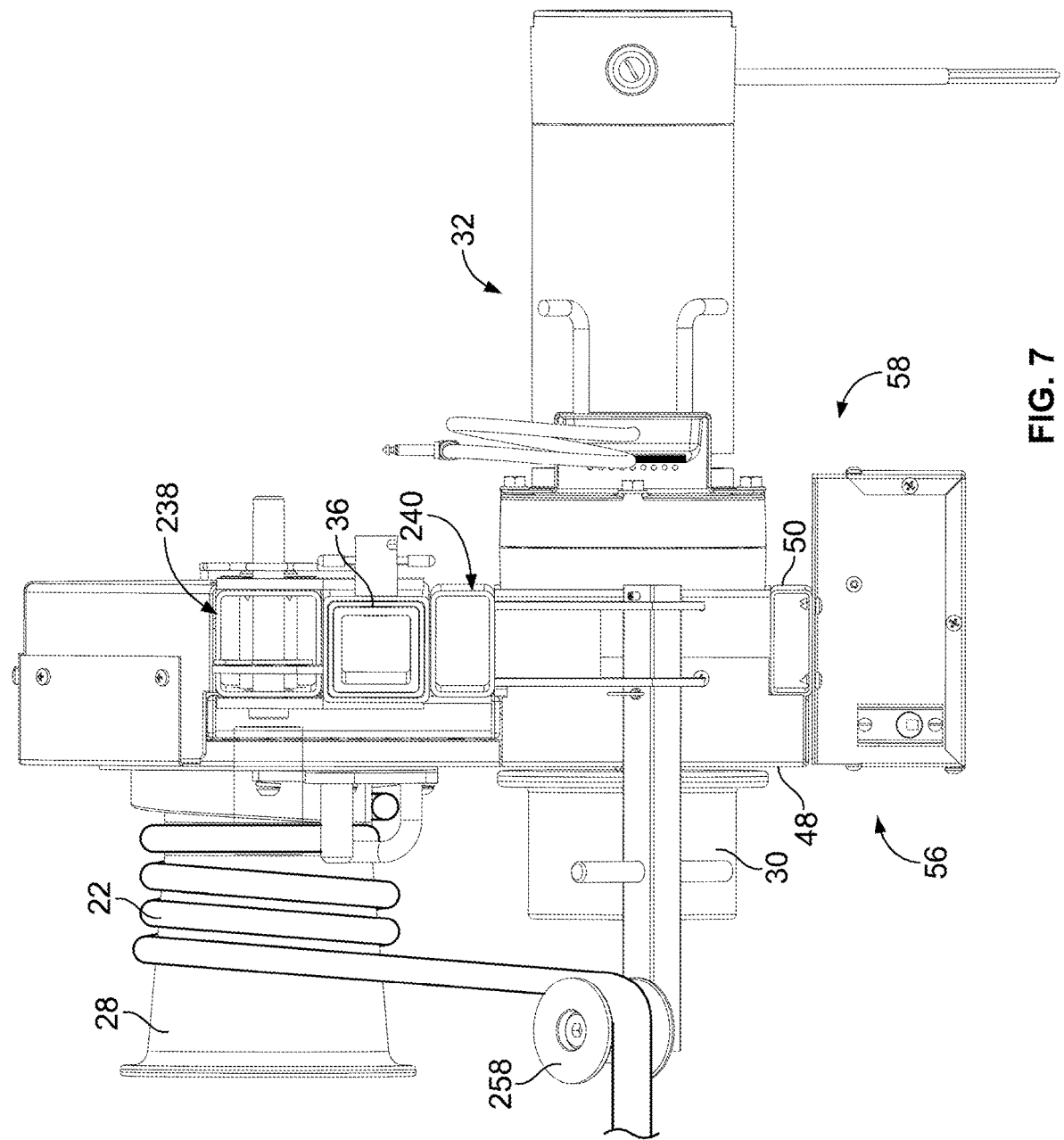
FIG. 7 is a top plan view of the cable puller, the boom, the attachment system and the wheel assembly shown attached to a conduit with pulling rope and/or cable routed therethrough in the first orientation.
Figure 8:
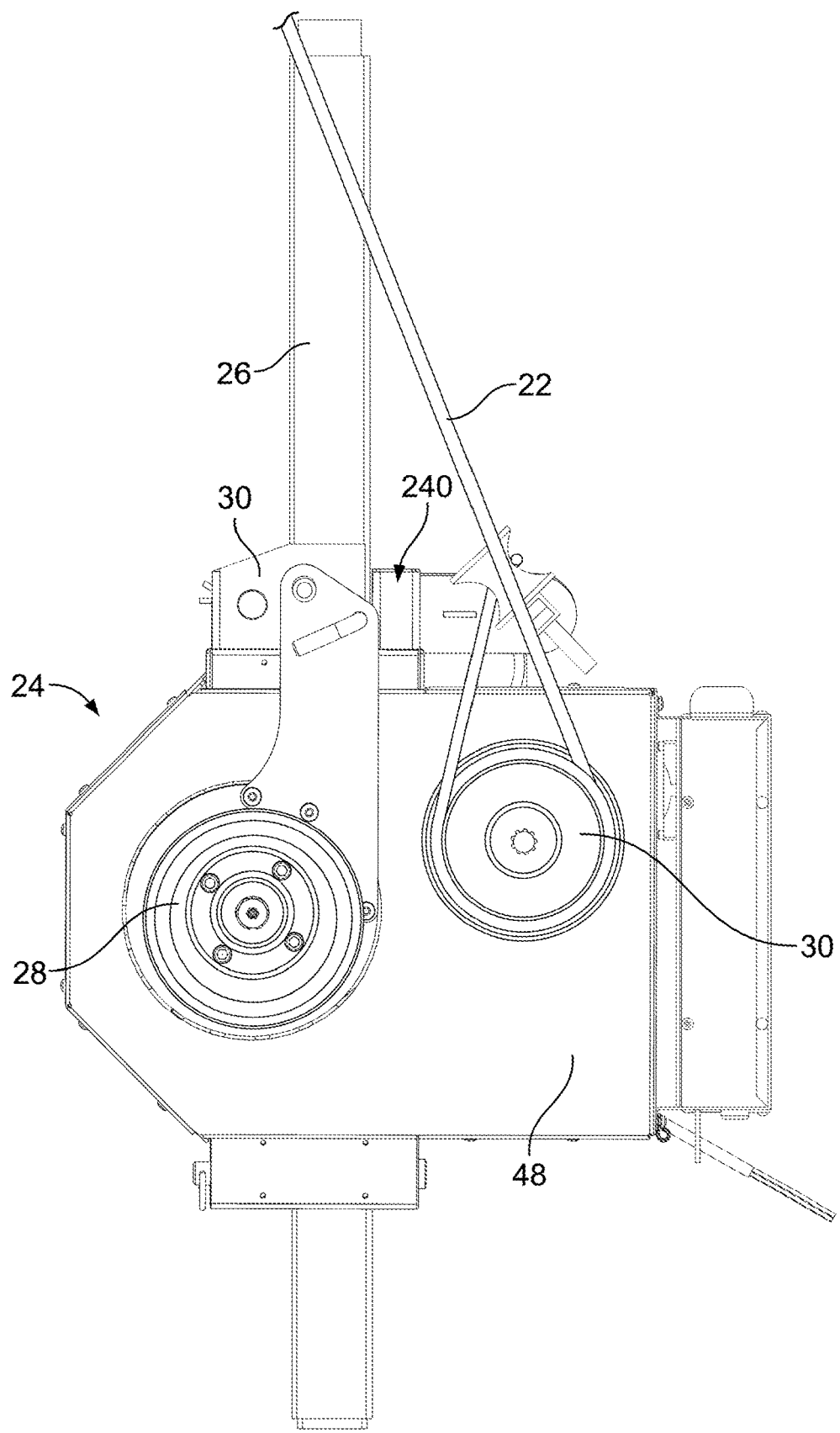
FIG. 8 is a side elevation view of the cable puller, the boom, the attachment system and the wheel assembly shown attached to a conduit with pulling rope and/or cable routed therethrough in a second orientation.
Figure 9:
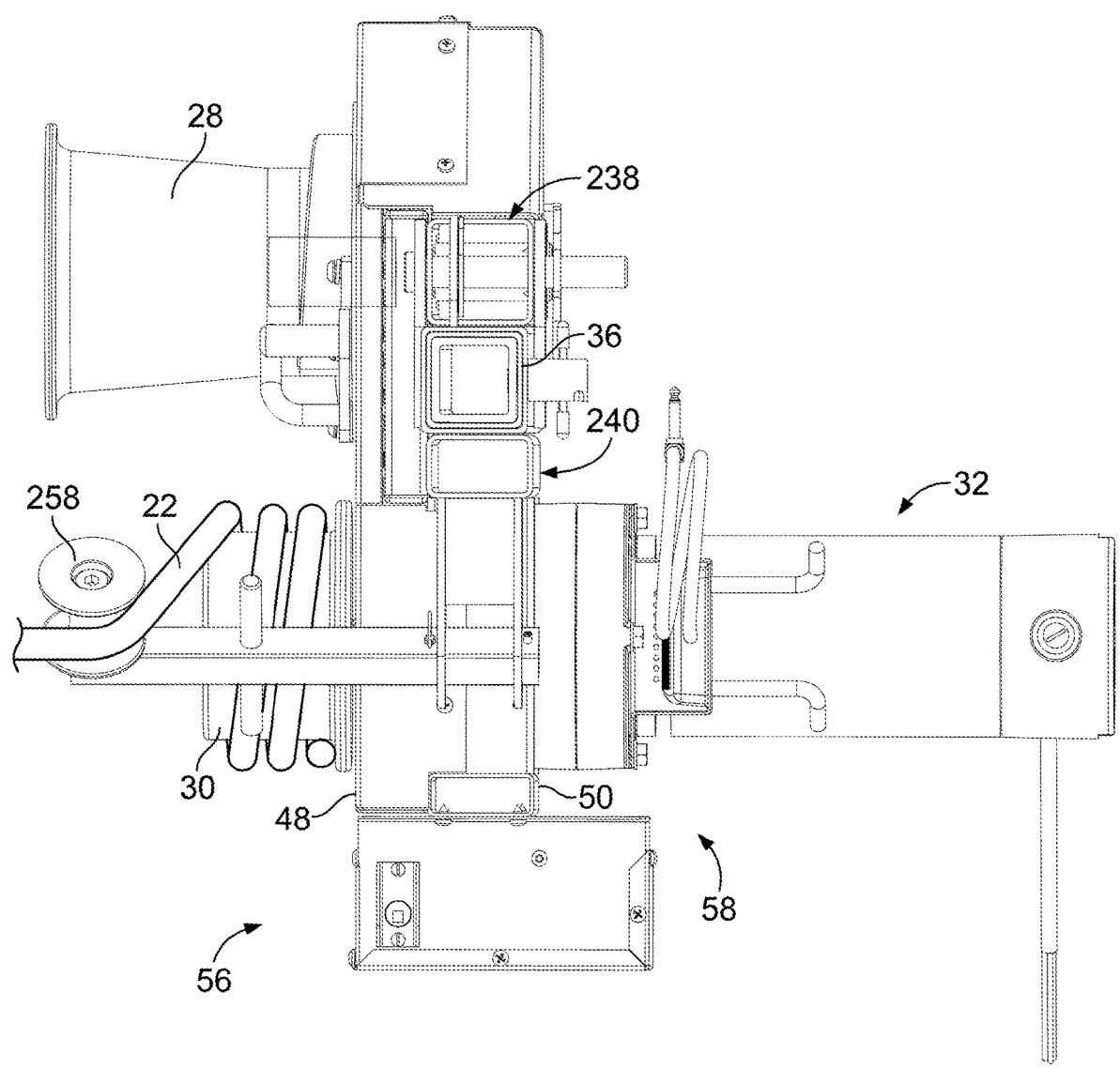
FIG. 9 is a top plan view of the cable puller, the boom, the attachment system and the wheel assembly shown attached to a conduit with pulling rope and/or cable routed therethrough in the second orientation.

As illustrated in FIG. 6, a free end of the attachment system 38 is positioned adjacent to an end of a conduit 23 through which a pulling rope and/or cable 22 is desired to be pulled. The pulling rope and/or cable 22 is looped over the attachment system 38 and extends along the boom 26. A segment of the pulling rope and/or cable 22 is wrapped about one of the two capstans 28, 30, see FIGS. 6-9. The motor 76 is then actuated and the length of pulling rope and/or cable 22 is pulled through the conduit end, along the boom, and toward the capstan 28 or 30 as the capstan 28 or 30 is rotated by the motor 76.

The gearbox 74 can be operated at multiple speeds. Accordingly, the gearbox 74 provides the ability for the cable puller 20 to pull the length of the pulling rope and/or cable 22 at several speeds. For example, in some embodiments, the gearbox 74 may be operated at two speeds. By providing two capstans 28, 30 that can be rotated at two different speeds, four speed/force curves are achieved. The capstan 30 reduces the amount of time necessary to complete a cable pull by allowing the user to pull at a faster speed under lower force conditions. In a cable puller, a motor can only output a limited amount of power, thereby resulting in a tradeoff between the puller load and puller speed. The higher the load is on the cable puller; this results in the lowering of the speed at which the cable puller can operate. In order to be able to have both high load on the cable puller and high speed of operation, the cable puller requires different output ratios from the motor. By decreasing the reduction, the faster the cable puller operates (but at less load). The power generated by the motor for the pull is shared between pull speed and pull force. With the cable puller 20, since the two capstans 28, 30 provide multiple speeds at which the pull can be accomplished, this enables customers to choose the correct speed for the load being pulled. A light load can be selected to be pulled faster. In a non-limiting example, a light load may be under 2000 pounds, and a heavy load is over 2000 pounds. If only a single speed is provided, a light load is pulled at the same speed as a heavy load, which is much slower.

The motor output 76 has high revolutions per minutes (RPM) with low torque. As non-limiting examples, the motor 76 operates at 1-3 ft-lbs and 4000-5000 RPM. The motor transmits this rotational energy into the gearbox 74 where high speed and low torque are reduced to a lower speed and higher torque. As non-limiting examples, the motor output shaft 78 of the gearbox 74 operates at 100-300 ft-lbs and 30-80 RPM. This energy is transmitted out of the gearbox 74. Thus, the gearbox 74 reduces the speed of the motor 76 to the speed at which the capstan 30 rotates. Since the driving sprocket 80 and the capstan 30 are mounted on the motor output shaft 78, the driving sprocket 80 and the capstan 30 share the torque provided by the motor output shaft 78.

Since both capstans 28, 30 are on the same side of the puller frame 24, switching the pulling rope and/or cable 22 from one capstan, for example from capstan 28, to the other capstan, for example to capstan 30, is simplified, makes switching between the two capstans 28, 30 easier and faster than if the capstans 28, 30 were respectively positioned on opposite sides of the puller frame 24. When switching between the capstans 28, 30, the pulling rope and/or cable 22 is completely unwrapped from the one capstan, for example from capstan 28, and then is rewrapped on the other capstan, for example onto capstan 30. When a pull is performed, a pile of pulling rope and/or cable 22 pools next to the user. Having the capstans 28, 30 on the same side of the puller frame 24 provides a significant advantage over cable pullers which have capstans on opposite sides of the puller frame 24. In a cable puller which has capstans on opposite sides of the puller frame 24, the user must move the pile of pulling rope and/or cable from one side of the cable puller to the other side of the cable puller every time the user switches between capstans. Otherwise, the user would end up with multiple piles of pulling rope and/or cable on either side of the cable puller. With the present cable puller 20, since both capstans 28, 30 are on the same side of the cable puller 20, the user can perform the pull using either capstan 28, 30 without having to switch sides.

In an embodiment, the diameters D1 and D2 of the capstans 28, 30 are the same, and the driving sprocket 80 of the capstan 30 has a smaller diameter than the driven sprocket 82 of the capstan 28. In those embodiments, the difference in the sizes of the driving sprocket 80 and the driven sprocket 82 (which defines the sprocket ratio) further decreases speed, and increases torque which is transmitted directly from the driven sprocket 82 to the capstan 28. In an embodiment, the diameter D2 of the capstan 30 is smaller than the diameter D1 of the capstan 28 (not shown). This can be accomplished through use of reduction gearing.

In some embodiments, the motor 76 is a servomotor or stepper motor. In some embodiments, the motor 76 is a gear motor, a brushless DC servo motor, a Permanent Magnet DC (PMDC) motor an AC induction motor with modulated control signal and switches to control speed and direction of rotation, some combination thereof, or the like. In some embodiments, the motor 76 may include an on-board motor controller, which may control operation of the motor 76, and which may form part of and/or interface with an apparatus 100 (e.g., the processing circuitry 102 and/or motor control module 104 of the apparatus 100) illustrated in and described with respect to FIG. 11. The motor 76 may be indirectly interfaced via and controlled by control circuitry, such as may be provided by the apparatus 100 (e.g., the processing circuitry 102 and/or motor control module 104 of the apparatus 100).

Figure 11:
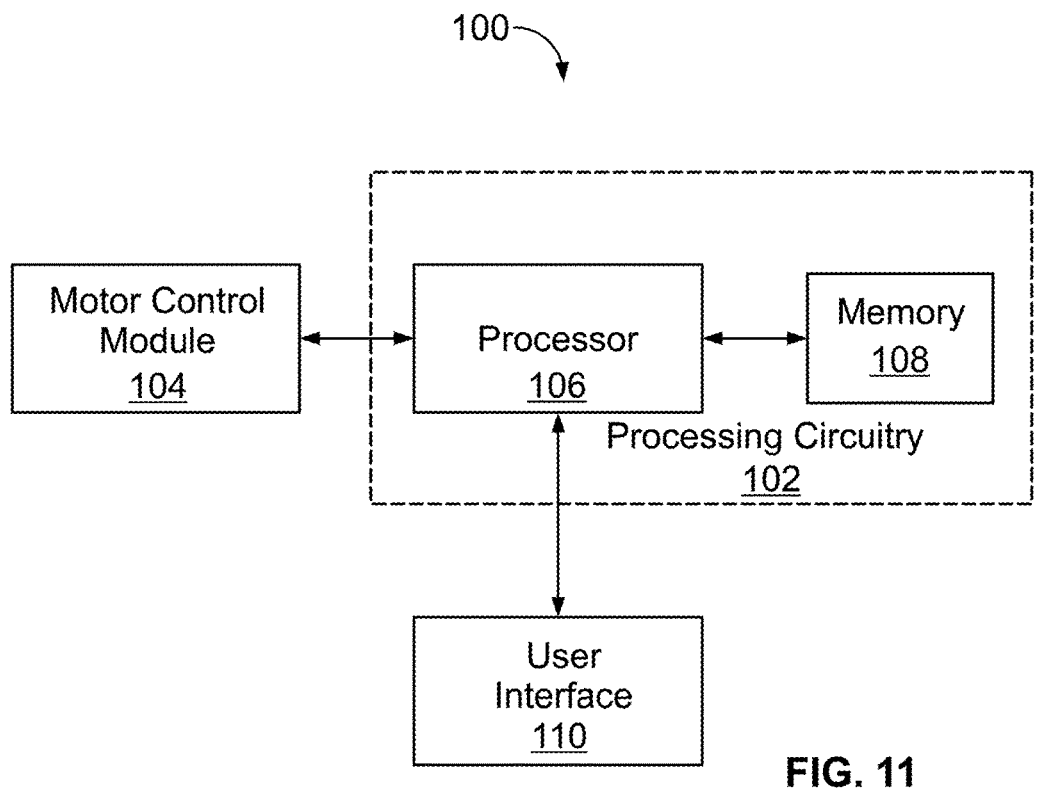
FIG. 11 is a block diagram of an apparatus that may be implemented on the cable puller.

Attention is invited to FIG. 11 which illustrates a block diagram of the apparatus 100 that may be implemented on the cable puller 20 in accordance with some example embodiments. In this regard, when implemented on the cable puller 20, apparatus 100 may enable the cable puller 20 to energize and control operation of the motor 76, in accordance with one or more example embodiments. In this regard, the apparatus 100 may be configured to control operation of the motor 76 to substantially maintain an appropriate tension on the pulling rope and/or cable 22 during a cable pull. It will be appreciated that the components, devices or elements illustrated in and described with respect to FIG. 11 below may not be mandatory and thus some may be omitted in certain embodiments. Additionally, some embodiments may include further or different components, devices or elements beyond those illustrated in and described with respect to FIG. 11.

In some example embodiments, the apparatus 100 may include processing circuitry 102 that is configurable to perform actions in accordance with one or more example embodiments disclosed herein. In this regard, the processing circuitry 102 may be configured to perform and/or control performance of one or more functionalities of the cable puller 20, such as to energize and control operation of the motor 76, in accordance with various example embodiments. The processing circuitry 102 may be configured to perform data processing, application execution and/or other processing and management services according to one or more example embodiments. In embodiments in which the motor 76 includes an on-board motor controller, the processing circuitry 102 may comprise the on-board motor controller(s) and/or may be communicatively coupled with the on-board motor controller(s) to enable the processing circuitry 102 to communicate with and control operation of the motor 76, in accordance with various example embodiments.

In some embodiments, the apparatus 100 or a portion(s) or component(s) thereof, such as the processing circuitry 102, may include one or more chipsets and/or other components that may be provided by integrated circuits.

In some example embodiments, the processing circuitry 102 may include a processor 106 and, in some embodiments, such as that illustrated in FIG. 11, may further include memory 108. The processing circuitry 102 may be in communication with or otherwise control the motor control module 104.

The processor 106 may be embodied in a variety of forms. For example, the processor 106 may be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 106 may comprise a plurality of processors. The plurality of processors may be in operative communication with each other and may be collectively configured to perform one or more functionalities of the apparatus 100 as described herein. For example, in some embodiments in which the processor 106 comprises a plurality of processors, the plurality of processors may comprise one or more on-board motor controllers, such as may be implemented on motor 76 of some embodiments. In some example embodiments, the processor 106 may be configured to execute instructions that may be stored in the memory 108 or that may be otherwise accessible to the processor 106. As such, whether configured by hardware or by a combination of hardware and software, the processor 106 is capable of performing operations according to various embodiments while configured accordingly.

In some example embodiments, the memory 108 may include one or more memory devices. Memory 108 may include fixed and/or removable memory devices. In some embodiments, the memory 108 may provide a non-transitory computer-readable storage medium that may store computer program instructions that may be executed by the processor 106. In this regard, the memory 108 may be configured to store information, data, applications, instructions and/or the like for enabling the apparatus 100 to carry out various functions in accordance with one or more example embodiments. In some embodiments, the memory 108 may be in communication with one or more of the processor 106, a user interface 110, and the motor control module 104 via one or more buses for passing information among components of the apparatus 100.

The motor control module 104 may be embodied as various means, such as circuitry, hardware, a computer program product comprising a computer readable medium (for example, the memory 108) storing computer readable program instructions that are executable by a processing device (for example, the processor 106), or some combination thereof. In some embodiments, the processor 106 (or the processing circuitry 102) may include, or otherwise control the motor control module 104. The motor control module 104 may be configured to control the energization of the motor 76, so that the motor 76 rotates the capstans 28, 30, at a level of rotation to provide an appropriate tension on the pulling rope and/or cable 22. In some example embodiments, the motor control module 104 may be configured to control energization of the motor 76 based on input from one or more sensors.

In an embodiment, a user interface 110 may be provided and is in communication with the processor 106, memory 108, and/or motor control module 104. The user interface 110 may include any user interface element that may enable an operator to input information and/or that may be used to display operating status information to the operator. By way of non-limiting example, the user interface 110 may include one or more buttons, one or more switches, a keypad/keyboard, a display, a touch screen display, some combination thereof, or the like. An operator may use the user interface 110 to input information regarding pulling rope and/or cable type, pulling rope and/or cable diameter, etc. which information may be used by the motor control module 104 to control the energization of the motor 76. The motor control module 104 may be configured to access (e.g., from memory 108) a table or other structure which stores various profiles based on pulling rope and/or cable type, pulling rope and/or cable diameter, etc. and the motor 76 may be controlled in accordance with the appropriate profile to maintain proper tension.

Figure 15:
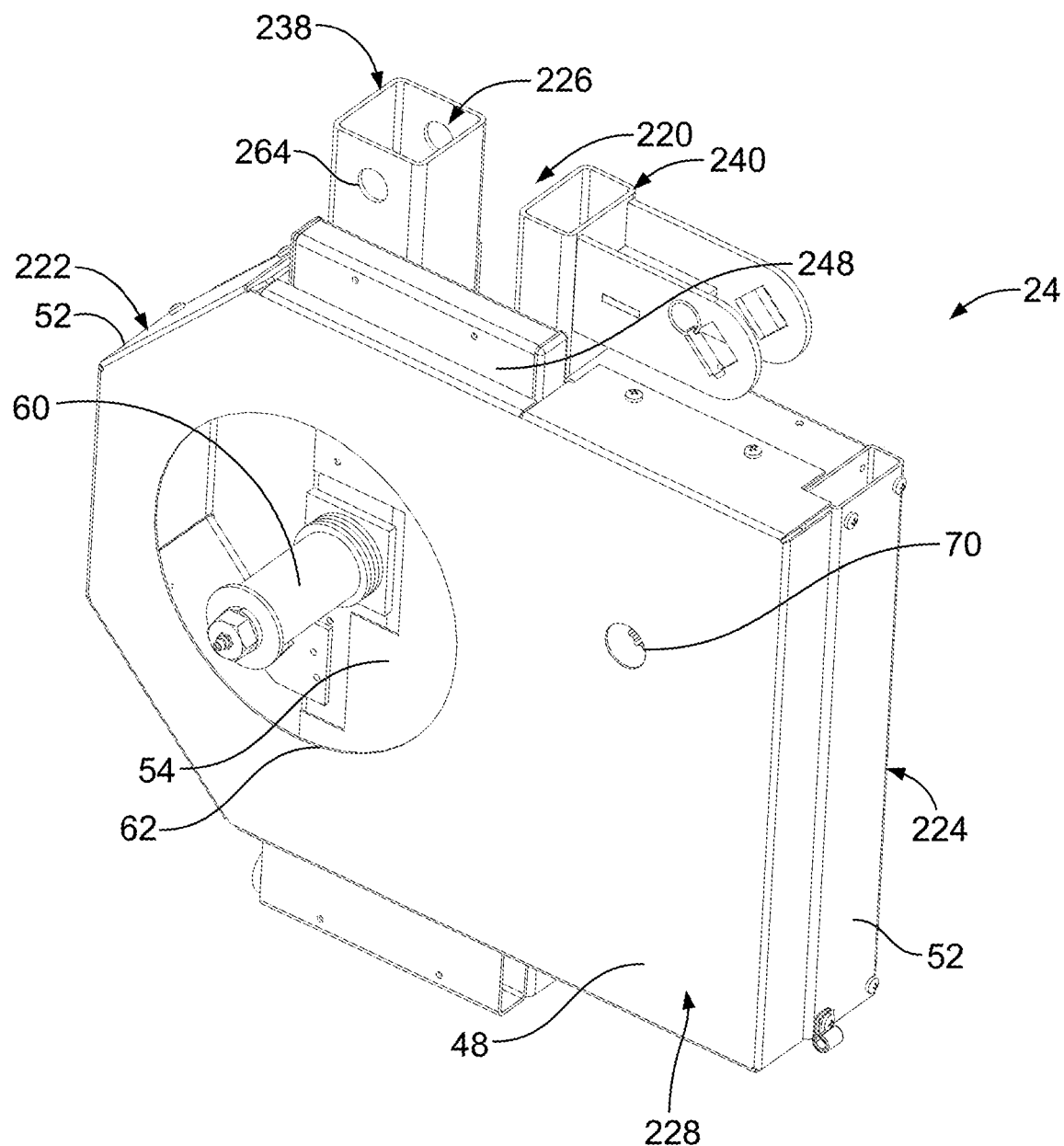
FIG. 15 is a perspective view of an embodiment of the puller frame.
Figure 16:
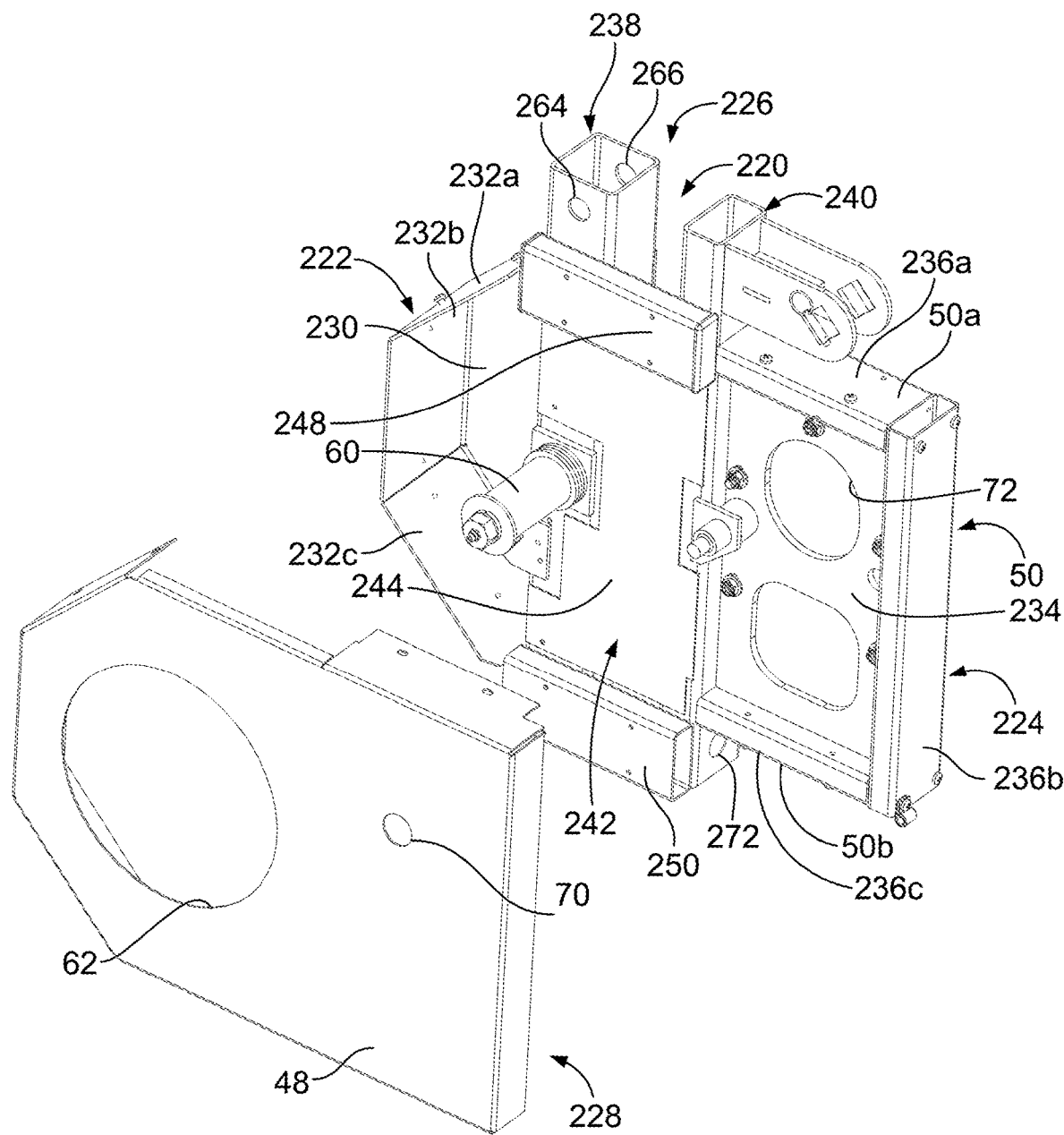
FIG. 16 is an exploded perspective view of the puller frame shown in FIG. 15.
Figure 17:
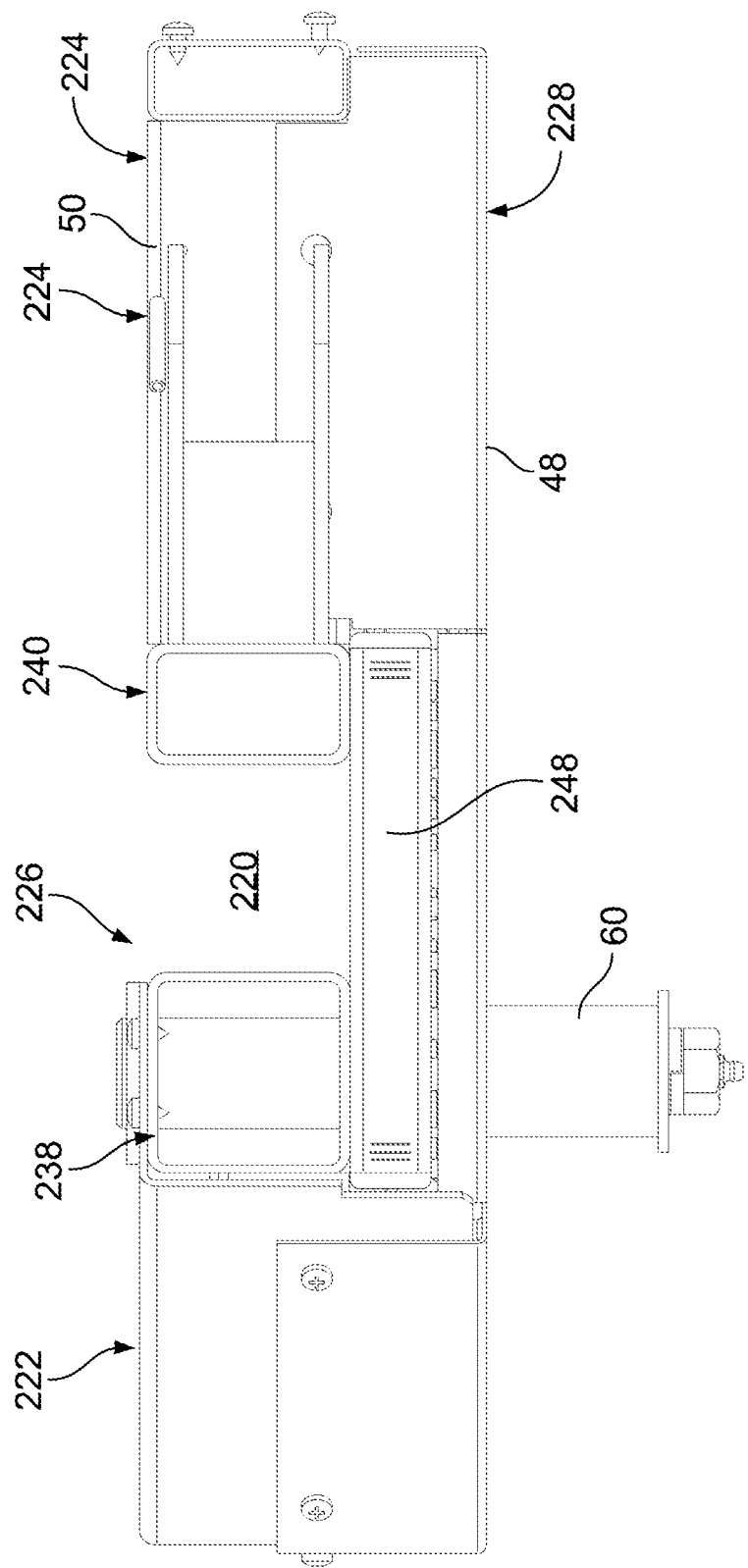
FIG. 17 is a top plan of the puller frame shown in FIG. 15.
Figure 18:
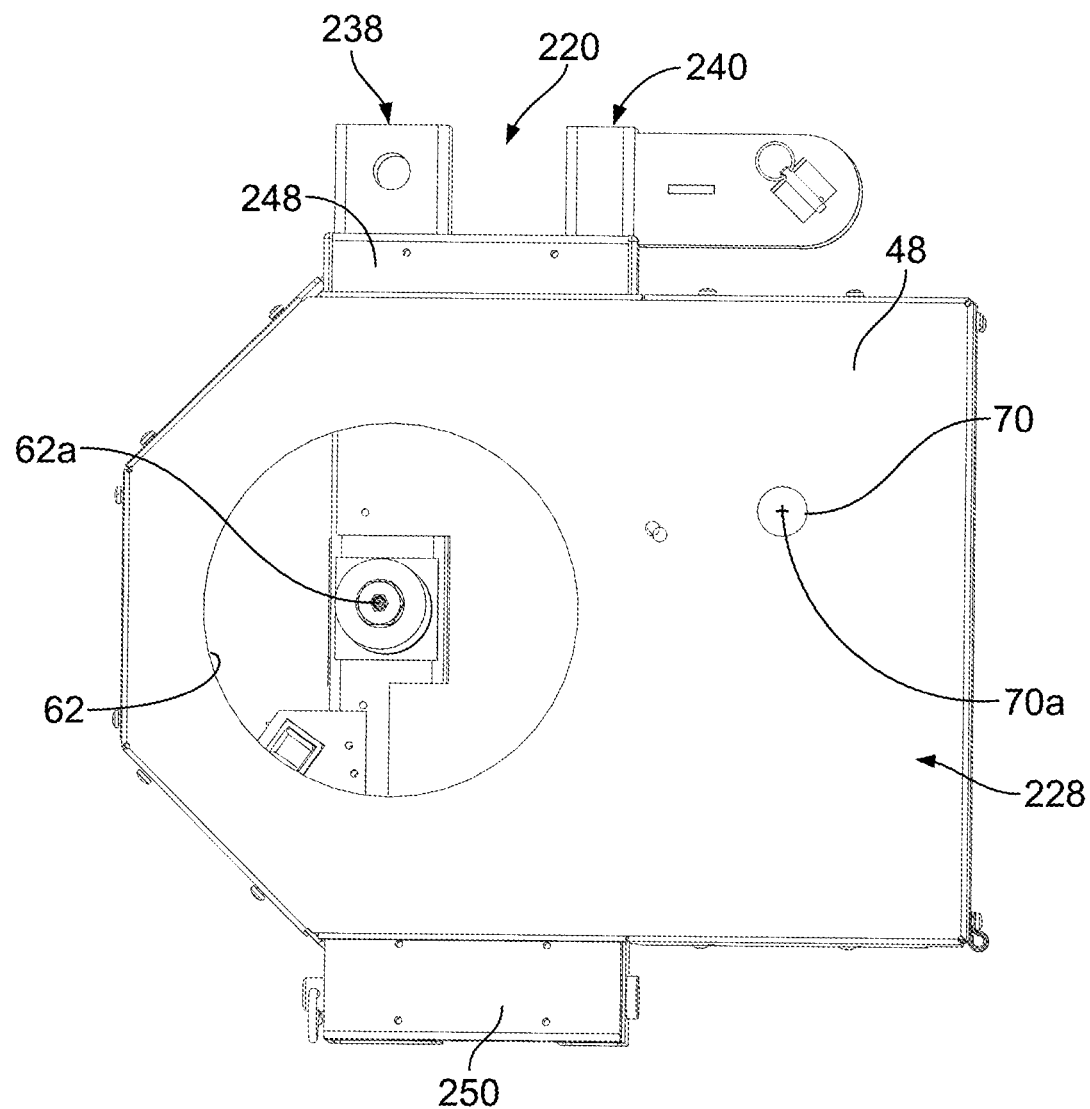
FIG. 18 is a front elevation view of the puller frame shown in FIG. 15.
Figure 19:
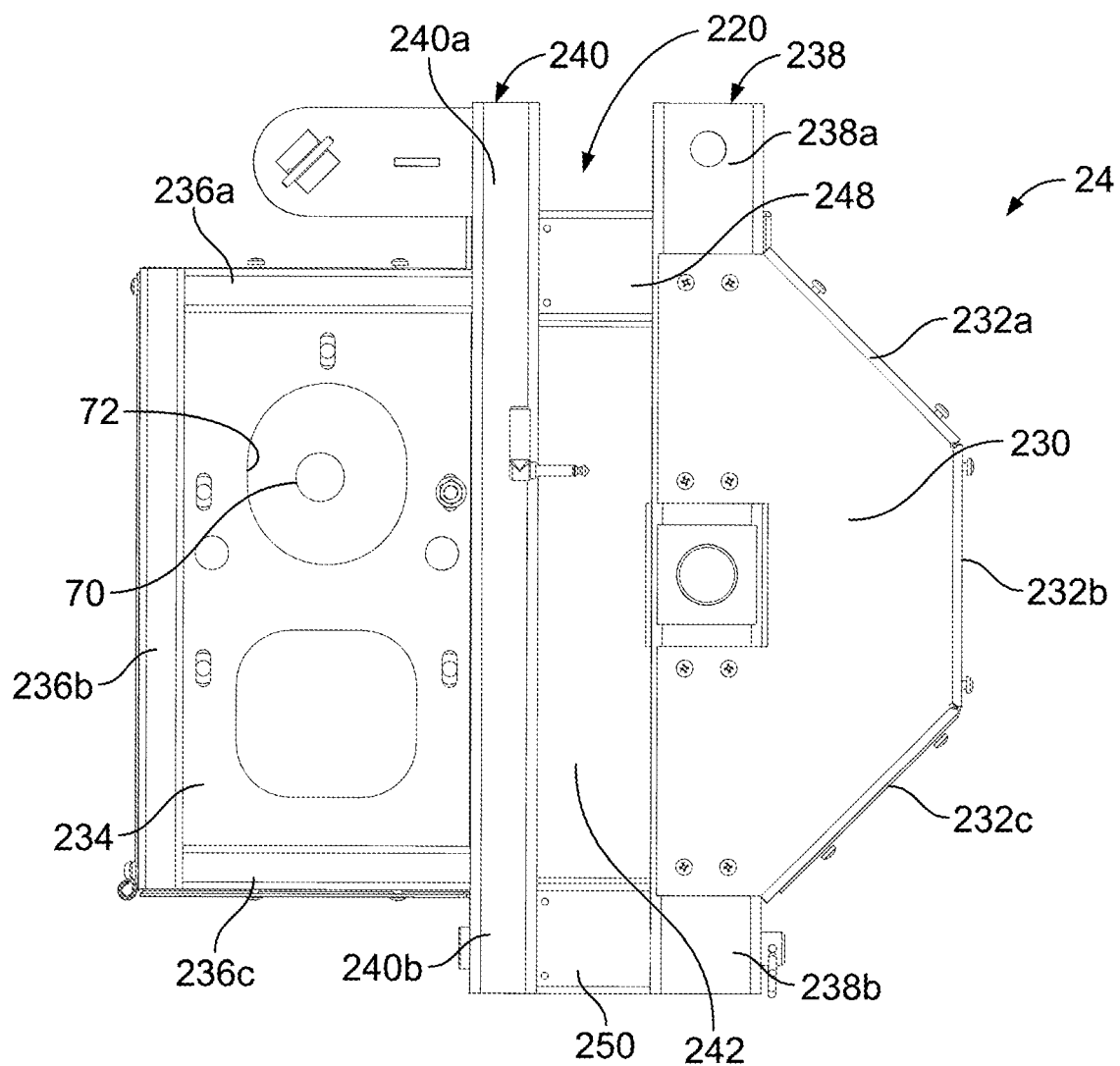
FIG. 19 is a rear elevation view of the puller frame shown in FIG. 15.
Figure 20:
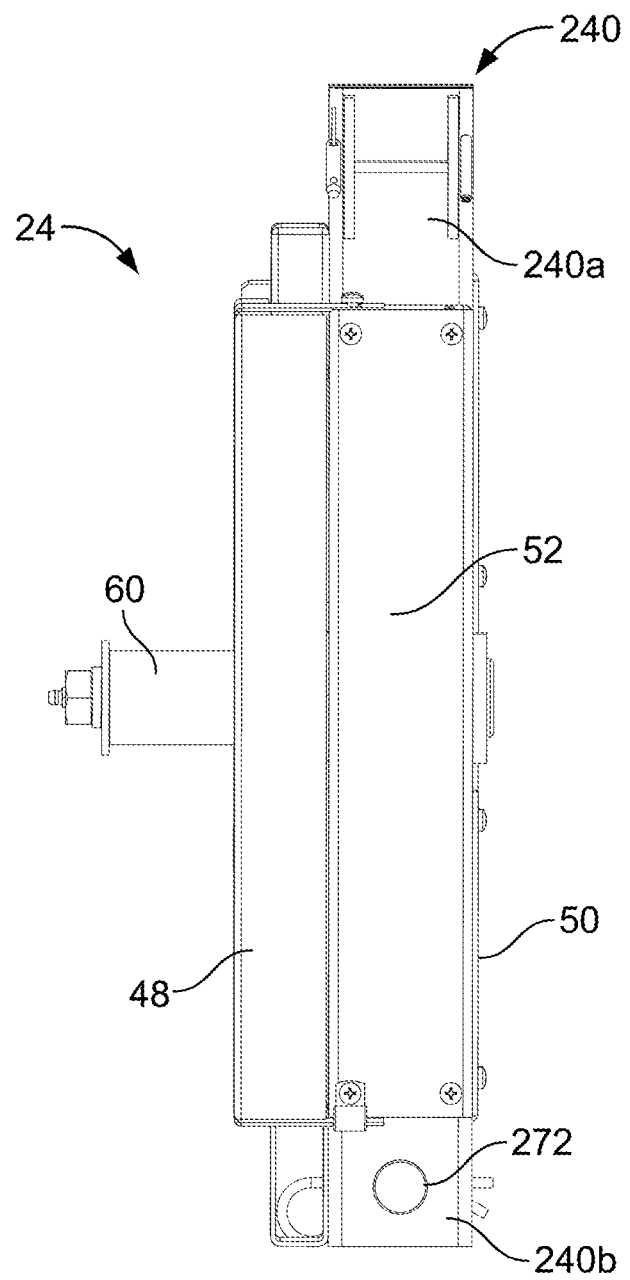
FIG. 20 is a side elevation view of the puller frame shown in FIG. 15.

In an embodiment, the second wall 50 of the puller frame 24 has an open-sided pocket 220, see FIGS. 15-17 formed therein which extends from an upper end 50a of the second wall 50 to a lower end 50b of the second wall 50. In an embodiment, the shape of the open-sided pocket 220 closely conforms to the cross-sectional shape of the boom 26. For example, in an embodiment, the boom 26 has a square cross-section and the pocket 220 forms part of a square into which the boom 26 seats. As another example, in an embodiment, the boom 26 has an at least partially arcuate cross section and the pocket 220 has an arcuate portion into which the boom 26 seats. The boom 26 is seated within the pocket 220 and engages against wall or walls forming the pocket 220. When the boom 26 is seated within the pocket 220, the outer surface of the boom 26 which is proximate to the outer surface 50c of the second wall 50 is planar with, substantially planar with, or slightly recessed from the outer surface 50c.

In an embodiment, as shown in FIGS. 15-20, the puller frame 24 is formed from first and second base plates 222, 224, a boom channel assembly 226 coupling the base plates 222, 224 together, and a cover 228 attached to the base plates 222, 224 and to the boom channel assembly 226 to form the cavity 54 in which the driving assembly 32 of the cable puller 20 is mounted. The boom channel assembly 226 forms the pocket 220.

In an embodiment, the first base plate 222 includes a vertical wall 230 having a planar outer surface and an inner surface, and side walls 232a, 232b, 232c extending from the inner surface of the vertical wall 230 and along the outer edges thereof. In an embodiment, upper and lower side walls 232a, 232c are angled. The shaft 60 extends from the inner surface of the vertical wall 230. In an embodiment, the second base plate 224 includes a vertical wall 234 having a planar outer surface and an inner surface, and side walls 236a, 236b, 236c extending from the inner surface of the vertical wall 234 and along the outer edges thereof. The aperture 72 is formed through the wall 234.

The boom channel assembly 226 includes first and second channels 238, 240 which are connected together by a wall 242 such that the first and second channels are spaced apart from each other to form the pocket 220 in which the boom 26 seats. In an embodiment, the wall 242 is formed by a central plate 244, an upper bar 248 at the upper end of the plate 244, and a lower bar 250 at the lower end of the plate 244. Each channel 238, 240 is elongated having first and second opposite ends which define a length. Each channel 238, 240 is formed of at least one wall. In an embodiment, each channel 238, 240 is formed of four walls which form a square cross-section along its length. In an embodiment, each channel 238, 240 is formed of a cylindrical wall which defines a circular cross-section.

The first channel 238 is attached to an inner surface of the vertical wall 230 of the first base plate 222. The first channel 238 has an upper portion 238a which extends upwardly from the upper end of the vertical wall 230. In an embodiment, a lower portion 238b of the first channel 238 extends downwardly from the vertical wall 230. In an embodiment, the first channel 238 is formed as a tube. In an embodiment, the first channel 238 is hollow. In an embodiment, the first channel 238 has a square cross-section.

The second channel 240 is attached to the first vertical wall 234 and the edges of the upper and lower side walls 236a, 236c of the second base plate 224. In an embodiment, the second channel 240 has an upper portion 240a which extends upwardly from the upper end of the vertical wall 234 and a lower portion 240b which extends downwardly from the vertical wall 234. In an embodiment, the second channel 240 is formed as a tube. In an embodiment, the second channel 240 is hollow. In an embodiment, the second channel 240 has a square cross-section.

The first channel 238 has an outer surface 238c which substantially aligns with the plane of the outer surface 240c of the second channel 240.

In an embodiment, a support 254 extends from the upper portion 240a of the second channel 240 and support a shaft 256 upon which an idler roller 258 is mounted. The idler roller 258 has an axis of rotation which is perpendicular to, or generally perpendicular to, the axis of rotation of the capstans 28, 30. The pulling rope and/or cable 22 is routed around the idler roller 258 to the user. The idler roller 258 may be used with either capstan 28, 30.

In an embodiment, the cover 228 has a vertical wall 260 with side walls 262 depending from the edges thereof. The side walls 262 mate with the side walls 232, 236a, 236b, 236c of the first and second base plates 222, 224 and with the upper and lower bars 248, 250 of the boom channel assembly 226. The vertical wall 260 has the apertures 62 and 70 therethrough.

The cavity 54 is formed between the base plates 222, 224, the boom channel assembly 226

As discussed, the capstan 28 is mounted on the shaft 60 for rotation about the shaft 60 by the driving assembly 32. The shaft 60 is offset from the pocket 220. When the capstan 28 is mounted on the shaft 60, the capstan 28 partially overlaps the pocket 220. The driving sprocket 80, the driven sprocket 82 and the chain 88 are within the cavity 54 and are proximate to the pocket 220.

In an embodiment, the boom 26 is removably mounted to the puller frame 24 and includes one or more mounting plates configured to enable mounting of the puller frame 24. For example, in some embodiments, the boom 26 includes a pair of mounting plates 300, 302 which extend outwardly from the body 34 of the boom 26 in the same direction and are spaced apart from each other. Each mounting plate 300, 302 has an aperture 304, 306 therethrough which are aligned with each other. In an embodiment, the body 34 of the boom 26 has a square cross-section and the mounting plates 300, 302 extend outwardly from opposite side walls.

The mounting of the boom 26 to the puller frame 24 is a "wrap around" method that reduces the loading the puller frame 24 places on the boom 26 by making the distance between the boom 26 and the capstan 28 small. This is in contrast to a conventional mounting of a boom to a puller frame, in which the boom is adjacent to the puller frame such that the boom sits completely to one side of the puller frame.

For example, in some embodiments implementing the "wrap around" mounting method of the present disclosure, the distance between the boom 26 and the capstan 28 is equal to one-half of the diameter D1 of the capstan 28.

To attach the puller frame 24 to the boom 26, the puller frame 24 is slid over the lower end 34b of the body 34 of the boom 26 such that portion of the boom 26 enters into and is seated within the pocket 220. In an embodiment, an upper portion 308 of the boom 26 extends outwardly from the upper end of the pocket 220 of the puller frame 24 and a lower portion 310 of the boom 26 extends outwardly from the lower end of the pocket 220 of the puller frame 24. The puller frame 24 is moved such that one of the channels, for example the first channel 238, of the puller frame 24 is between the mounting plates 300, 302 on the boom 26. The boom 26 may engage against the channels 238, 240. The channels 238, 240 assist in disbursing the stresses that act on the boom 26 during use.

In an embodiment, the first channel 238 includes a pair of aligned apertures 264, 266 therethrough which are proximate to, but spaced from, the upper end of the first channel 238. In an embodiment, the first channel 238 includes a pair of aligned apertures 268, 270 therethrough which are proximate to, but spaced from, the lower end of the first channel 238. In an embodiment, the second channel 240 includes a pair of aligned apertures 272 therethrough which are proximate to, but spaced from, the lower end of the second channel 240. In an embodiment, the boom 26 includes a pair of aligned apertures 316, 318 proximate to, but spaced from, the lower end 34b of the body 34 of the boom 26. To affix the boom 26 to the puller frame 24, in an embodiment, a headed pin 312 is inserted through the apertures 304, 306 in the mounting plates 300, 302 and through the apertures 264, 266 in the first channel 238 of the puller frame 24 and secured by a cotter pin 314, and a headed pin 320 is secured to the puller frame 24 and to the channels 238, 240 through the apertures 268, 270 in the first channel 238 of the puller frame 24, through the apertures 272 in the second channel 240 in the puller frame 24 and through the apertures 316, 318 in the boom 26 and secured by a cotter pin 322. Other structures for coupling the boom 26 to the puller frame 24 are within the scope of the present disclosure. The boom 26 can be removed from the puller frame 24 by releasing the pins 312, 322, and pulling the puller frame 24 off of the boom 26.

As shown in FIG. 6, the capstan 28 is placed such that the tangent point where the pulling rope and/or cable 22 meets the capstan 28 is in line with the boom 26, thus reducing the eccentric load and yielding a stronger boom 26. In addition, only the plate 244, the driving sprocket 80 and the chain 88 separate the boom 26 from the capstan 28, and the boom 26 is partially encircled by the puller frame 24 via the boom 26 being seated within the pocket 220; that is, the boom 26 is partially encircled by the channels 238, 240 and the plate 244. In the assembled state, the distance between the capstan 28 on the puller frame 24 and the boom 26 is reduced, thereby decreasing the associated side load on the boom 26.

Cable pullers designed to pull with high forces can have heavy motors, gearboxes, and capstans. The weight alone makes it difficult to move to and from jobsites. Additionally, cable pullers typically need a way to mount onto an accessory like a floor mount, chain mount, or boom.

In an embodiment, the boom 26 is attached to a wheel assembly 400, see FIGS. 30-33, to allow the cable puller 20 to be easily moved around.

The wheel assembly 400 includes a plate 402 and a column 404 which extends upwardly from the plate 402. In an embodiment, the plate 402 is L-shaped having a vertical wall 402a and a horizontal wall 402b which is perpendicular to the first wall 402a. In an embodiment, the plate 402 is generally L-shaped with walls 402a, 402b extending at angles relative to each other.

The column 404 has an elongated body 410 having upper and lower opposite ends 410a, 410b which define a length of the column 404. In an embodiment, the body 410 is hollow. In an embodiment, the column 404 has a shape which corresponds to the shape of the boom 26. In an embodiment, the bottom end 410b of the body 410 of the column 404 extends through an aperture in the plate 402 and is affixed thereto by suitable means, such as welding.

In an embodiment, an axle 406 extends from the plate 402 and extends outwardly therefrom. The axle 406 may support two or more wheels 408 for enabling transport of the puller 20. For example, in some embodiments, a pair of wheels 408 are attached to the axle 406 and are freely rotatable relative thereto. The wheels 408 allow the user to easily transport the cable puller 20 to a pull site. A bottom of each wheel 408 is aligned with the plate 402 such that when the wheel assembly 400 is in an upright position, the wheel assembly 400 rests on the plate 402. The wheel assembly 400 can be tipped onto the wheels 408 such that the plate 402 is lifted off of the floor or ground 25. When tipped, the column 404 is angled relative to the floor or ground 25.

In an embodiment, the column 404 is inserted into the hollow body 34 of the boom 26 until the lower end 34b of the body 34 of the boom 26 abuts against an upper surface of the plate 402. In an embodiment, the body 34 of the boom 26 is inserted into the column 404. In an embodiment, the column 404 and the body 34 are affixed together, such as by welding, to form a single tube and such that the column 404 and body 34 cannot move relative to each other. The apertures 316, 318 also extend through column 404.

The cable puller 20 can be used to pull pulling rope and/or cable 22 attached to a cable or wire through conduit 23 without dismounting the cable puller 20 from the wheel assembly 400 and reassembling the cable puller 20 external to the wheel assembly 400.

In an embodiment, the boom 26 includes a handle/kickstand 600, see FIGS. 22-29. The handle/kickstand 600 is attached to the upper end 34a of the body 34 of the boom 26 by an attachment system 602. In an embodiment, the handle/kickstand 600 is T-shaped and has a first leg 604 and a second leg 606, which is perpendicular to the first leg 604. In an embodiment, a grip material 608 is provided on at least a portion of the second leg 606, such as on end portions of the second leg 606.

The handle/kickstand 600 can be moved relative to the boom 26 to position the handle/kickstand 600 in a variety of positions relative to the user. The handle/kickstand 600 assists with mobility and transportation of the cable puller 20, with the mounting of the cable puller 20, and with the protection of the cable puller 20. In an embodiment, the handle/kickstand 600 can be grasped by a user to move the cable puller 20 to or away from a pull site. The handle/kickstand 600 is conveniently located so that users may support the cable puller 20 while setting up the pull.

Figure 10:
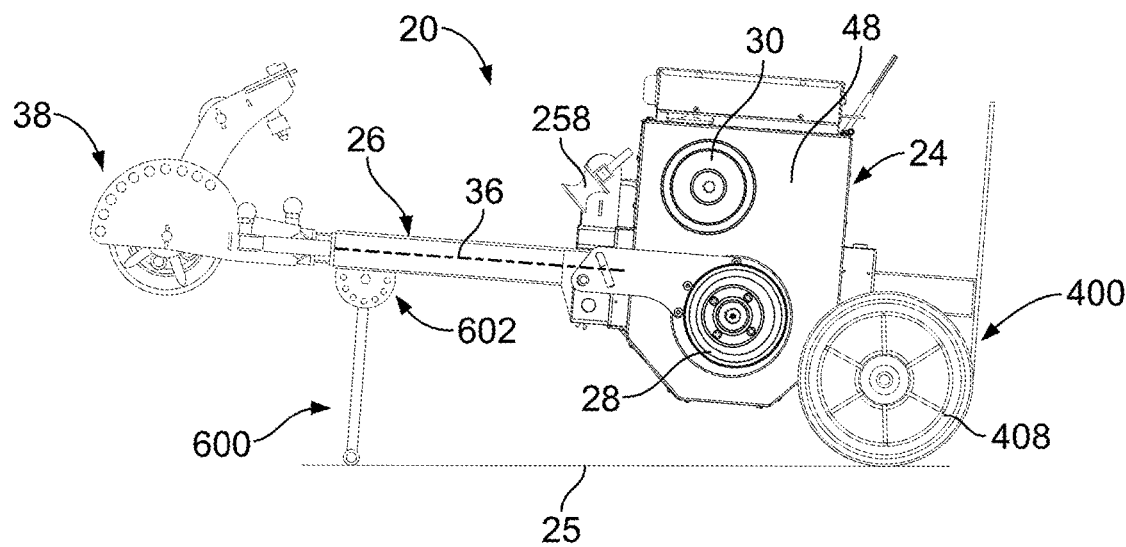
FIG. 10 is a side elevation view of the cable puller, the boom, the attachment system and the wheel assembly shown in a tipped position.

The handle/kickstand 600 600 of some embodiments is sufficiently long that handle/kickstand 600 supports the cable puller 20 when the cable puller 20 is tipped towards the wheel side of the wheel assembly 400, see FIG. 10. When the cable puller 20 is placed in this tipped position, the boom 26 may be easily extended as described herein because the weight required to lift the boom 26 is less than if the boom 26 were upright. In addition, when the cable puller 20 is placed in this tipped position, the handle/kickstand 600 protects the cable puller 20 in the event the cable puller 20 is knocked over.

The attachment system 602 of some embodiments includes a pair of mounting plates 610, 612, see FIGS. 22-29, which extend outwardly from the body 34 of the boom 26, a fastener 614 which is an embodiment is a bolt, a nut 616 for affixing the fastener 614 to the mounting plate 610, 612, and a handle lock 617 attached to the handle/kickstand 600. The mounting plates 610, 612 are spaced apart from each other.

In an embodiment as shown in FIGS. 22-28, the mounting plate 610 has a plurality of spaced apart holes 618 therethrough which fall along an arc. The mounting plate 610 further includes a central hole at the radial center of the arc. In an embodiment, the mounting plate 610 is semicircular.

An end of the first leg 604 of the handle/kickstand 600 is positioned between the mounting plates 610, 612. The fastener 614 passes through the central hole in the mounting plate 610, through a passageway in the first leg 604 of the handle/kickstand 600 and through a hole in the mounting plate 612. The fastener 614 is secured to the mounting plates 610, 612 and the first leg 604 by the nut 616. The fastener 614 forms a rotational axis of the handle/kickstand 600, such that the handle/kickstand 600 can rotate relative to the mounting plates 610, 612, and thus the boom 26.

Figure 28:
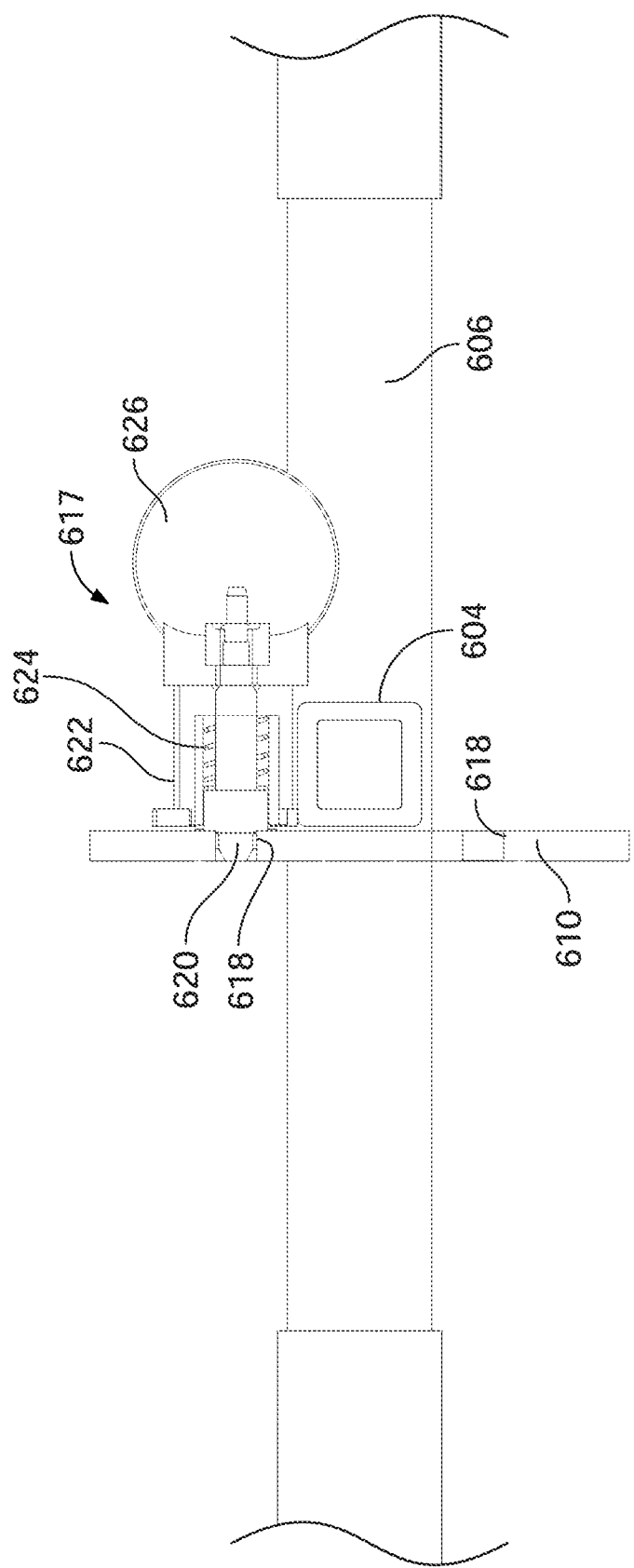
FIG. 28 is a cross-sectional view of the boom along line 28-28 of FIG. 26 showing a handle lock of the boom.

The handle lock 617 is affixed to the first leg 604 of the handle/kickstand 600 and moves with the handle/kickstand 600 when the handle/kickstand 600 is rotated. As shown in FIG. 28, the handle lock 617 includes a pin 620 which is seated within a housing 622 and is biased outwardly from the housing 622 by a spring 624. A handle 626 is attached to an end of the pin 620 which extends outwardly from the housing 622. In an embodiment, the handle 626 is a knob. The housing 622 is affixed to the first leg 604, for example by welding. When in a locked condition, the pin 620 seats within one of the holes 618. To rotate the handle/kickstand 600 relative to the body 34 of the boom 26, the user grasps the handle 626 and pulls the pin 620 outwardly from the hole 618 in which it is seated. The handle/kickstand 600 can now be rotated relative to the mounting plates 610, 612 around the fastener 614. Once the handle/kickstand 600 is in the new desired position, the handle 626 is released and the spring 624 biases the pin 620 into the new hole 618.

Figure 29:
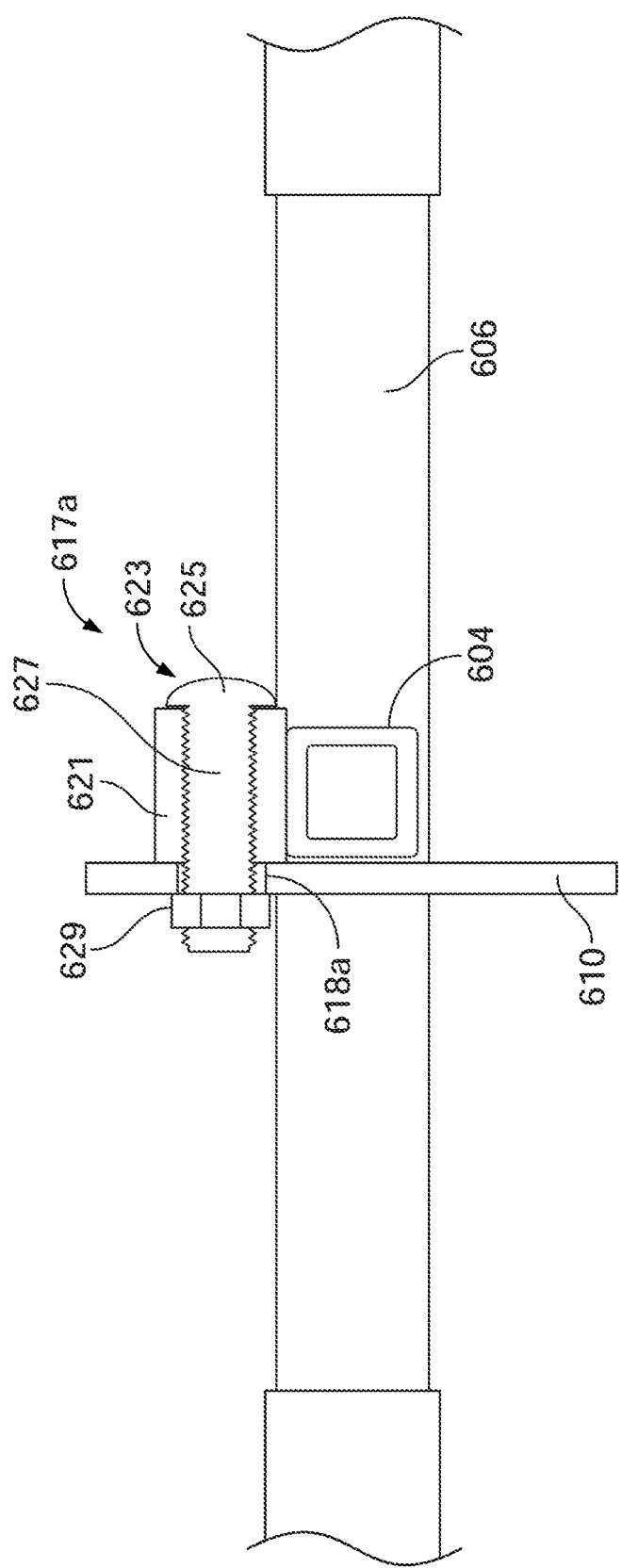
FIG. 29 is a cross-sectional view of an alternate embodiment of a handle lock of the boom.
Figure 30:
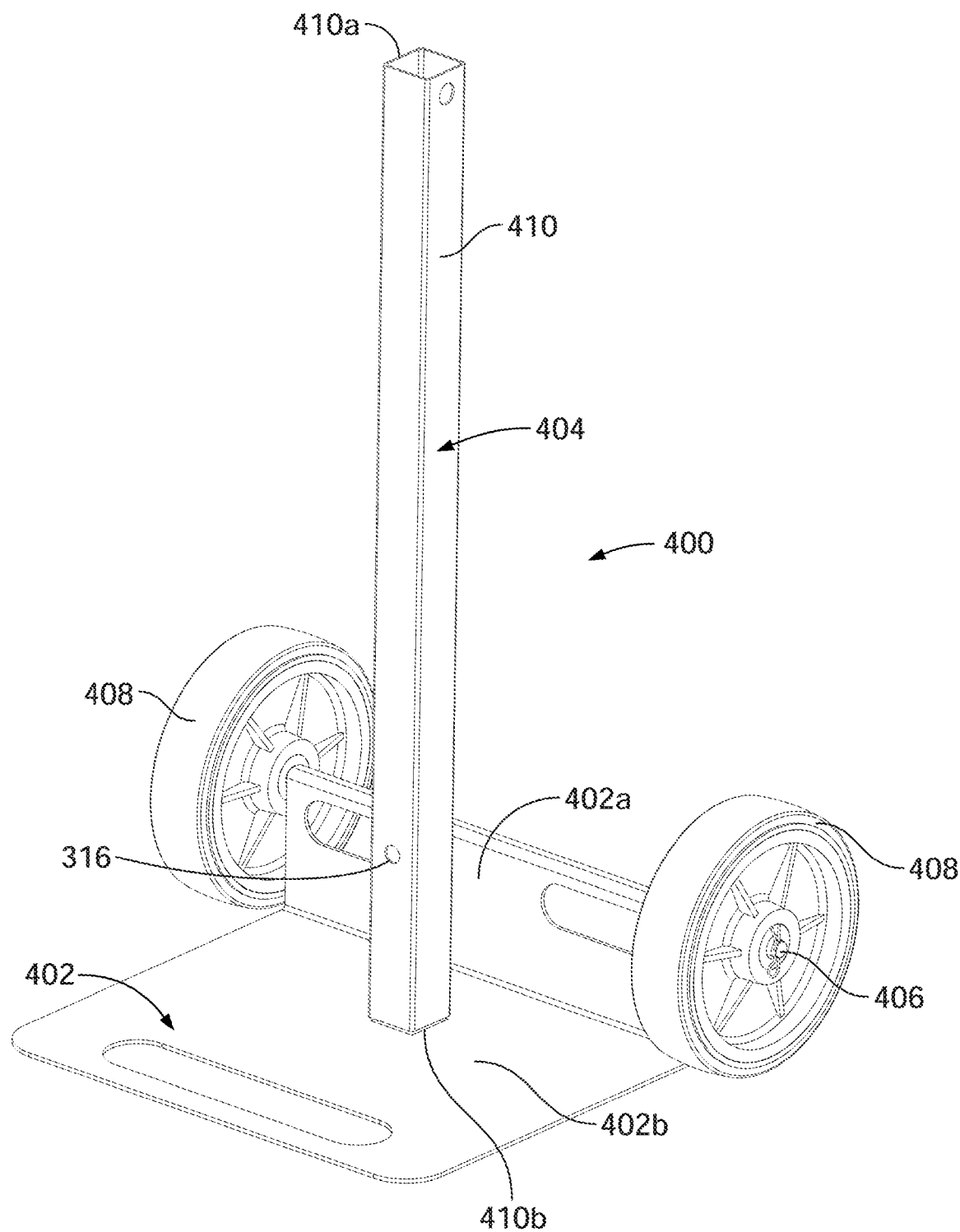
FIG. 30 is a perspective view of an embodiment of the wheel assembly.
Figure 31:
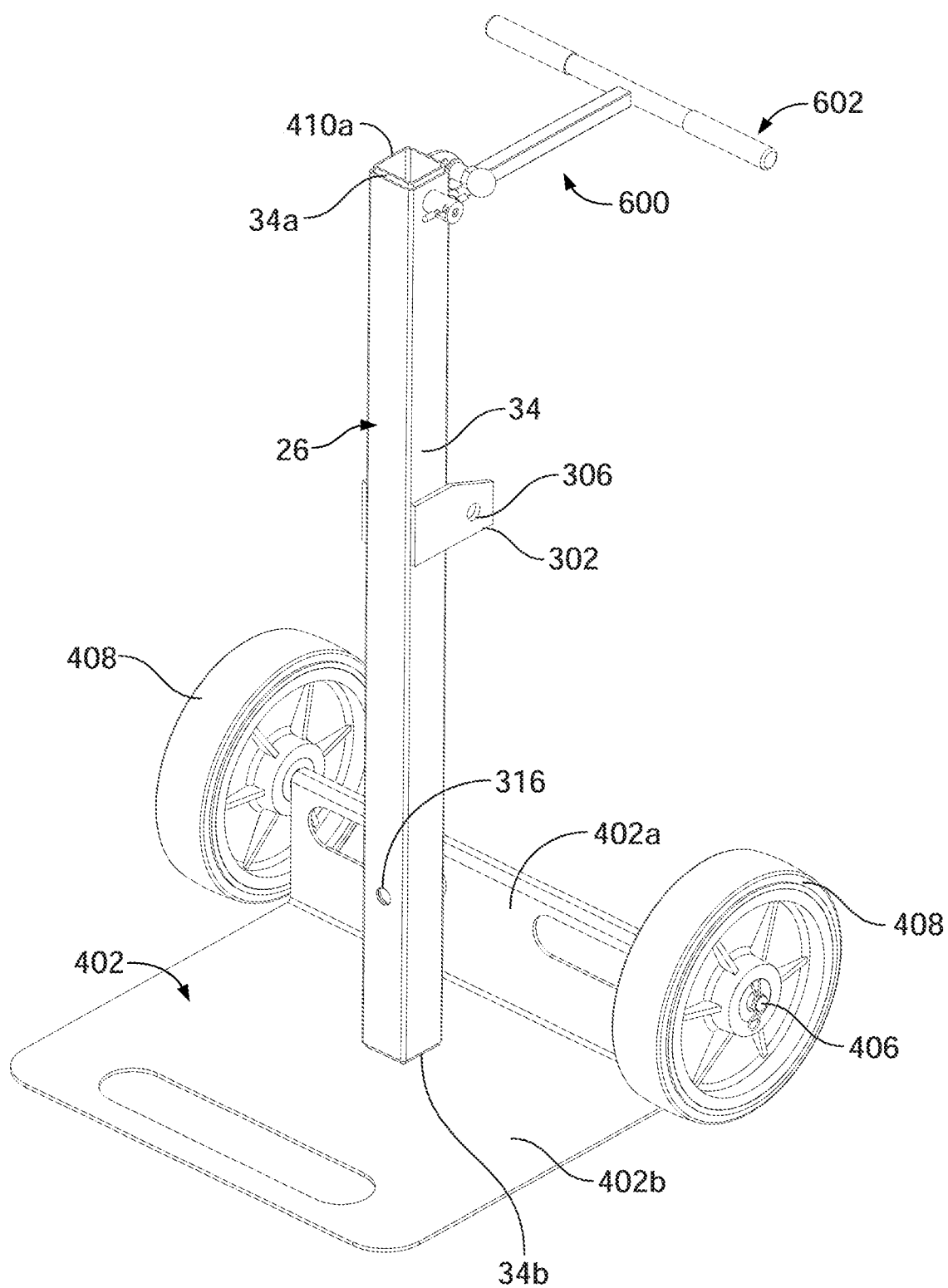
FIG. 31 is a perspective view of the wheel assembly of FIG. 30 with the boom of FIG. 22 mounted thereon.
Figure 32:
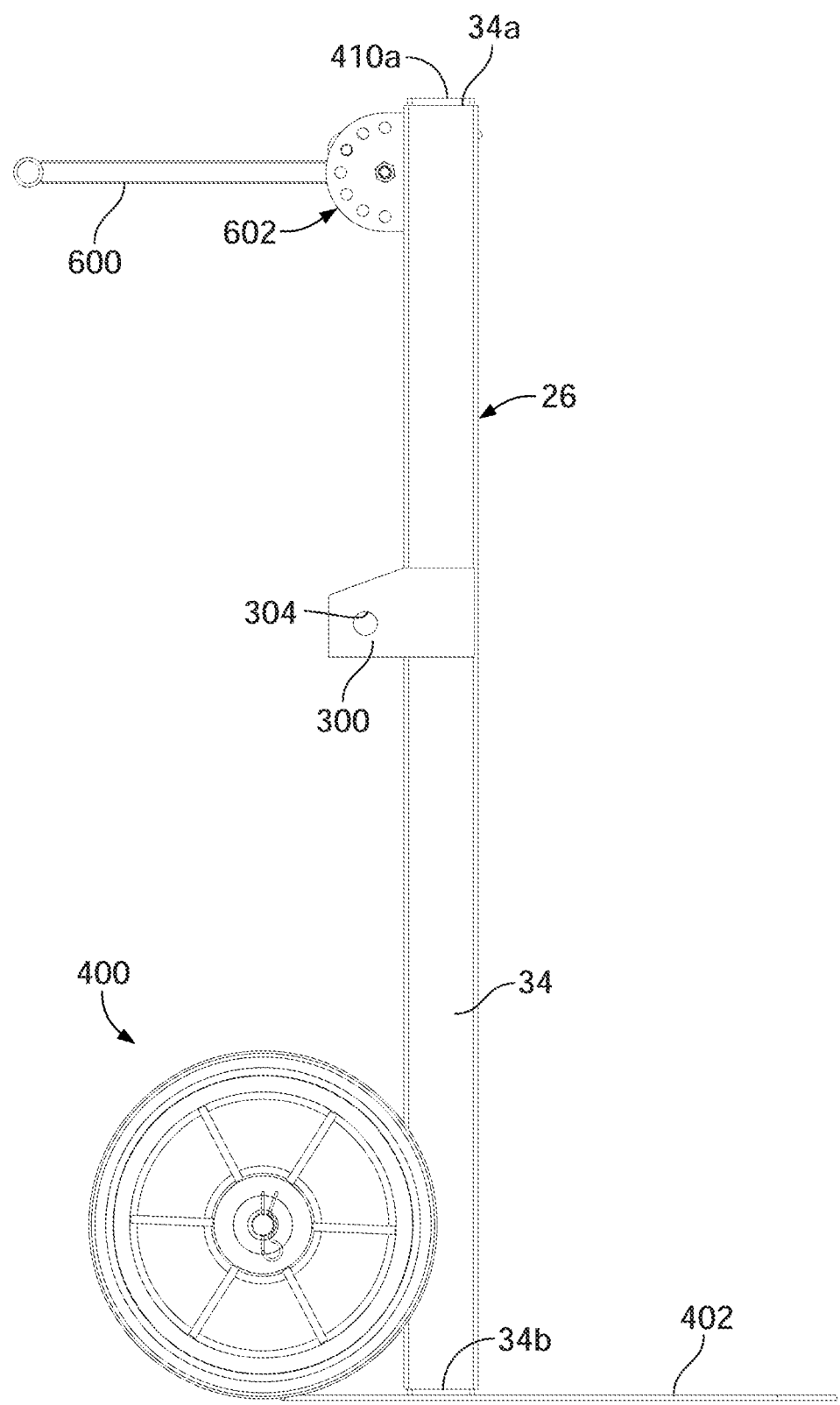
FIG. 32 is a side elevation view of the wheel assembly of FIG. 30 with the boom of FIG. 22 mounted thereon.

In an embodiment as shown in FIG. 29, the mounting plate 610 has a curved continuous slot 618a therethrough which falls along the same arc as the holes 618. The slot 618a replaces the holes 618 in this embodiment. A handle lock 617a is affixed to the first leg 604 of the handle/kickstand 600 and moves with the handle/kickstand 600 when the handle/kickstand 600 is rotated. The handle lock 617a includes a housing 621 affixed to the first leg 604 of the handle/kickstand 600, for example by welding, a fastener 623 having a head 625 and a threaded shaft 627 extending therefrom, and a nut 629 threadedly attached to an end of the shaft 627. The fastener 623 is threadedly engaged with the housing 621. When in a locked condition, the shaft 627 extends through the slot 618a, and the nut 629 is attached to the shaft 627 and bears against the plate 610. To rotate the handle/kickstand 600 relative to the body 34 of the boom 26, the user detaches the nut 629 and removes the fastener 623 from the slot 618a (the fastener 623 can remain engaged with the housing 621). The handle/kickstand 600 can now be rotated relative to the mounting plates 610, 612 around the fastener 614. Once the handle/kickstand 600 is in the new desired position, the shaft 627 is reinserted into the slot 618a and the nut 629 reattached and bears against the plate 610. This handle lock 617a allows for infinite adjustment of the position of the handle/kickstand 600 along the length of the slot 618a.

The handle/kickstand 600 can be rotated so as to be parallel to the boom 26. The handle/kickstand 600 can be rotated so as to be perpendicular to the boom 26. The handle/kickstand 600 can be rotated so as to be angled relative to the boom 26. In this regard, the handle/kickstand 600 can, for example, be adjusted to an out of the way position when the cable puller 20 is in use, to a position to support the boom 26 in a roughly horizontal position relative to the ground when mounting/dismounting the cable puller 20 to the boom, or can be adjusted to a position ergonomically suited for use by a user in transporting the cable puller 20 to/from a pull site.

When the cable puller 20 is on a level surface, the handle/kickstand 600 may be rotated so as to be perpendicular to the boom 26. The wheels 408 and the handle/kickstand 600 of the cable puller 20 rest on the floor or ground 25 as shown in FIG. 10. The cable puller 20 may be placed such that the boom 26 is at an angle slightly above zero relative to the floor or ground 25. This assists with taking the cable puller 20 off of the boom 26, and ensuring that the boom 26 does not slide out by its own weight. The handle/kickstand 600 extends past the puller frame 24 when in this position and extends past the attachment system 38. Since the handle/kickstand 600 extends past the puller frame 24 and past the attachment system 38, the puller frame 24 and the attachment system 38 are protected the event the cable puller 20 tips over.

During a cable pull, the handle/kickstand 600 is folded so as to not interfere with the path of the pulling rope and/or cable 22.

Figure 33:
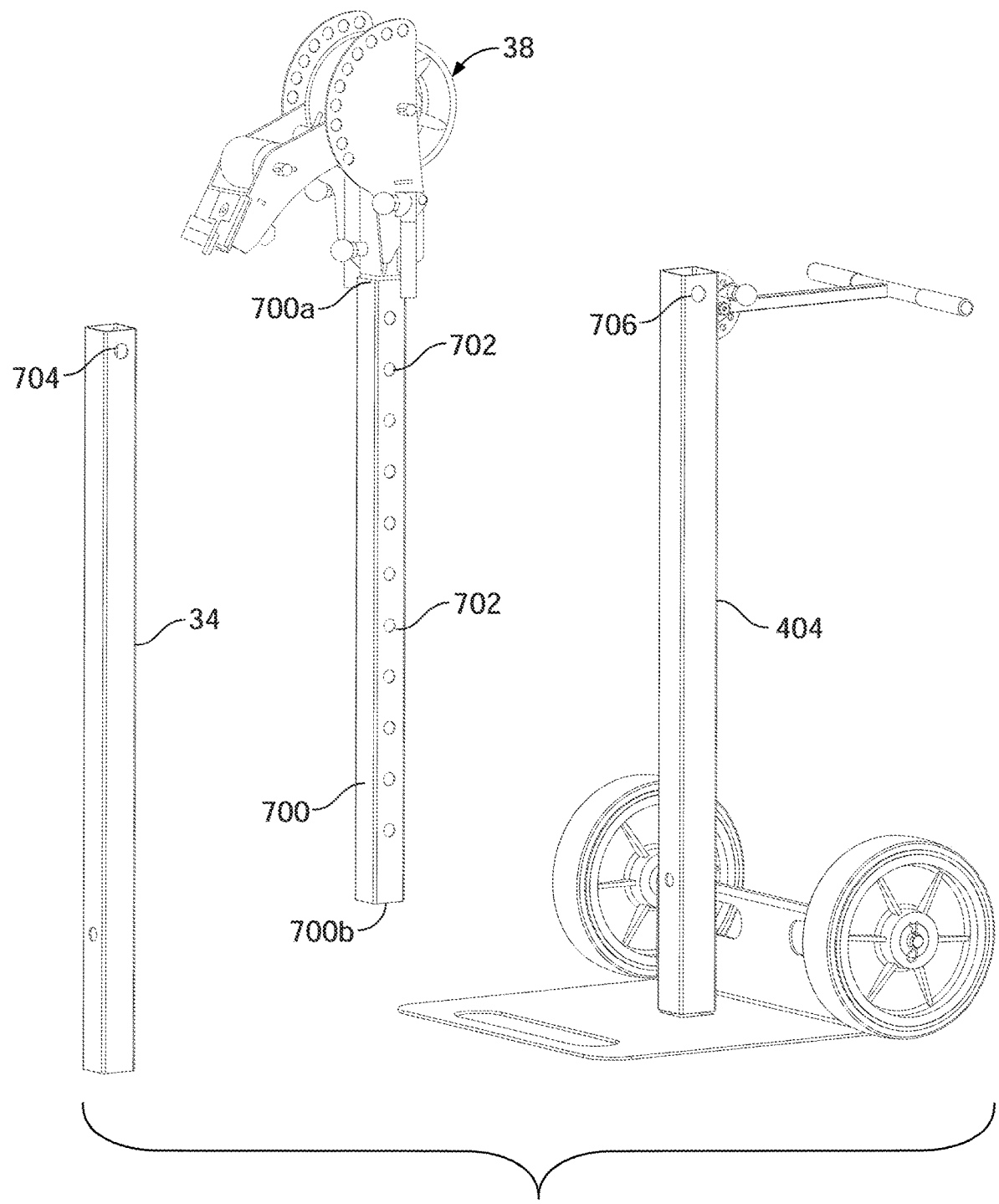
FIG. 33 is an exploded perspective view of the cable puller, the boom, the attachment system and the wheel assembly.
Figure 34:
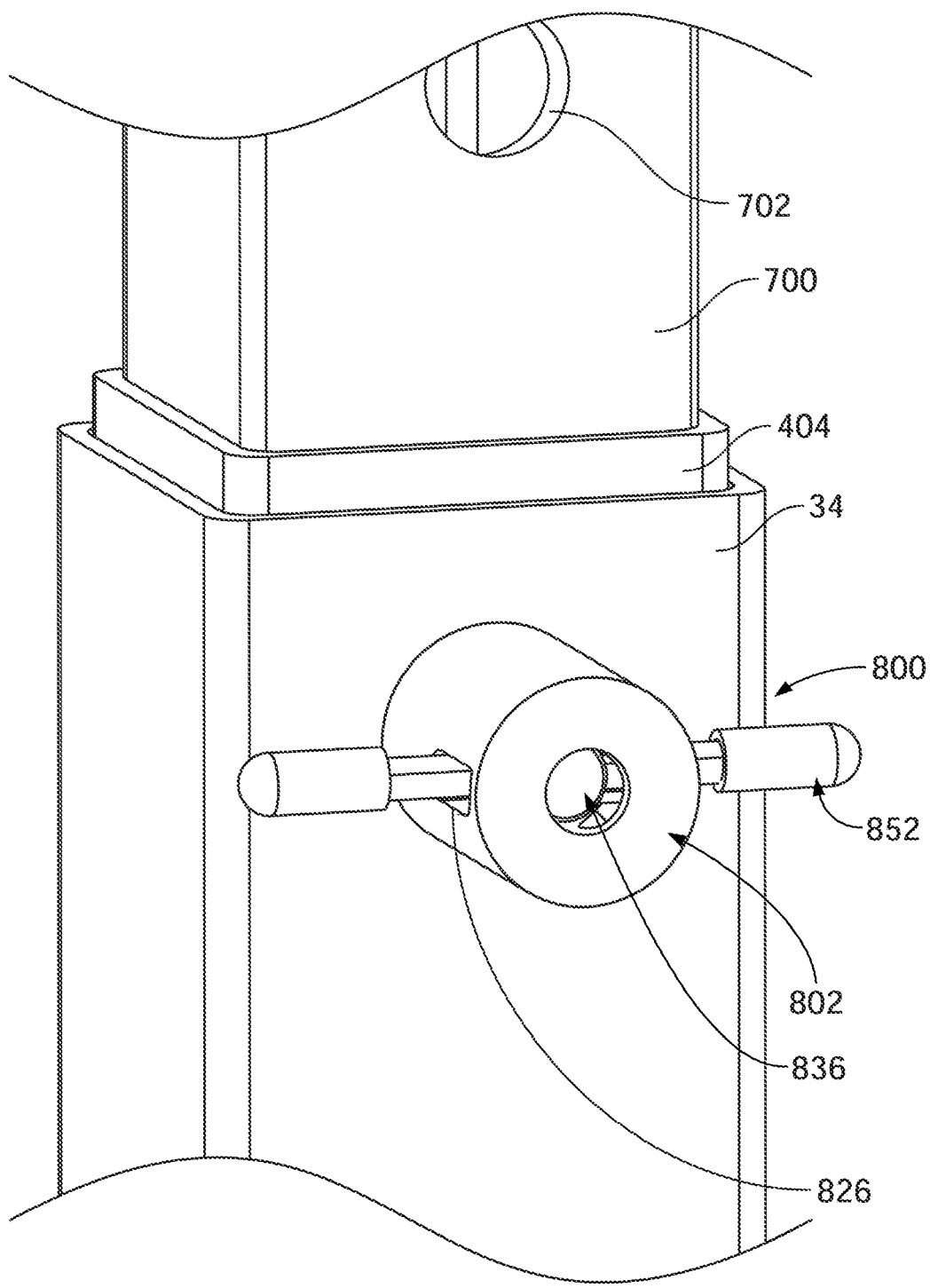
FIG. 34 is a perspective view showing an embodiment of a locking mechanism of the boom.
Figure 35:
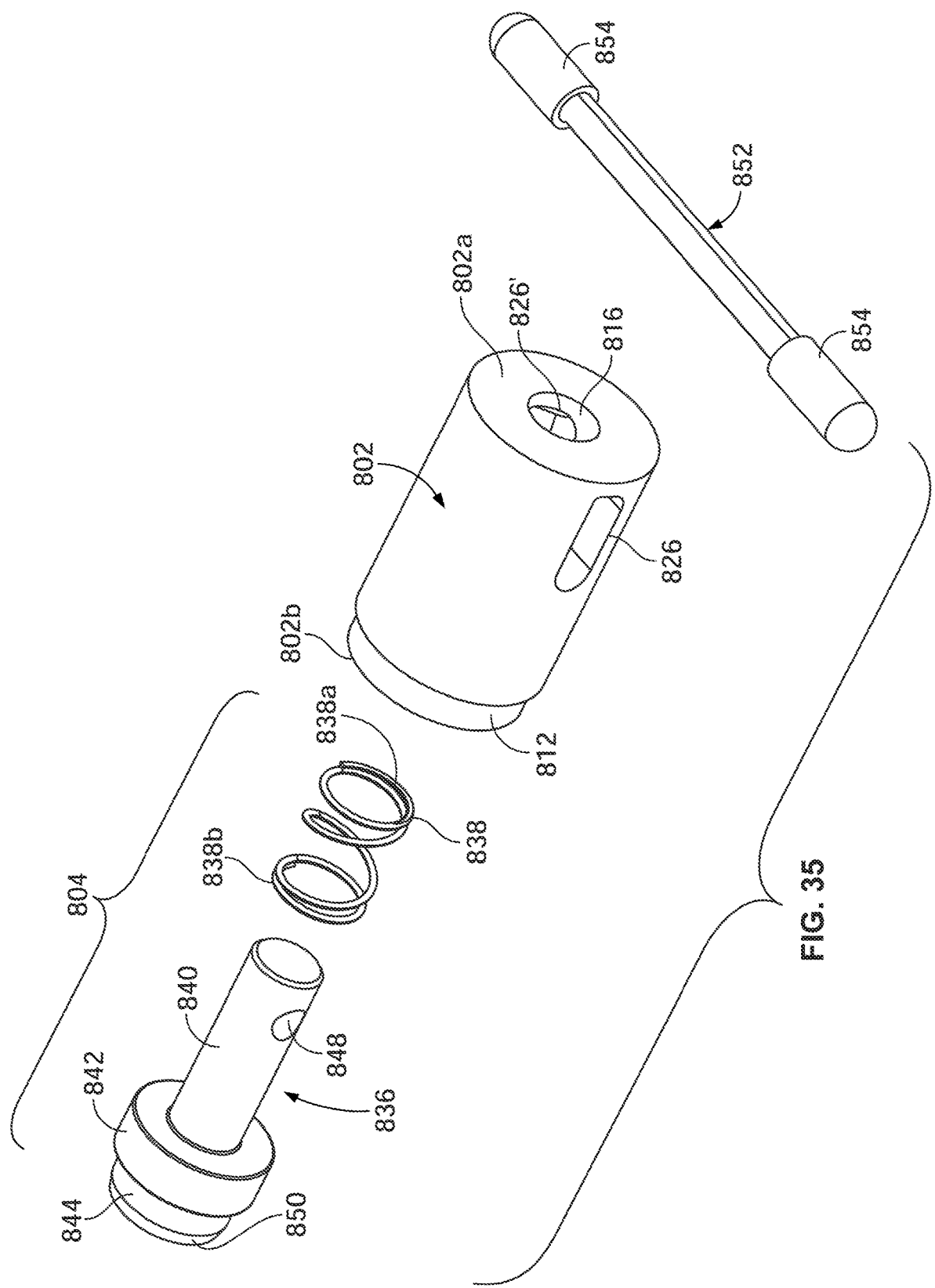
FIG. 35 is an exploded perspective view of the locking mechanism of FIG. 34.
Figure 36:
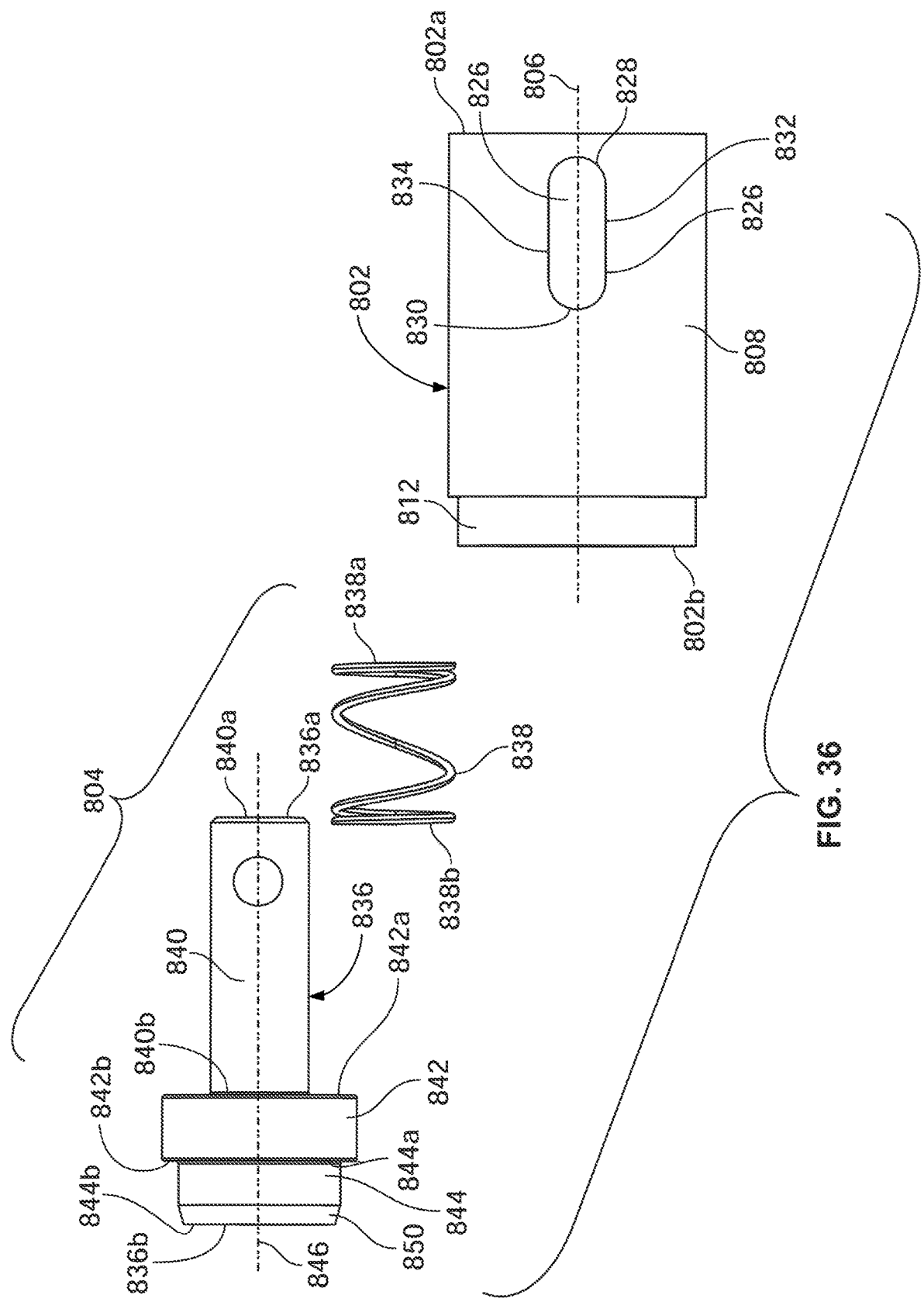
FIG. 36 is an exploded side elevation view of the locking mechanism of FIG. 34.
Figure 37:
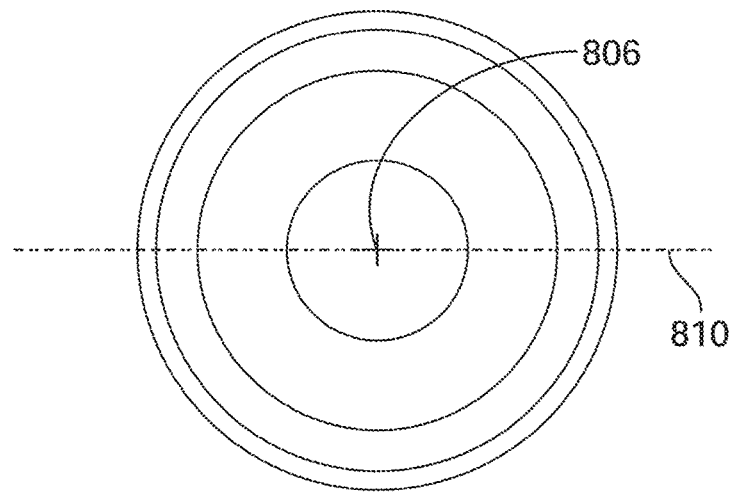
FIG. 37 is an end view of a barrel of the locking mechanism of FIG. 34.
Figure 38:
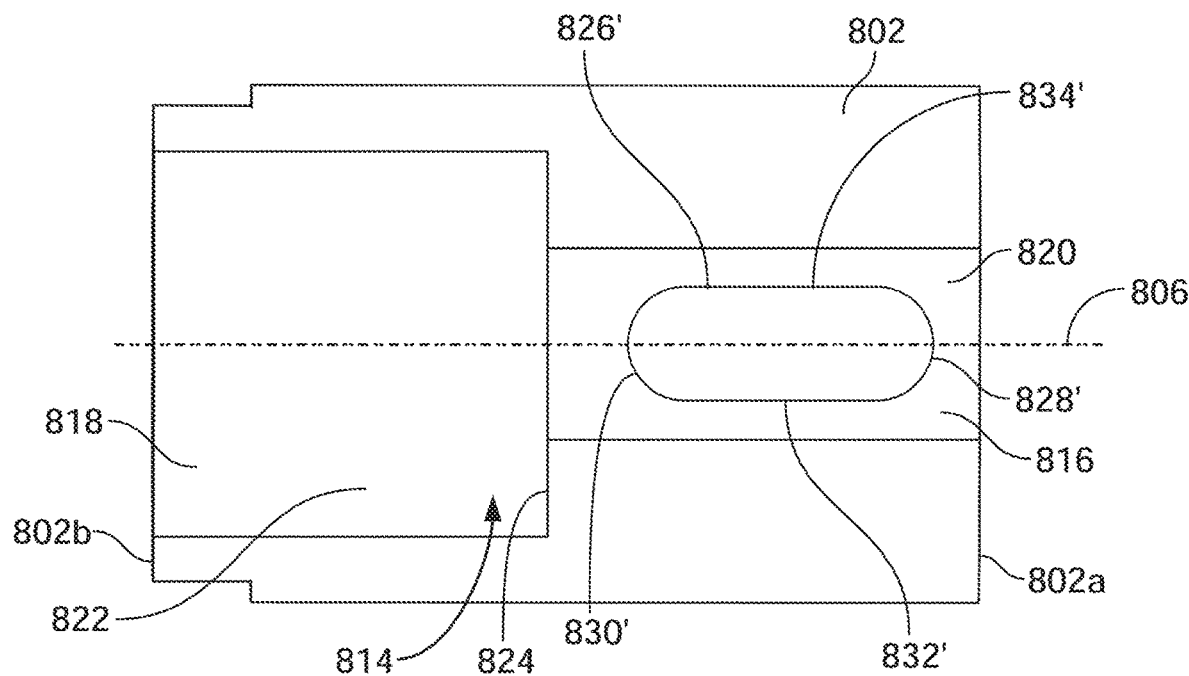
FIG. 38 is a cross-sectional view of the barrel of the locking mechanism of FIG. 34.
Figure 39:
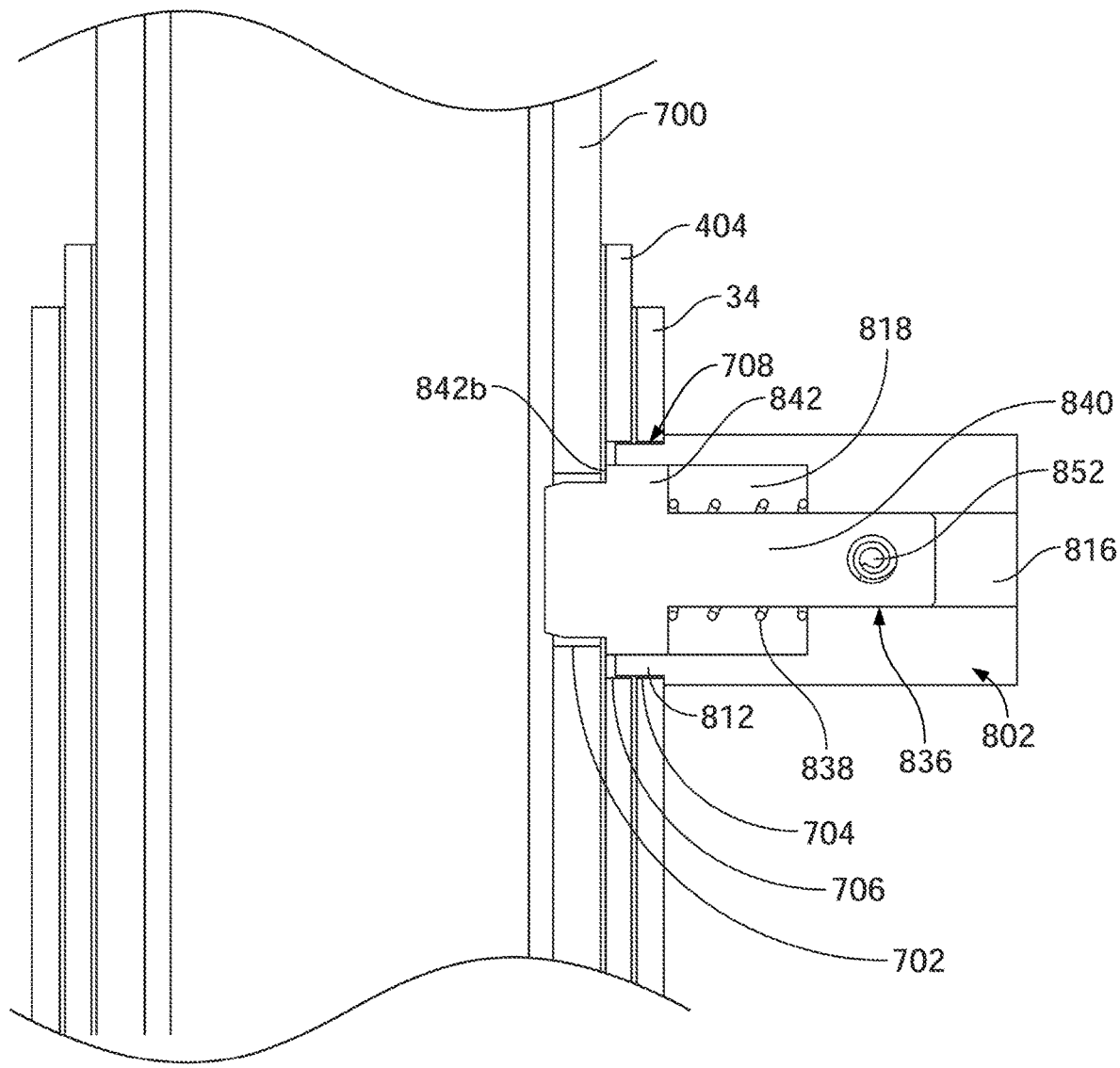
FIG. 39 is a cross-sectional view of the locking mechanism of FIG. 34, the boom and a portion of the wheel assembly, the locking mechanism being shown in an unlocked position.
Figure 40:
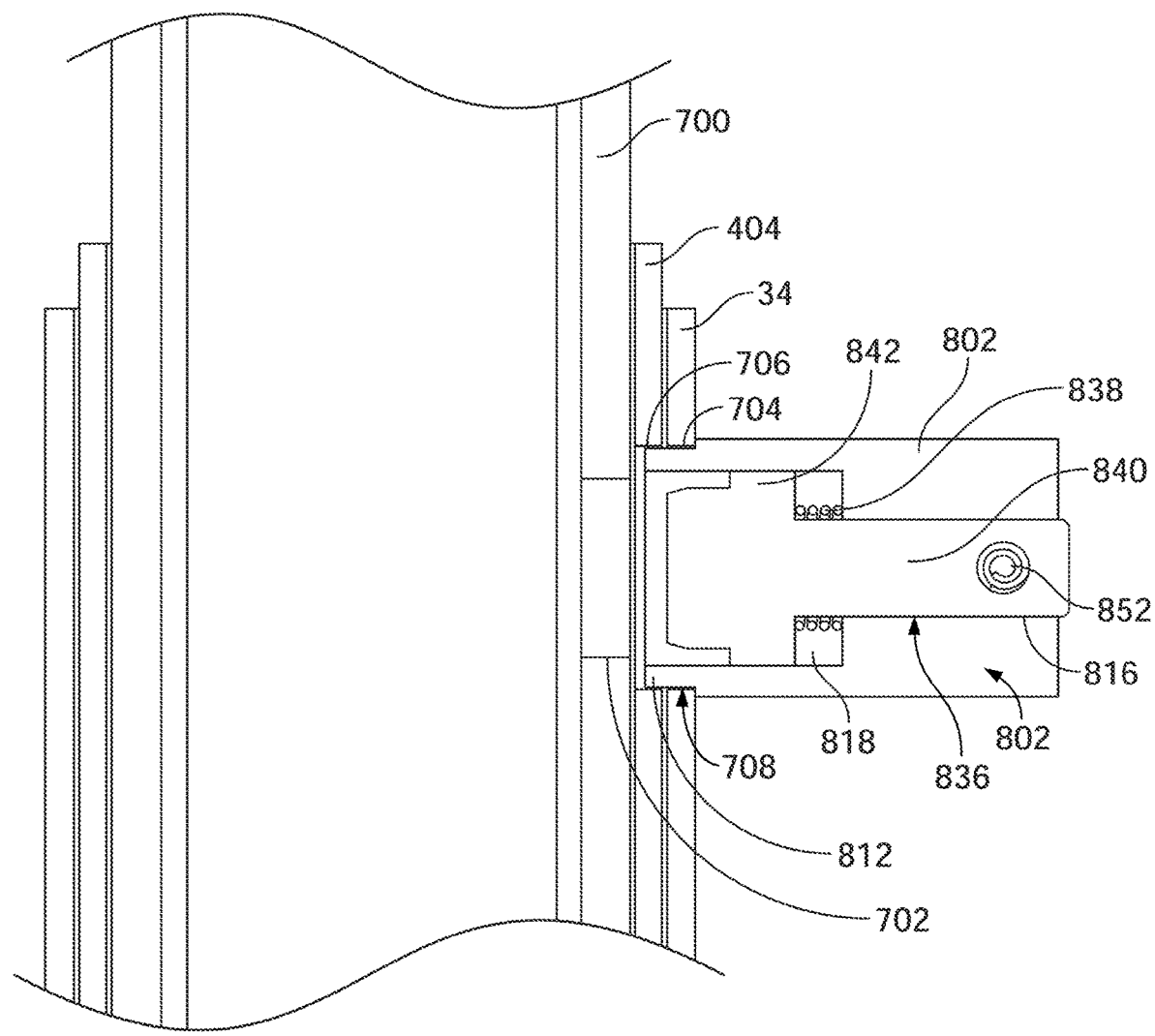
FIG. 40 is a cross-sectional view of the locking mechanism of FIG. 34, the boom and a portion of the wheel assembly, the locking mechanism being shown in a locked position.
Figure 41:
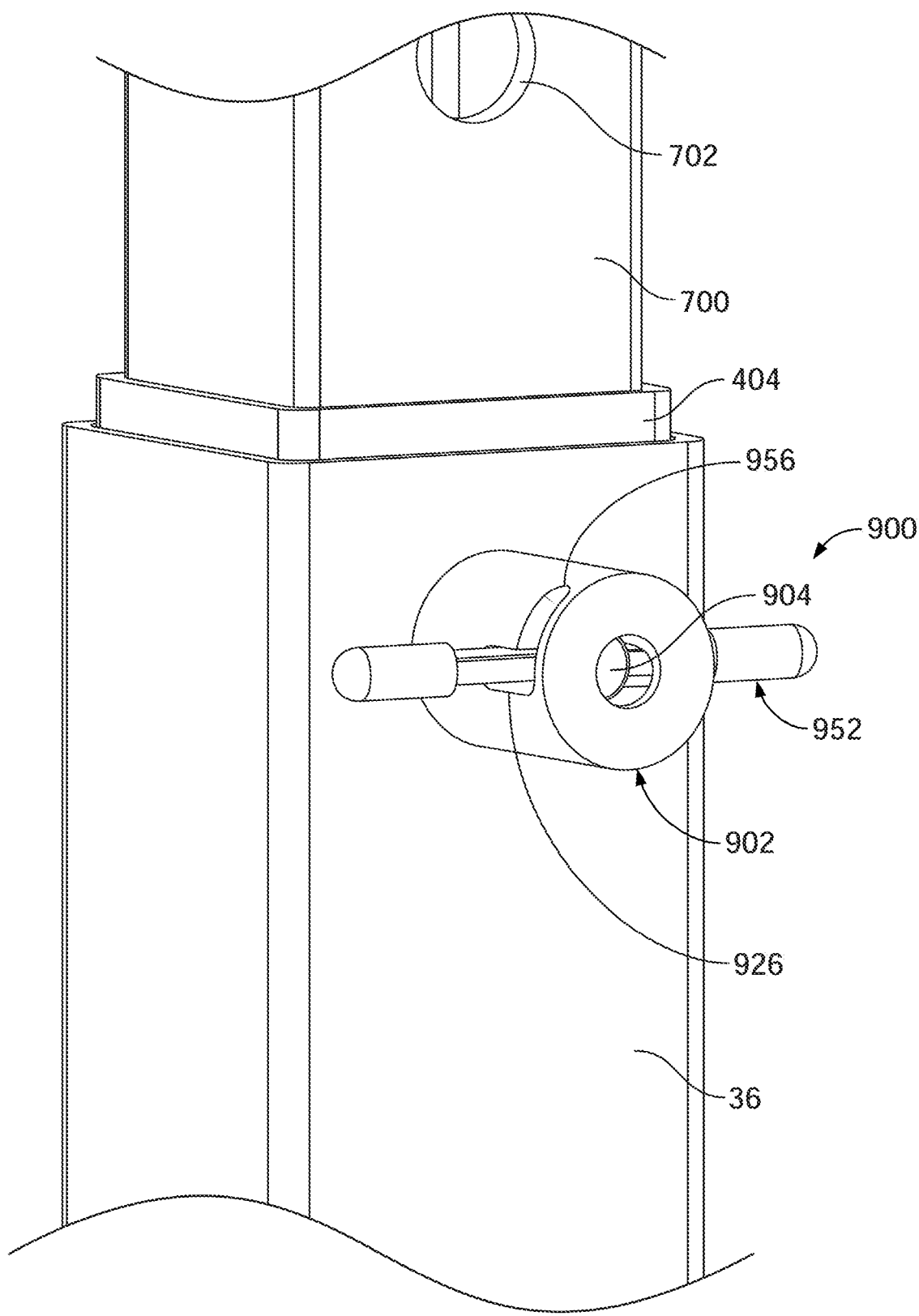
FIG. 41 is a perspective view showing an embodiment of a locking mechanism of the boom in a locked position.
Figure 42:
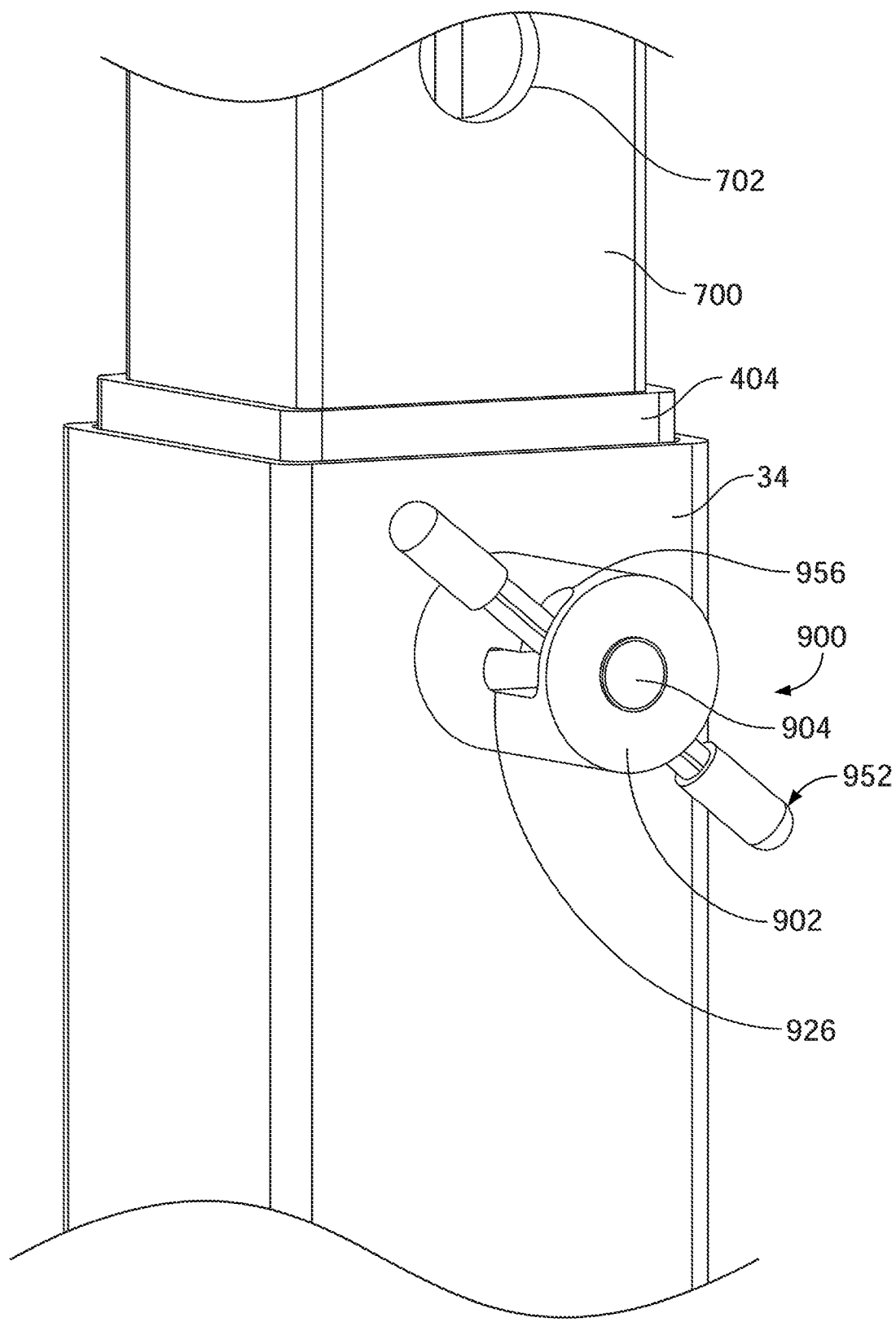
FIG. 42 is a perspective view showing the locking mechanism of FIG. 41 in an unlocked position.
Figure 43:
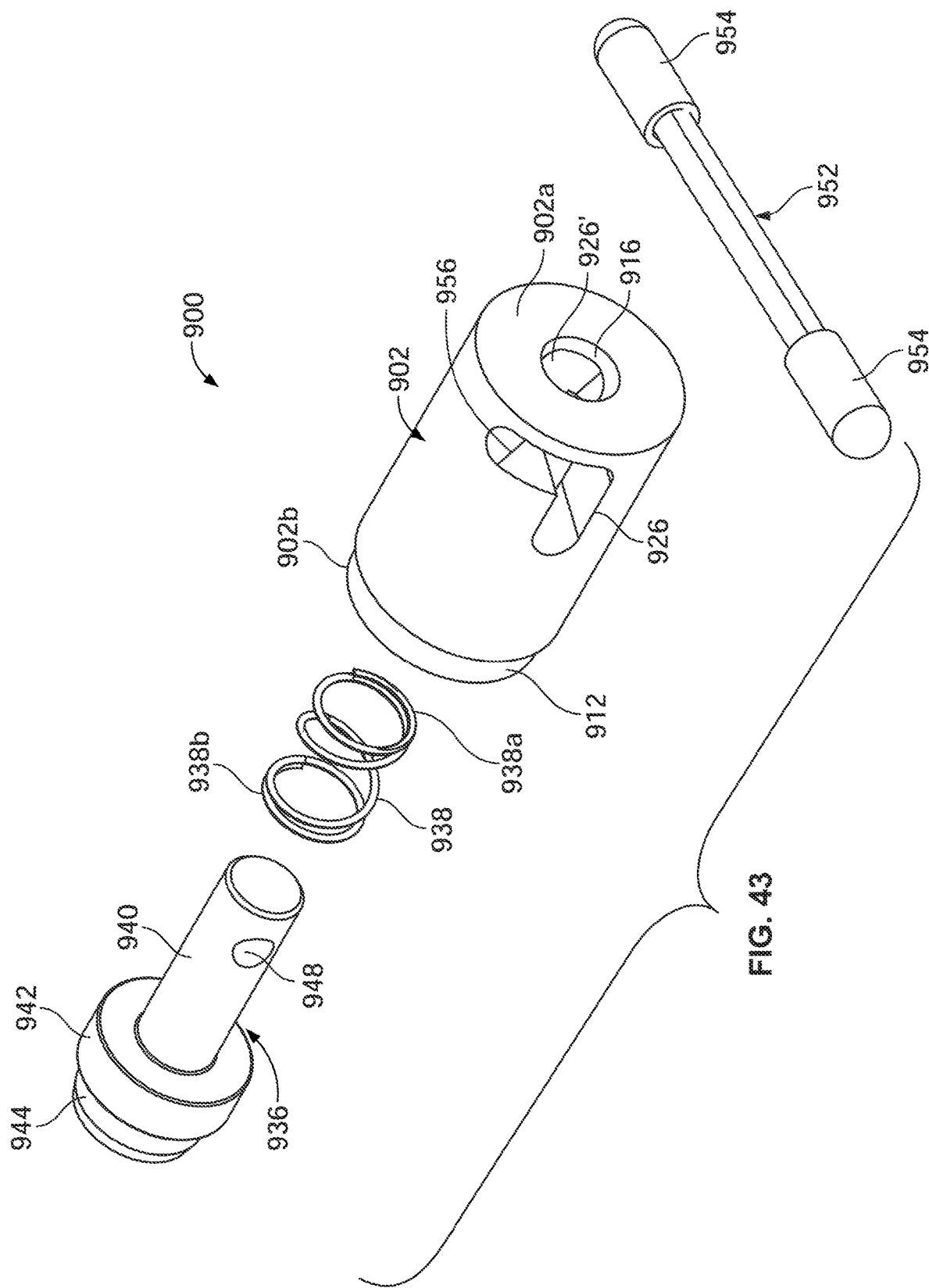
FIG. 43 is an exploded perspective view of the locking mechanism of FIG. 41.
Figure 44:
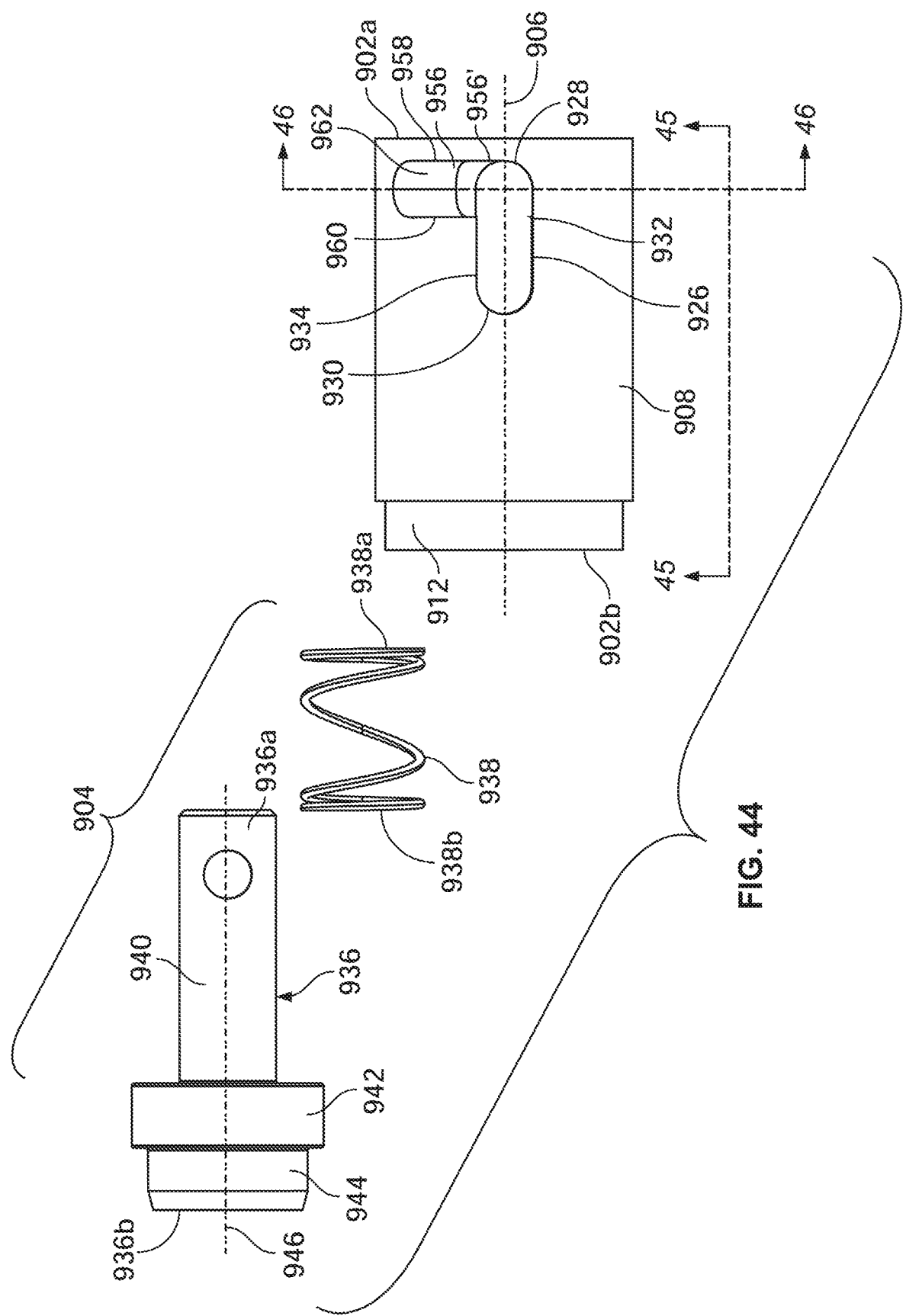
FIG. 44 is an exploded side elevation view of the locking mechanism of FIG. 41.
Figure 45:
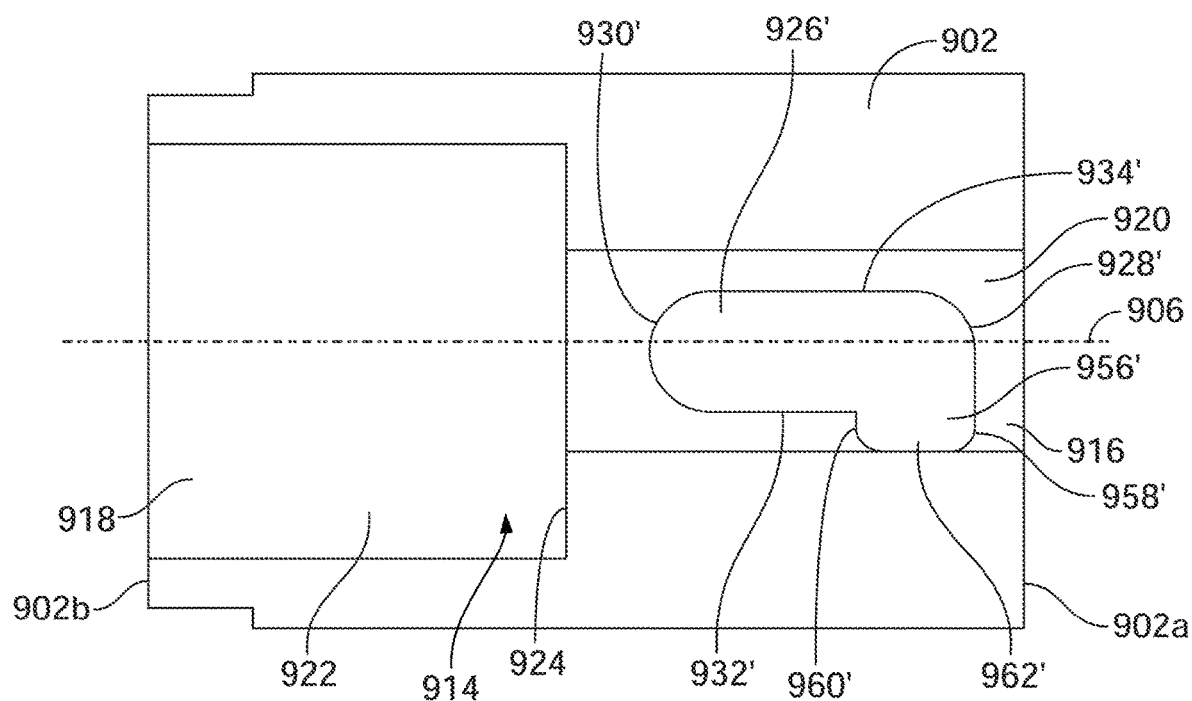
FIG. 45 is a cross-sectional view of a barrel of the locking mechanism along line 45-45 of FIG. 44.

In an embodiment, as shown in FIG. 33, the boom 26 includes an extension member 700 to which the attachment system 38 is attached. The extension member 700 is elongated and has upper and lower opposite ends 700a, 700b which define a length of the extension member 700. The extension member 700 seats within the column 404. The extension member 700 can be moved axially relative to the column 404 and to the body 34 to expose more or less of the length of the extension member 700. The extension member 700 has a plurality of aligned spaced apart apertures 702 therethrough. In an embodiment, the extension member 700 has a shape which mirrors the shape of the column 404 such that the extension member 700 seats snugly within the column 404. In an embodiment, the body 34, the column 404 and the extension member 700 have square cross-sections. In an embodiment, the extension member 700 is formed of four walls which form a square cross-section along its length. In an embodiment, the body 34, the column 404 and the extension member 700 are each formed of a cylindrical wall which defines a circular cross-section.

When the extension member 700 is provided, the body 34 has an aperture 704 therethrough which is proximate to, but spaced from, the upper end 34a of the body 34 and the column 404 has an aperture 706 therethrough which is proximate to, but spaced from, the upper end 34a of the body 34. When the column 404 seats within the body 34, the apertures 704, 706 align with each other to form a passageway 708.

The extension member 700 is seated within the column 404 such that one of the apertures in the extension member 700 aligns with the passageway formed by the apertures in the body 34 and the column 404. The extension member 700 can be slid axially relative to the body 34 and the column 404 to extend the extension member 700 outwardly from the body 34 and the column 404 or can be slid axially relative to the body 34 and the column 404 to retract the extension member 700 inwardly into the body 34 and the column 404. This provides for the extension member 700 to be configured to be placed into a variety of positions relative to the body 34 and the column 404. A locking mechanism 800, 900, 1000, 1100, 1200 secures the extension member 700, the body 34 and the column 404 together into the various positions. In the description of the locking mechanism 800, 900, 1000, 1100, 1200, the directional terms up, upward, down, downward, etc. are used to describe the embodiments. These directional terms are for convenience in description and do not denote a require orientation during use.

In an embodiment as shown in FIGS. 34-40, the locking mechanism 800 includes a barrel 802 and a spring biased plunger assembly 804 mounted within the barrel 802. The locking mechanism 800 may be placed into a locked position wherein the extension member 700 cannot move relative to the body 34/column 404, or may be placed into an unlocked position wherein the extension member 700 is moveable relative to the body 34/column 404.

In an embodiment, the barrel 802 of the locking mechanism 800 has an outer end 802a and an opposite inner end 802b which defines an axial centerline 806 of the barrel 802 which extends along the length of the barrel 802, and an outer surface 808. A transverse centerline 810 is defined relative to the axial centerline 806. In an embodiment, the outer surface 808 of the barrel 802 is cylindrical. In an embodiment, an end portion 812 of the barrel 802 has a reduced outer dimension relative to the remainder of the barrel 802. In an embodiment, the reduced dimension end portion 812 seats within, and is affixed to, the passageway 708 through the body 34 and the column 404. The engagement of the end portion 812 with the body 34 and column 404 prevents the movement of the body 34 and column 404 relative to each other. Other structures for preventing movement of the body 34 and column 404 relative to each other are within the scope of the present disclosure.

A central passageway 814 extends along the axial centerline 806 of the barrel 802 from the outer end 802a to the inner end 802b. The central passageway 814 has an outer portion 816 which extends from the outer end 802a and an inner portion 818 which extends from the inner end 802b. The outer portion 816 is formed by a side wall 820 having a dimension. The inner portion 818 is formed by a side wall 822 having a dimension and an end wall 824. The end wall 824 meets with the side wall 820 of the outer portion 816 at a corner. The side wall 820 of the outer portion 816 has a dimension which is smaller than the dimension of the side wall 822 of the inner portion 818. In an embodiment, the outer portion 816 is cylindrical, the inner portion 818 is cylindrical, and the dimensions are diameters.

A first linear slot 826 extends from the outer surface 808 of the barrel 802 to the outer portion 816 of the central passageway 814. The first slot 826 is formed by an outer wall 828 which is proximate to, but spaced from the outer end 802a of the barrel 802, an inner wall 830 which is proximate to, but spaced from the inner end 802b of the barrel 802, a lower wall 832 extending linearly between the lower ends of the outer and inner walls 828, 830 and which is parallel to the axial centerline 806, and an upper wall 834 extending linearly between the upper ends of the outer and inner walls 828, 830. The lower and upper walls 832, 834 are parallel to the axial centerline 806. When viewed in side elevation, in an embodiment, the outer and inner walls 828, 830 are curved.

A second linear slot 826' extends from the outer surface 808 of the barrel 802 to the outer portion 816 of the central passageway 814. The second slot 826' is formed by an outer wall 828' which is proximate to, but spaced from the outer end 802a of the barrel 802, an inner wall 830' which is proximate to, but spaced from the inner end 802b of the barrel 802, a lower wall 832' extending linearly between the lower ends of the outer and inner walls 828', 830' and which is parallel to the axial centerline 806, and an upper wall 834 extending linearly between the upper ends of the outer and inner walls 828', 830'. The lower and upper walls 832', 834' are parallel to the axial centerline 806. When viewed in side elevation, in an embodiment, the outer and inner walls 828', 830' are curved.

The first and second slots 826, 826' are aligned with each other such that the outer walls 828, 828' align, the inner walls 830, 830' align, the lower walls 832, 832' align, and the upper walls 834, 834' align.

The spring biased plunger assembly 804 includes a plunger 836 and a spring 838.

In an embodiment, the plunger 836 includes an elongated shaft 840, a shoulder 842 connected to the shaft 840, and a head 844 connected to the shoulder 842. A centerline 846 is defined between an outer end 836a of the plunger 836 and an inner end 836b of the plunger 836. The shaft 840 has outer and inner opposite ends 840a, 840b and an outer dimension which is slightly smaller than the outer portion 816 of the passageway 814 in the barrel 802. In an embodiment, a bore 848 is provided through the shaft 840 transverse to the centerline 846 of the plunger 836 and proximate to, but spaced from, the outer end 840a of the shaft 840. The shoulder 842 has outer and inner opposite ends 842a, 842b and an outer dimension which is greater than the outer dimension of the shaft 840 and which is slightly smaller than the inner portion 818 of the passageway 814 in the barrel 802. The outer end 842a of the shoulder 842 is connected to the inner end 840b of the shaft 840. The head 844 has outer and inner opposite ends 844a, 844b and an outer dimension which is less than the outer dimension of the shoulder 842. The outer end 844a of the head 844 is connected to the inner end 842b of the shoulder 842. In an embodiment, each of the shaft 840, the shoulder 842 and the head 844 are cylindrical and the outer dimensions defines outer diameters. In an embodiment, the cylindrical head 844 has a chamfer 850 at the inner end 844b of the head 844. The plunger 836 seats within the passageway 814 such that the shaft 840 seats within the outer portion 816 of the passageway 814 and extends into the inner portion 818 of the passageway 814 and the shoulder 842 and the head 844 seat within the inner portion 818 of the passageway 814. The plunger 836 is moveable relative to the barrel 802 as described herein.

The plunger 836 seats within the passageway 814 such that the shaft 840 seats within the outer portion of the passageway 814 and extends into the inner portion 818 of the passageway 814 and the shoulder 842 and the head 844 seat within the inner portion 818 of the passageway 814. The plunger 836 is moveable relative to the barrel 802 as described herein.

In an embodiment, the spring 838 is a metal coil spring having outer and inner ends 838a, 838b. The spring 838 surrounds the shaft 840 of the plunger 836 and seats within the inner portion 818 of the passageway 814. The outer end 838a of the spring 838 engages against the end wall 824 of the inner portion 818 and the inner end 838b of the spring 838 engages against the outer end 842a of the shoulder 842. In an embodiment, the spring 838 is formed of a compressible member, such as rubber.

In an embodiment, the locking mechanism 800 includes a roll pin or handle 852 attached to the plunger 836 for moving the plunger 836 relative to the barrel 802. The handle 852 includes an elongated linear body. In an embodiment, grip material 854 is provided on ends of the handle 852. In an embodiment, the handle 852 is a one-piece member and is attached to the plunger 836 by extending through the bore 848 in the shaft 840. In an embodiment, the handle 852 is formed of two parts, each of which are attached to the shaft 840. The handle 852 extends through the first and second slots 826, 826'.

In a locked position, the locking mechanism 800 prevents the relative movement between the extension member 700 and the body 34/column 404. In this locked position, the spring 838 is in an expanded condition and bears against the shoulder 842 to bias the head 844 of the plunger 836 outwardly from the inner end 802b of the barrel 802. The inner end 842b of the shoulder 842 engages against the area of the extension member 700 surrounding the aperture 702 and the head 844 extends into the aperture 702, thereby preventing the relative movement between the body 34, the column 404 and the extension member 700. In this locked position, the handle 852 may be proximate to the inner walls 830, 830' of the first and second slots 826, 826'.

To move the locking mechanism 800 to the unlocked position so that the extension member 700 can move relative to the body 34/column 404, the handle 852 is pulled outwardly so that the handle 852 translates outwardly along the first and second slots 826, 826' and the plunger 836 translates outwardly along the passageway 814. During this translation, the spring 838 compresses between the shoulder 842 and the end wall 824. This causes the head 844 of the plunger 836 to withdraw from the aperture 702 in the extension member 700 and into the barrel 802. Once the head 844 is withdrawn from the extension member 700, the extension member 700 can be moved to extend the extension member 700 relative to the body 34/column 404 or to retract the extension member 700 into the body 34/column 404, until a new aperture 702 in the extension member 700 is positioned in alignment with the barrel 802 and the apertures 704, 706 in the body 34/column 404. In an embodiment, the handle 852 is moved to the outer walls 828, 828' of the first and second slots 826, 826' to unlock the locking mechanism 800. Once the extension member 700 is moved to the new position, the handle 852 is released and the spring 838 expands. This causes the handle 852 to translate inwardly along the first and second slots 826, 826', and the plunger 836 to translate inwardly along the passageway 814 such that the head 844 moves into the new aperture 702 in the extension member 700 which is aligned with the barrel 802. The chamfer 850 assists in the head 844 moving into the new aperture 702.

In an alternative embodiment, the first and second linear slots 826, 826' are eliminated and the shaft 840 extends outwardly from the outer end 802a of the barrel 802. A knob (not shown) may be attached to the outer end 840a of the shaft 840 to allow a user to pull the plunger 836 outwardly to disengage the head 844 from the aperture 702.

In an embodiment as shown in FIGS. 41-48, the locking mechanism 900 includes a barrel 902, a spring biased plunger assembly 904 mounted within the barrel 902, and a handle 952 attached to the plunger assembly 904. The locking mechanism 900 may be placed into a locked position wherein the extension member 700 cannot move relative to the body 34/column 404, or may be placed into an unlocked position wherein the extension member 700 is moveable relative to the body 34/column 404.

In an embodiment, the barrel 902 has an outer end 902a and an opposite inner end 902b which defines an axial centerline 906 of the barrel 902 which extends along the length of the barrel 902, and an outer surface 908. A transverse centerline 910 is defined relative to the axial centerline 906. In an embodiment, the outer surface 908 of the barrel 902 is cylindrical. In an embodiment, an end portion 912 of the barrel 902 has a reduced outer dimension relative to the remainder of the barrel 902. In an embodiment, the reduced dimension end portion 912 seats within, and is affixed to, the passageway 708 through the body 34 and the column 404. The engagement of the end portion 912 with the body 34 and column 404 prevents the movement of the body 34 and column 404 relative to each other. Other structures for preventing movement of the body 34 and column 404 relative to each other are within the scope of the present disclosure.

A central passageway 914 extends along the axial centerline 906 of the barrel 902 from the outer end 902a to the inner end 902b. The central passageway 914 has an outer portion 916 which extends from the outer end 902a and an inner portion 918 which extends from the inner end 902b. The outer portion 916 is formed by a side wall 920 having a dimension. The inner portion 918 is formed by a side wall 922 having a dimension and an end wall 924. The end wall 924 meets with the side wall 920 of the outer portion 916 at a corner. The side wall 920 of the outer portion 916 has a dimension which is smaller than the dimension of the side wall 922 of the inner portion 918. In an embodiment, the outer portion 916 is cylindrical, the inner portion 918 is cylindrical, and the dimensions are diameters.

A first linear slot 926 extends from the outer surface 908 of the barrel 902 to the outer portion 916 of the central passageway 914. The first slot 926 is formed by an outer wall 928 which is proximate to, but spaced from the outer end 902a of the barrel 902, an inner wall 930 which is proximate to, but spaced from the inner end 902b of the barrel 902, a lower wall 932 extending linearly between the lower ends of the outer and inner walls 928, 930 and which is parallel to the axial centerline 906, and an upper wall 934 extending linearly between the upper ends of the outer and inner walls 928, 930. The lower and upper walls 932, 934 are parallel to the axial centerline 906. When viewed in side elevation, in an embodiment, the outer and inner walls 928, 930 are curved.

Figure 46:
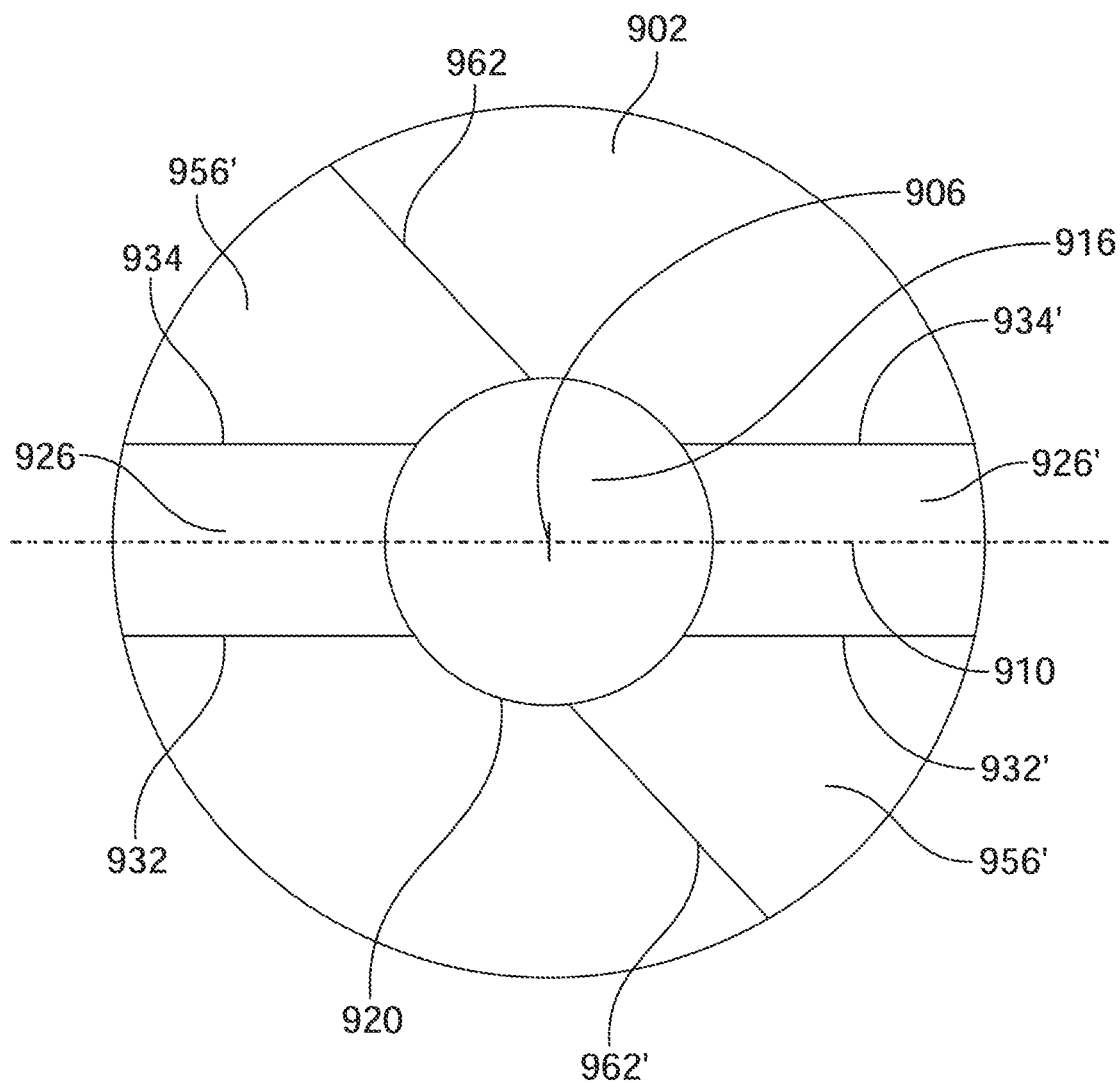
FIG. 46 is a cross-sectional view of the barrel along line 46-46 of FIG. 44.
Figure 47:
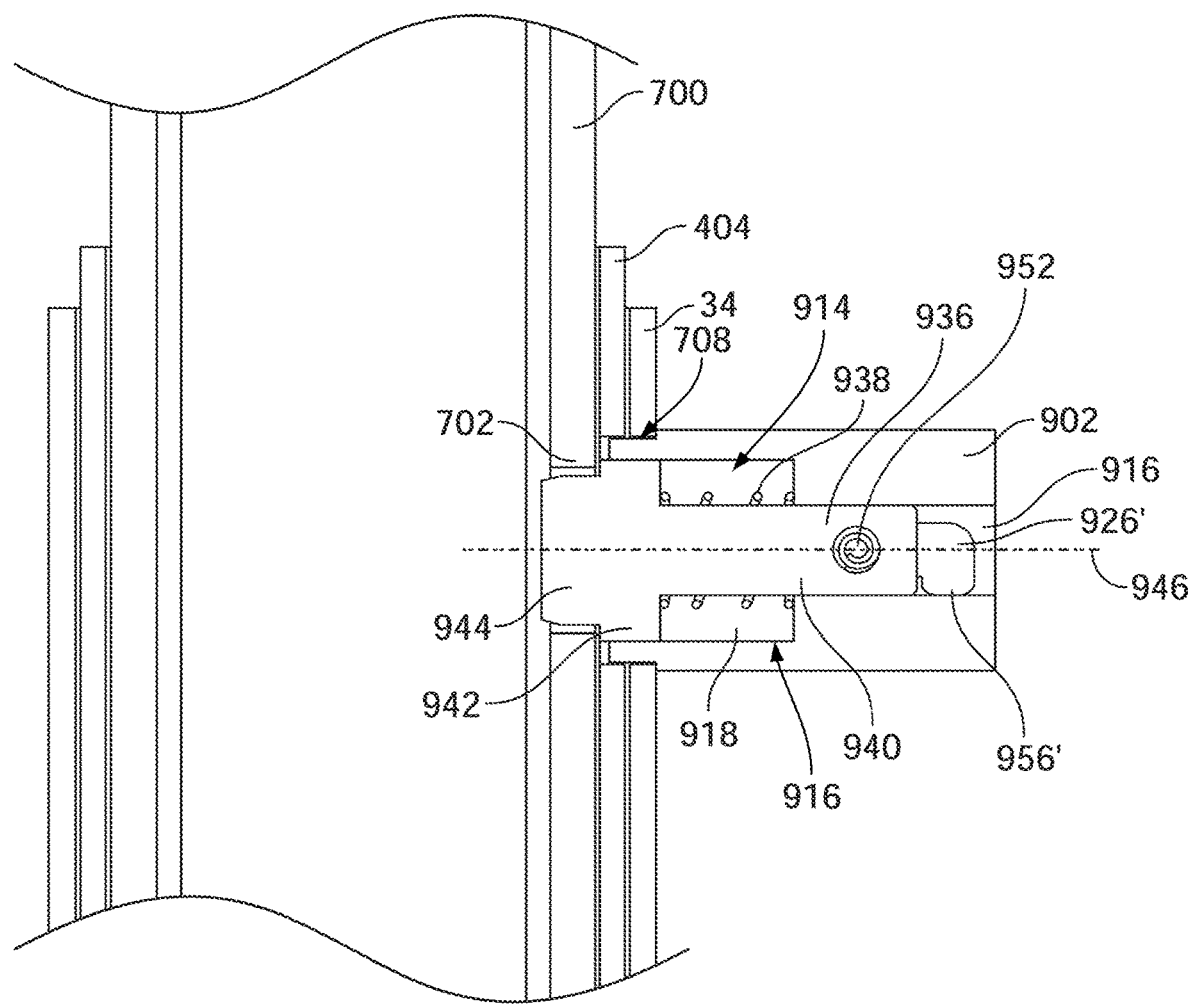
FIG. 47 is a cross-sectional view of the locking mechanism of FIG. 41, the boom and a portion of the wheel assembly, the locking mechanism being shown in a locked position.
Figure 48:
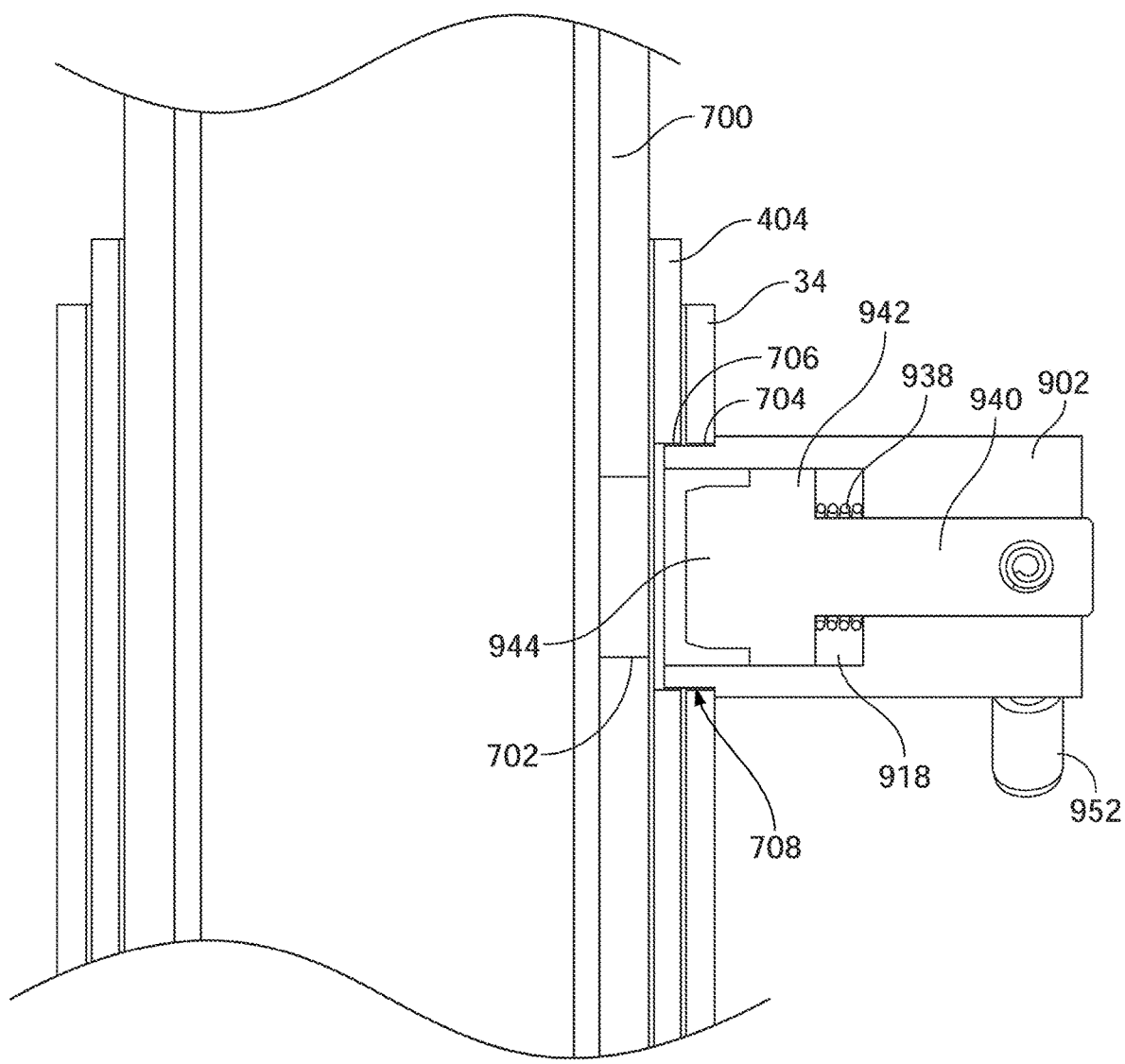
FIG. 48 is a cross-sectional view of the locking mechanism of FIG. 41, the boom and a portion of the wheel assembly, the locking mechanism being shown in an unlocked position.

A slot 956 extends perpendicularly upwardly from the upper wall 934 of the first slot 926 and extends from the outer surface 908 of the barrel 902 to the outer portion 916 of the central passageway 914. The slot 956 is proximate to the outer end of the upper wall 934, such that the first slot 926 and the slot 956 form a generally L-shaped slot. The slot 956 is formed by an outer wall 958 extending linearly upwardly from the upper end of the outer wall 928 of the first slot 926 and parallel to the transverse centerline 910, an inner wall 960 extending linearly upwardly from the upper wall 934 of the first slot 926, and which is parallel to the transverse centerline 910 and parallel to the outer wall 958, and an end wall 962 extending between the upper ends of the outer and inner walls 958, 960. The outer and inner walls 958, 960 of the slot 956 are perpendicular to the lower and upper walls 932, 934 of the first slot 926. As shown in FIG. 46, the end wall 962 of the slot 956 is formed by a surface which is angled relative to the transverse centerline 910. In an embodiment, the surface is angled at 47 degrees or about 47 degrees. When viewed in side elevation, in an embodiment, the end wall 962 is curved.

A second linear slot 926' extends from the outer surface 908 of the barrel 902 to the outer portion 916 of the central passageway 914. The second slot 926' is formed by an outer wall 928' which is proximate to, but spaced from the outer end 902a of the barrel 902, an inner wall 930' which is proximate to, but spaced from the inner end 902b of the barrel 902, a lower wall 932' extending linearly between the lower ends of the outer and inner walls 928', 930' and which is parallel to the axial centerline 906, and an upper wall 934' extending linearly between the upper ends of the outer and inner walls 928', 930'. The lower and upper walls 932', 934' are parallel to the axial centerline 906. When viewed in side elevation, in an embodiment, the outer and inner walls 928', 930' are curved.

The first and second slots 926, 926' are aligned with each other such that the outer walls 928, 928' align, the inner walls 930, 930' align, the lower walls 932, 932' align, and the upper walls 934, 934' align.

A slot 956' extends perpendicularly downwardly from the lower wall 932' of the second slot 926' and extends from the outer surface 908 of the barrel 902 to the outer portion 916 of the central passageway 914. The slot 956' is proximate to the outer end of the lower wall 932', such that the second slot 926' and the slot 956' form a generally L-shaped slot. The slot 956' is formed by an outer wall 958' extending linearly downwardly from the lower end of the outer wall 928' of the second slot 926' and parallel to the transverse centerline 910, an inner wall 960' extending linearly downwardly from the lower wall 932' of the second slot 926', and which is parallel to the transverse centerline 910 and parallel to the outer wall 958', and an end wall 962' extending between the lower ends of the outer and inner walls 958', 960'. The outer and inner walls 958', 960' of the slot 956' are perpendicular to the lower and upper walls 932', 934' of the second slot 926'. As shown in FIG. 46, the end wall 962' of the slot 956' is formed by a surface which is angled relative to the transverse centerline 910. In an embodiment, the surface is angled at 47 degrees or about 47 degrees. When viewed in side elevation, in an embodiment, the end wall 962' is curved.

The outer walls 958, 958' are in the same plane and the inner walls 960, 960' are in the same plane. The end walls 962, 962' are parallel to each other, but offset from each other.

The spring biased plunger assembly 904 includes a plunger 936 and a spring 938.

In an embodiment, the plunger 936 includes an elongated shaft 940, a shoulder 942 connected to the shaft 940, and a head 944 connected to the shoulder 942. A centerline 946 is defined between an outer end 936a of the plunger 936 and an inner end 936b of the plunger 936. The shaft 940 has outer and inner opposite ends 940a, 940b and an outer dimension which is slightly smaller than the outer portion 916 of the passageway 914 in the barrel 902. In an embodiment, a bore 948 is provided through the shaft 940 transverse to the centerline 946 of the plunger 936 and proximate to, but spaced from, the outer end 940a of the shaft 940. The shoulder 942 has outer and inner opposite ends 942a, 942b and an outer dimension which is greater than the outer dimension of the shaft 940 and which is slightly smaller than the inner portion 918 of the passageway 914 in the barrel 902. The outer end 942a of the shoulder 942 is connected to the inner end 940b of the shaft 940. The head 944 has outer and inner opposite ends 944a, 944b and an outer dimension which is less than the outer dimension of the shoulder 942. The outer end 944a of the head 944 is connected to the inner end 942b of the shoulder 942. In an embodiment, each of the shaft 940, the shoulder 942 and the head 944 are cylindrical and the outer dimensions defines outer diameters. In an embodiment, the cylindrical head 944 has a chamfer 950 at the inner end 944b of the head 944.

The plunger 936 seats within the passageway 914 such that the shaft 940 seats within the outer portion 916 of the passageway 914 and extends into the inner portion 918 of the passageway 914 and the shoulder 942 and the head 944 seat within the inner portion 918 of the passageway 914. The plunger 936 is moveable relative to the barrel 902 as described herein.

In an embodiment, the spring 938 is a metal coil spring having outer and inner ends 938a, 938b. The spring 938 surrounds the shaft 940 of the plunger 936 and seats within the inner portion 918 of the passageway 914. The outer end 938a of the spring 938 engages against the end wall 924 of the inner portion 918 and the inner end 938b of the spring 938 engages against the outer end 942a of the shoulder 942. In an embodiment, the spring 938 is formed of a compressible member, such as rubber.

In an embodiment, the handle 952 is attached to the plunger 936 for moving the plunger 936 relative to the barrel 902. The handle 952 includes an elongated linear body. In an embodiment, grip material 954 is provided on ends of the handle 952. In an embodiment, the handle 952 is a one-piece member and is attached to the plunger 936 by extending through the bore 948 in the shaft 940. In an embodiment, the handle 952 is formed of two parts, each of which are attached to the shaft 940. The handle 952 extends through the first and second slots 926, 926' or through the slots 956, 956' as discussed herein.

In a locked position, the locking mechanism 900 prevents the relative movement between the extension member 700 and the body 34/column 404. In this locked position, the spring 938 is in an expanded condition and bears against the shoulder 942 to bias the head 944 of the plunger 936 outwardly from the inner end 902b of the barrel 902. The inner end 942b of the shoulder 942 engages against the area of the extension member 700 surrounding the aperture 702 and the head 944 extends into the aperture 702, thereby preventing the relative movement between the body 34, the column 404 and the extension member 700. In this locked position, the handle 952 may be proximate to the inner walls 930, 930' of the first and second slots 926, 926'.

To move the locking mechanism 900 to the unlocked position so that the extension member 700 can move relative to the body 34/column 404, the handle 952 is pulled outwardly so that the handle 952 translates outwardly along the first and second slots 926, 926' and the plunger 936 translates outwardly along the passageway 914. During this translation, the spring 938 compresses between the shoulder 942 and the end wall 924. This causes the head 944 of the plunger 936 to withdraw from the aperture 702 in the extension member 700 and into the barrel 902. Once the head 944 is withdrawn from the extension member 700, the extension member 700 can be moved to extend the extension member 700 relative to the body 34/column 404 or to retract the extension member 700 into the body 34/column 404, until a new aperture 702 in the extension member 700 is positioned in alignment with the barrel 902 and the apertures 704, 706 in the body 34/column 404. In order to maintain the unlocked position, once the handle 952 is positioned at the outer walls 928, 928' of the first and second slots 926, 926', the handle 952 is rotated so that the handle 952 translates along the slots 956, 956'. This may allow a user to more easily manipulate the extension member 700. Once the extension member 700 is moved to the new position, the handle 952 is rotated to first translate along slots 956, 956' until the handle 952 engages against the outer walls 928, 928' of the first and second slots 926, 926' and then the handle 952 is released. The spring 938 then expands which causes the handle 952 and to translate inwardly along the first and second slots 926, 926', and causes the plunger 936 to translate inwardly along the passageway 914 such that the head 944 moves into the new aperture 702 in the extension member 700 which is aligned with the barrel 902. The chamfer 950 assists in the head 944 moving into the new aperture 702.

Figure 49:
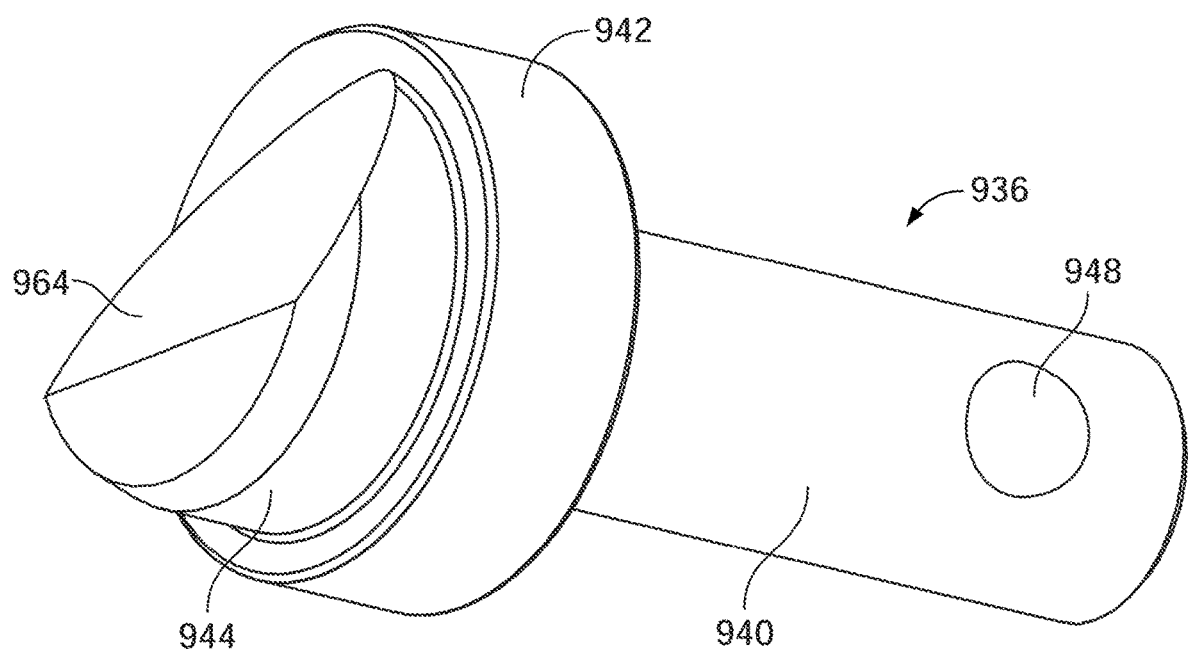
FIG. 49 is a perspective view of a plunger that may be used with the locking mechanism.
Figure 50:
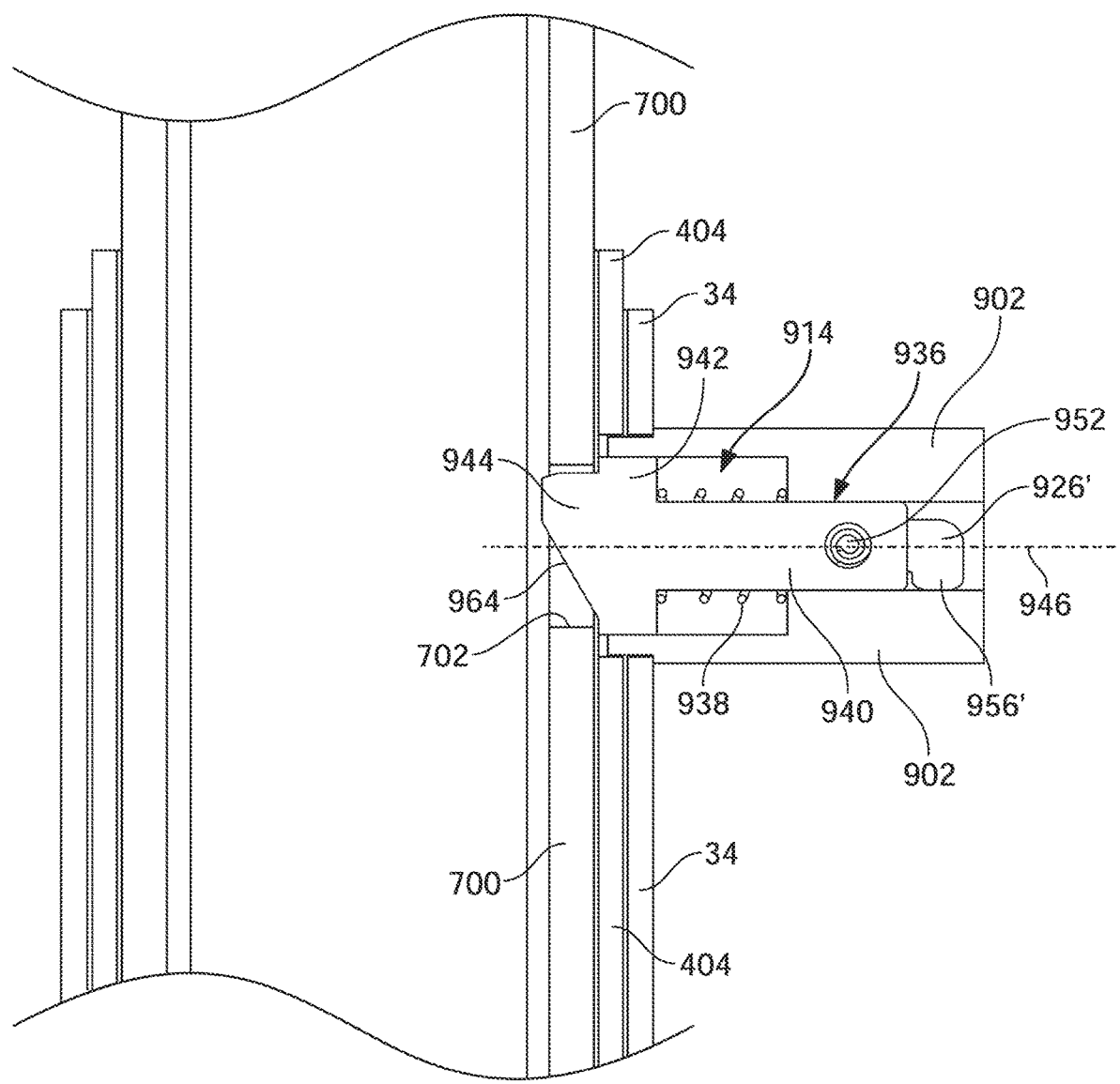
FIG. 50 is a cross-sectional view of the locking mechanism of FIG. 41, the boom and a portion of the wheel assembly, and the plunger of FIG. 49, the locking mechanism being shown in a locked position.
Figure 51:
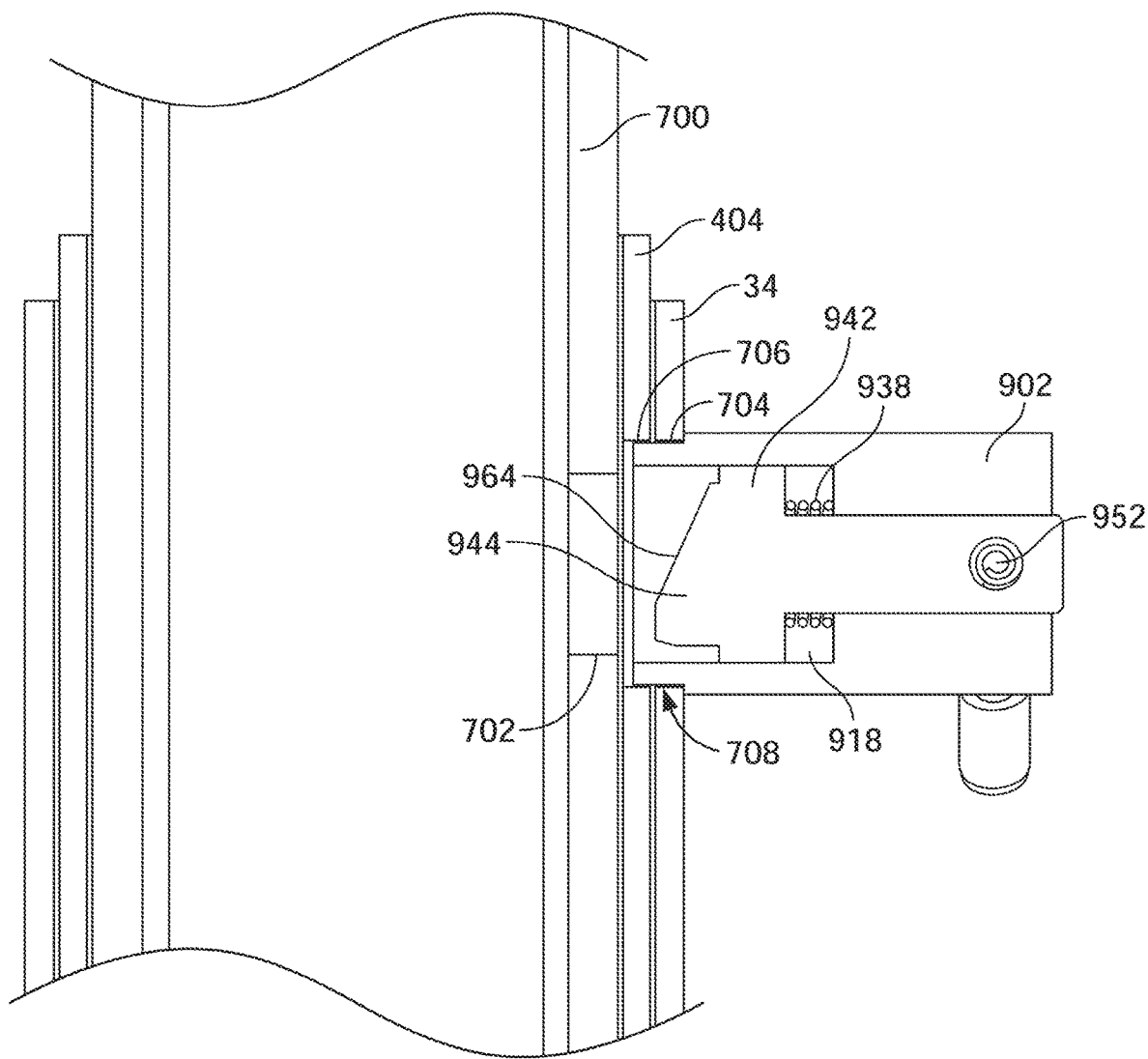
FIG. 51 is a cross-sectional view of the locking mechanism of FIG. 41, the boom and a portion of the wheel assembly, and the plunger of FIG. 49, the locking mechanism being shown in an unlocked position.
Figure 52:
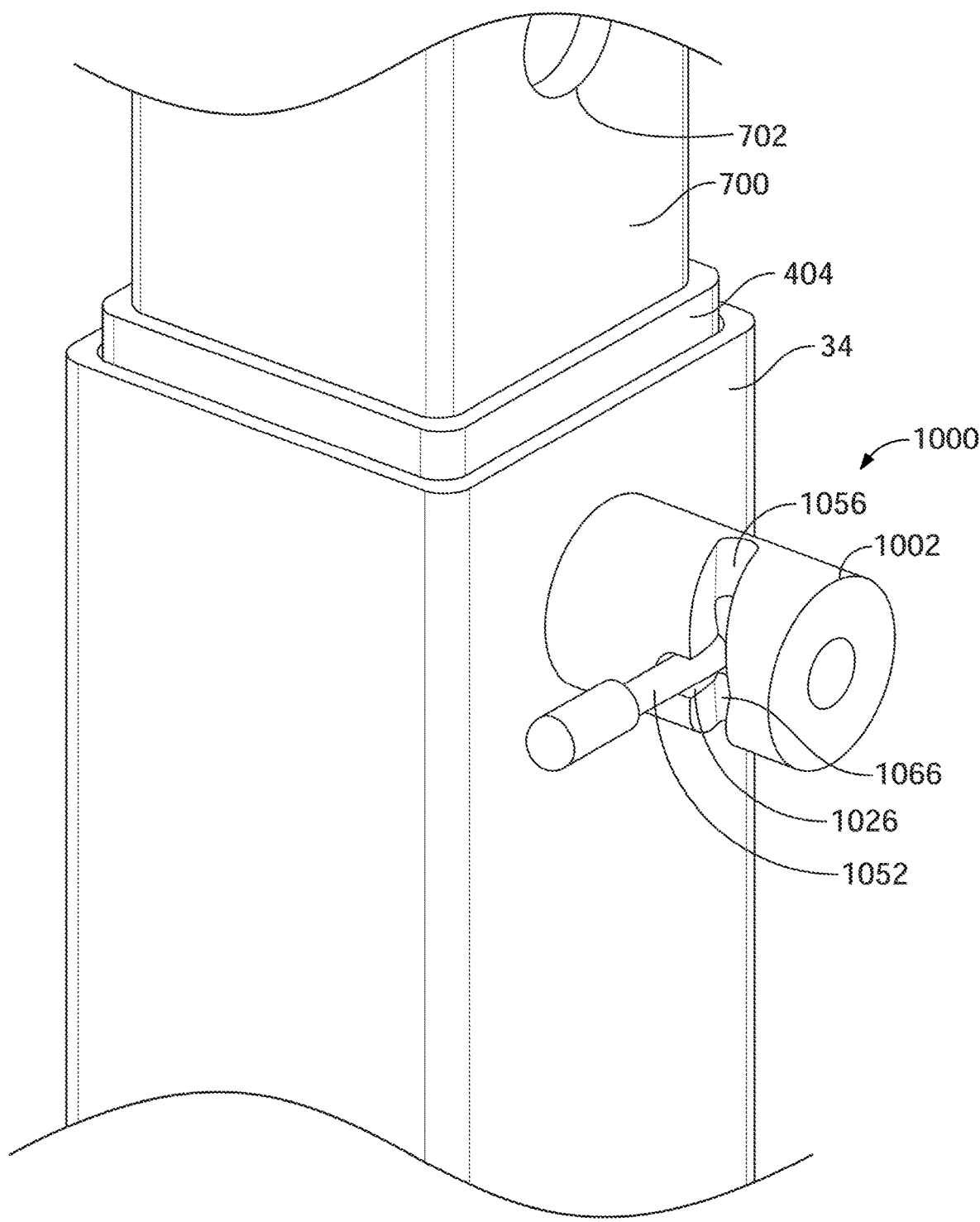
FIG. 52 is a perspective view showing an embodiment of a locking mechanism of the boom, the locking mechanism being shown in a locked position.
Figure 53:
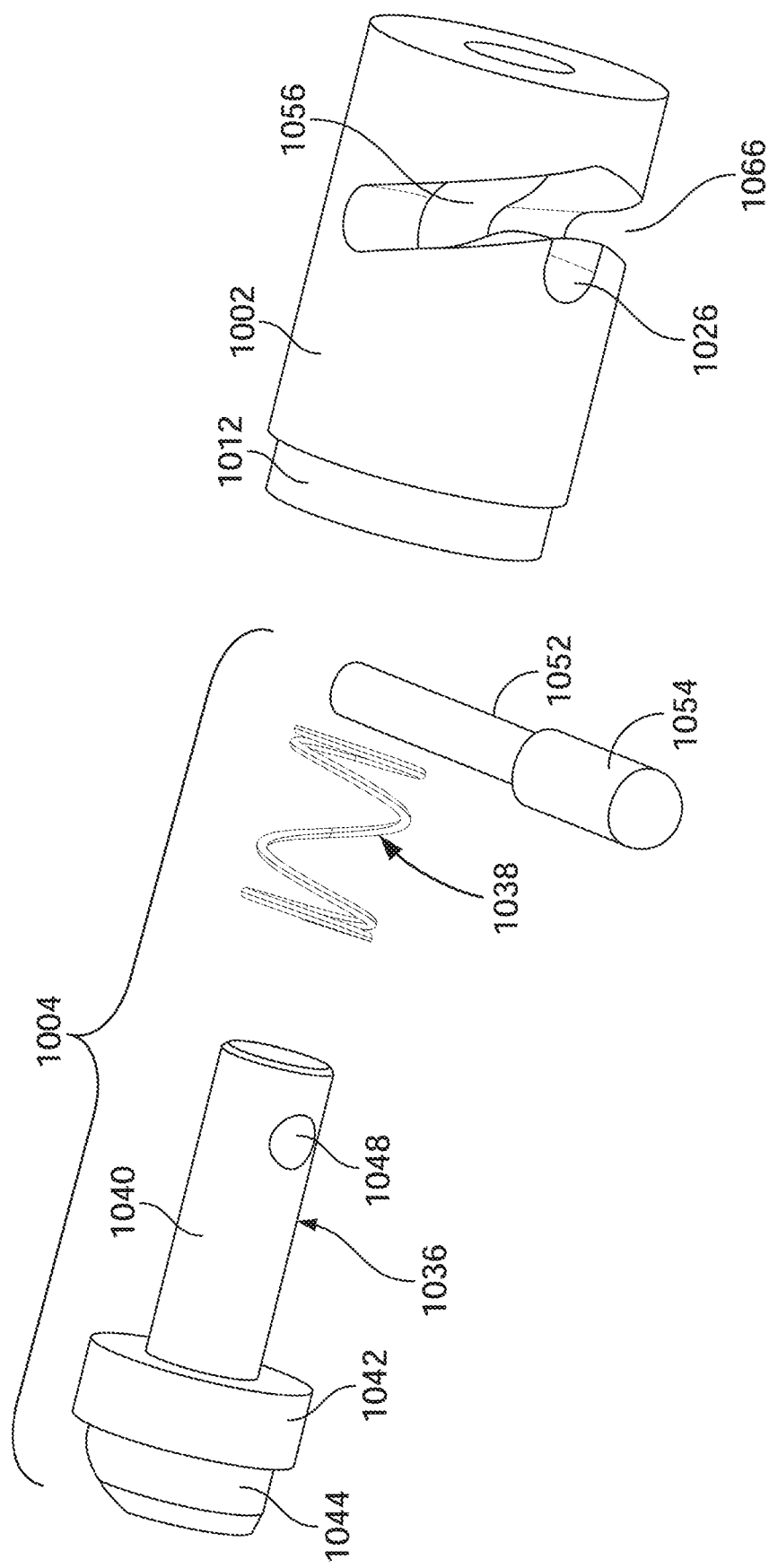
FIG. 53 is an exploded perspective view of the locking mechanism of FIG. 52.
Figure 54:
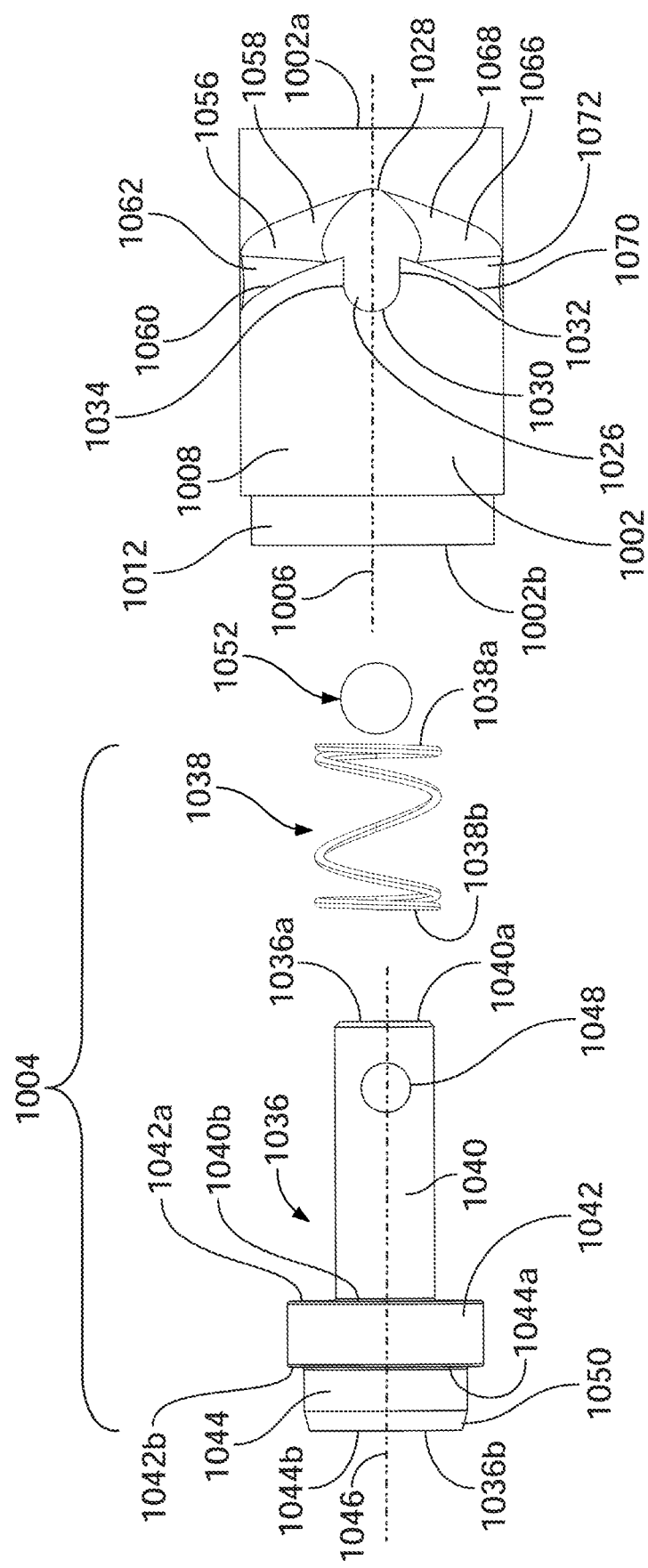
FIG. 54 is an exploded side elevation view of the locking mechanism of FIG. 52.
Figure 55:
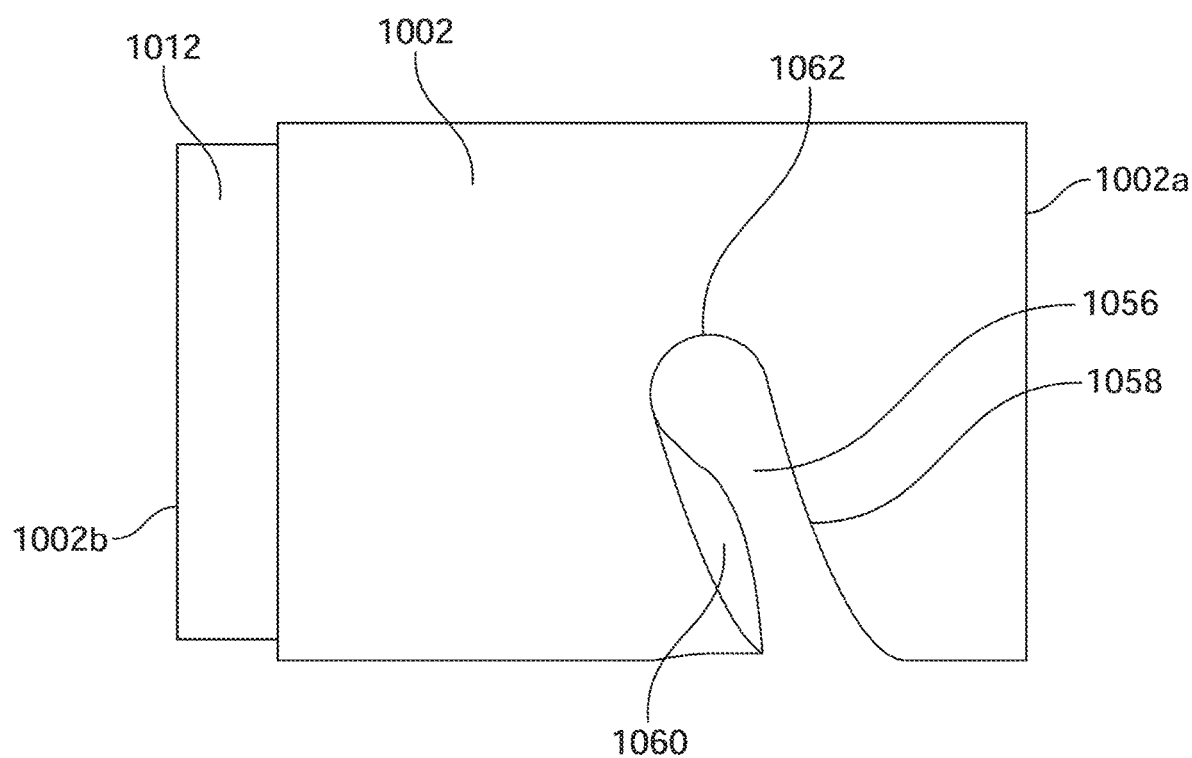
FIG. 55 is a top plan view of a barrel of the locking mechanism of FIG. 52.
Figure 56:
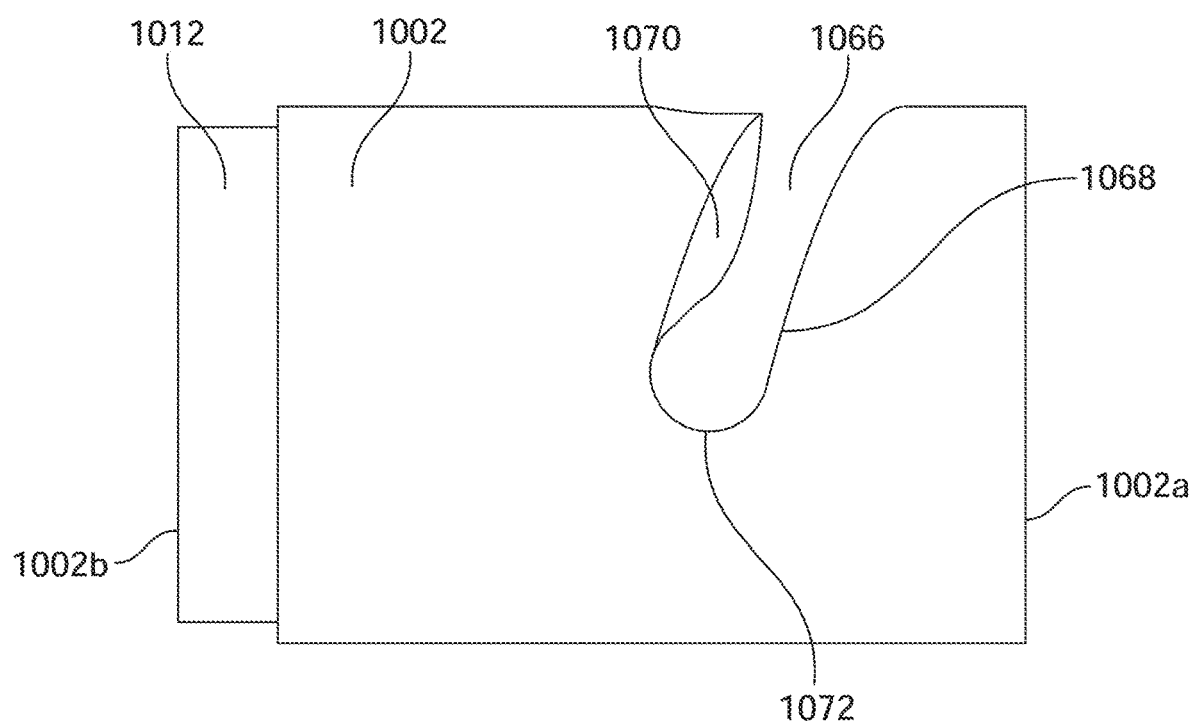
FIG. 56 is a bottom plan view of the barrel of the locking mechanism of FIG. 52.
Figure 57:
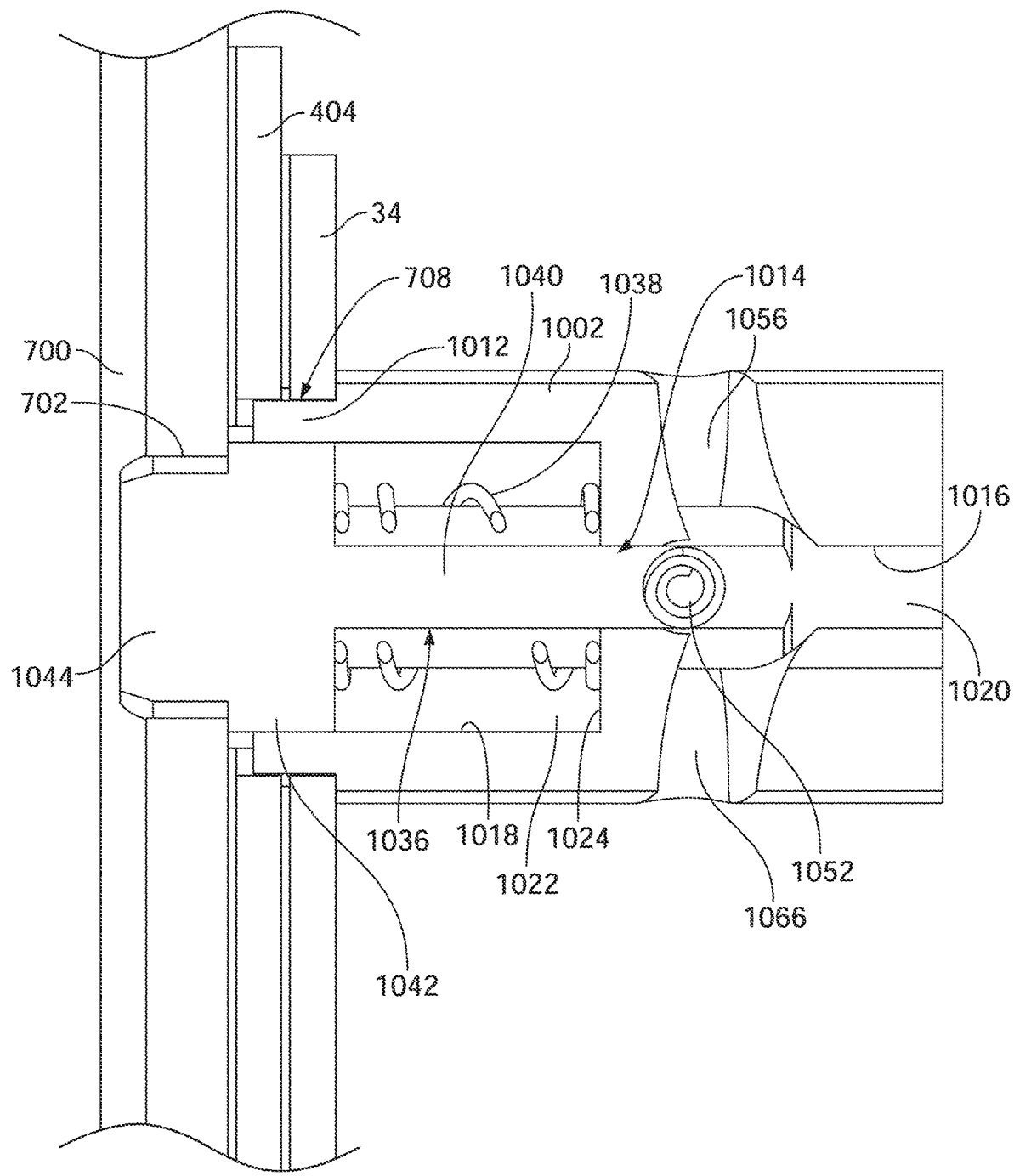
FIG. 57 is a cross-sectional view of the locking mechanism of FIG. 52, the boom and a portion of the wheel assembly, the locking mechanism being shown in a locked position.

In an embodiment as shown in FIGS. 49-51, the cylindrical head 944 has a front face 964 which is angled at an angle of 60 degrees or about 60 degrees from the centerline 946 of the plunger 936. When in the locked position, the locking mechanism 900 prevents the retraction of the extension member 700 into the body 34/column 404. In this locked position, the spring 938 is in an expanded condition and bears against the shoulder 942 to bias the head 944 of the plunger 936 outwardly from the inner end 902b of the barrel 902. The inner end 942b of the shoulder 942 engages against the area of the extension member 700 surrounding the aperture 702 and the head 944 extends into the aperture 702. The angled front face 964 is proximate to and engages the lower edge of the aperture 702. When the extension member 700 is pushed into the body 34/column 404, the upper edge of the aperture 702 engages the cylindrical portion of the head 944 and this thereby prevents the extension member 700 from being pushed into the body 34/column 404. When in the locked position, however, the extension member 700 can be pulled outwardly from the body 34/column 404. When the extension member 700 is pulled outwardly, the lower edge of the aperture 702 engages the angled front face 964 of the plunger 936 which causes the plunger 936 to move outwardly and into the barrel 902 as the lower edge of the aperture 702 moves along the angled front face 964. Once the head 944 is retracted out of the aperture 702, the extension member 700 can be further slid relative to the body 34/column 404 until a new aperture 702 is aligned with the head 944. Once the new aperture 702 is aligned with the plunger 936, the spring 938 will expand to cause the plunger 936 to move inwardly and out of the barrel 902 to cause the head 944 to enter into the new aperture 702. If desired, the extension member 700 may be further pulled outwardly from the body 34/column 404 and the process repeats itself with the new aperture 702 such that the extension member 700 is ratcheted outwardly from the body 34/column 404. Once the extension member 700 is in the desired position, the head 944 is allowed to enter into the appropriate aperture 702.

While this angled front face 964 has been described with regard to locking mechanism 900, this angled front face 964 may also be used with the plunger 836 of the locking mechanism 800.

In an embodiment as shown in FIGS. 52-61, the locking mechanism 1000 includes a barrel 1002, a spring biased plunger assembly 1004 mounted within the barrel 1002, and a handle 1052 attached to the plunger assembly 1004. The locking mechanism 1000 may be placed into a locked position wherein the extension member 700 cannot move relative to the body 34/column 404, or may be placed into unlocked positions wherein the extension member 700 is moveable relative to the body 34/column 404.

In an embodiment, the barrel 1002 has an outer end 1002a and an opposite inner end 1002b which defines an axial centerline 1006 of the barrel 1002 which extends along the length of the barrel 1002, and an outer surface 1008. A transverse centerline is defined relative to the axial centerline 1006. In an embodiment, the outer surface 1008 of the barrel 1002 is cylindrical. In an embodiment, an end portion 1012 of the barrel 1002 has a reduced outer dimension relative to the remainder of the barrel 1002. In an embodiment, the reduced dimension end portion 1012 seats within, and is affixed to, the passageway 708 through the body 34 and the column 404. The engagement of the end portion 1012 with the body 34 and column 404 prevents the movement of the body 34 and column 404 relative to each other. Other structures for preventing movement of the body 34 and column 404 relative to each other are within the scope of the present disclosure.

A central passageway 1014 extends along the axial centerline 1006 of the barrel 1002 from the outer end 1002a to the inner end 1002b. The central passageway 1014 has an outer portion 1016 which extends from the outer end 1002a and an inner portion 1018 which extends from the inner end 1002b. The outer portion 1016 is formed by a side wall 1020 having a dimension. The inner portion 1018 is formed by a side wall 1022 having a dimension and an end wall 1024. The end wall 1024 meets with the side wall 1020 of the outer portion 1016 at a corner. The side wall 1020 of the outer portion 1016 has a dimension which is smaller than the dimension of the side wall 1022 of the inner portion 1018. In an embodiment, the outer portion 1016 is cylindrical, the inner portion 1018 is cylindrical, and the dimensions are diameters.

A linear slot 1026 extends from the outer surface 1008 of the barrel 1002 to the outer portion 1016 of the central passageway 1014. The slot 1026 is formed by an outer wall 1028 which is proximate to, but spaced from the outer end 1002a of the barrel 1002, an inner wall 1030 which is proximate to, but spaced from the inner end 1002b of the barrel 1002, a lower wall 1032 extending linearly between the lower ends of the outer and inner walls 1028, 1030 and which is parallel to the axial centerline 1006, and an upper wall 1034 extending linearly between the upper ends of the outer and inner walls 1028, 1030. The lower and upper walls 1032, 1034 are parallel to the axial centerline 1006. When viewed in side elevation, in an embodiment, the outer and inner walls 1028, 1030 are curved.

An upper slot 1056 extends upwardly from the upper wall 1034 of the slot 1026 and extends from the outer surface 1008 of the barrel 1002 to the outer portion 1016 of the central passageway 1014. The upper slot 1056 is proximate to the outer end of the upper wall 1034. The upper slot 1056 extends as a helix around a portion of the circumference of the barrel 1002. In an embodiment, the helix has a pitch of 1" and ¼" revolutions (90 degrees). The upper slot 1056 is formed by an outer wall 1058 extending upwardly from the upper end of the outer wall 1028 of the slot 1026, an inner wall 1060 extending upwardly from the upper wall 1034 of the slot 1026 and parallel to the outer wall 1058, and an end wall 1062 extending between the upper ends of the outer and inner walls 1058, 1060. When viewed in side elevation, in an embodiment, the end wall 1062 is curved.

A lower slot 1066 extends downwardly from the lower wall 1032 of the slot 1026 and extends from the outer surface 1008 of the barrel 1002 to the outer portion 1016 of the central passageway 1014. The lower slot 1066 is proximate to the outer end of the lower wall 1032. The lower slot 1066 extends as a helix around a portion of the circumference of the barrel 1002. In an embodiment, the helix has a pitch of 1" and ¼" revolutions (90 degrees). The lower slot 1066 is formed by an outer wall 1068 extending downwardly from the lower end of the outer wall 1028 of the slot 1026, an inner wall 1070 extending downwardly from the lower wall 1032 of the slot 1026 and parallel to the outer wall 1068, and an end wall 1072 extending between the lower ends of the outer and inner walls 1068, 1070. When viewed in side elevation, in an embodiment, the end wall 1072 is curved.

The slots 1026, 1056, 1066 generally form a T-shape.

The spring biased plunger assembly 1004 includes a plunger 1036 and a spring 1038.

In an embodiment, the plunger 1036 includes an elongated shaft 1040, a shoulder 1042 connected to the shaft 1040, and a head 1044 connected to the shoulder 1042. A centerline 1046 is defined between an outer end 1036a of the plunger 1036 and an inner end 1036b of the plunger 1036. The shaft 1040 has outer and inner opposite ends 1040a, 1040b and an outer dimension which is slightly smaller than the outer portion 1016 of the passageway 1014 in the barrel 1002. In an embodiment, a bore 1048 is provided through the shaft 1040 transverse to the centerline 1046 of the plunger 1036 and proximate to, but spaced from, the outer end 1040a of the shaft 1040. The shoulder 1042 has outer and inner opposite ends 1042a, 1042b and an outer dimension which is greater than the outer dimension of the shaft 1040 and which is slightly smaller than the inner portion 1018 of the passageway 1014 in the barrel 1002. The outer end 1042a of the shoulder 1042 is connected to the inner end 1040b of the shaft 1040. The head 1044 has outer and inner opposite ends 1044a, 1044b and an outer dimension which is less than the outer dimension of the shoulder 1042. The outer end 1044a of the head 1044 is connected to the inner end 1042b of the shoulder 1042. In an embodiment, each of the shaft 1040, the shoulder 1042 and the head 1044 are cylindrical and the outer dimensions defines outer diameters. The cylindrical head 1044 has a front face 1064 which is angled at an angle of 60 degrees or about 60 degrees from the centerline 1046 of the plunger 1036. In an embodiment, the cylindrical head 1044 has a chamfer 1050 at the inner end 1044b of the head 1044.

The plunger 1036 seats within the passageway 1014 such that the shaft 1040 seats within the outer portion 1016 of the passageway 1014 and extends into the inner portion 1018 of the passageway 1014 and the shoulder 1042 and the head 1044 seat within the inner portion 1018 of the passageway 1014. The plunger 1036 is moveable relative to the barrel 1002 as described herein.

In an embodiment, the spring 1038 is a metal coil spring having outer and inner ends 1038a, 1038b. The spring 1038 surrounds the shaft 1040 of the plunger 1036 and seats within the inner portion 1018 of the passageway 1014. The outer end 1038a of the spring 1038 engages against the end wall 1024 of the inner portion 1018 and the inner end 1038b of the spring 1038 engages against the outer end 1042a of the shoulder 1042. In an embodiment, the spring 1038 is formed of a compressible member, such as rubber.

In an embodiment, the handle 1052 is attached to the plunger 1036 for moving the plunger 1036 relative to the barrel 1002. The handle 1052 includes an elongated linear body. In an embodiment, grip material 1054 is provided on end of the handle 1052. In an embodiment, the handle 1052 is attached to the plunger 1036 by extending into the bore 1048 in the shaft 1040. The handle 1052 extends through one of the slots 1026, 1056, 1066 as discussed herein.

In a locked position, the locking mechanism 1000 prevents the relative movement between the extension member 700 and the body 34/column 404. In this locked position, the spring 1038 is in an expanded condition and bears against the shoulder 1042 to bias the head 1044 of the plunger 1036 outwardly from the inner end 1002b of the barrel 1002. The inner end 1042b of the shoulder 1042 engages against the area of the extension member 700 surrounding the aperture 702 and the head 1044 extends into the aperture 702, thereby preventing the relative movement between the body 34, the column 404 and the extension member 700. In this locked position, the upper and lower edges of the aperture 702 are engaged with the cylindrical edge of the head 1044; that is, the angled front face 1064 is not aligned with either of the upper or lower edges of the aperture 702. In this locked position, the handle 1052 may be proximate to the inner wall 1030 of the slot 1026.

To move the locking mechanism 1000 to the unlocked position so that the extension member 700 can move relative to the body 34/column 404, the handle 1052 is pulled outwardly so that the handle 1052 translates outwardly along the slot 1026 and the plunger 1036 translates outwardly along the passageway 1014. During this translation, the spring 1038 compresses between the shoulder 1042 and the end wall 1024. This causes the head 1044 of the plunger 1036 to withdraw from the aperture 702 in the extension member 700 and into the barrel 1002. Once the head 1044 is withdrawn from the extension member 700, the extension member 700 can be moved to extend the extension member 700 relative to the body 34/column 404 or to retract the extension member 700 into the body 34/column 404, until a new aperture 702 in the extension member 700 is positioned in alignment with the barrel 1002 and the apertures 704, 706 in the body 34/column 404. Once the extension member 700 is moved to the new position, the handle 1052 is released. The spring 1038 then expands which causes the handle 1052 and to translate inwardly along the slot 1026, and causes the plunger 1036 to translate inwardly along the passageway 1014 such that the head 1044 moves into the new aperture 702 in the extension member 700 which is aligned with the barrel 1002. The chamfer 1050 assists in the head 1044 moving into the new aperture 702.

Figure 58:
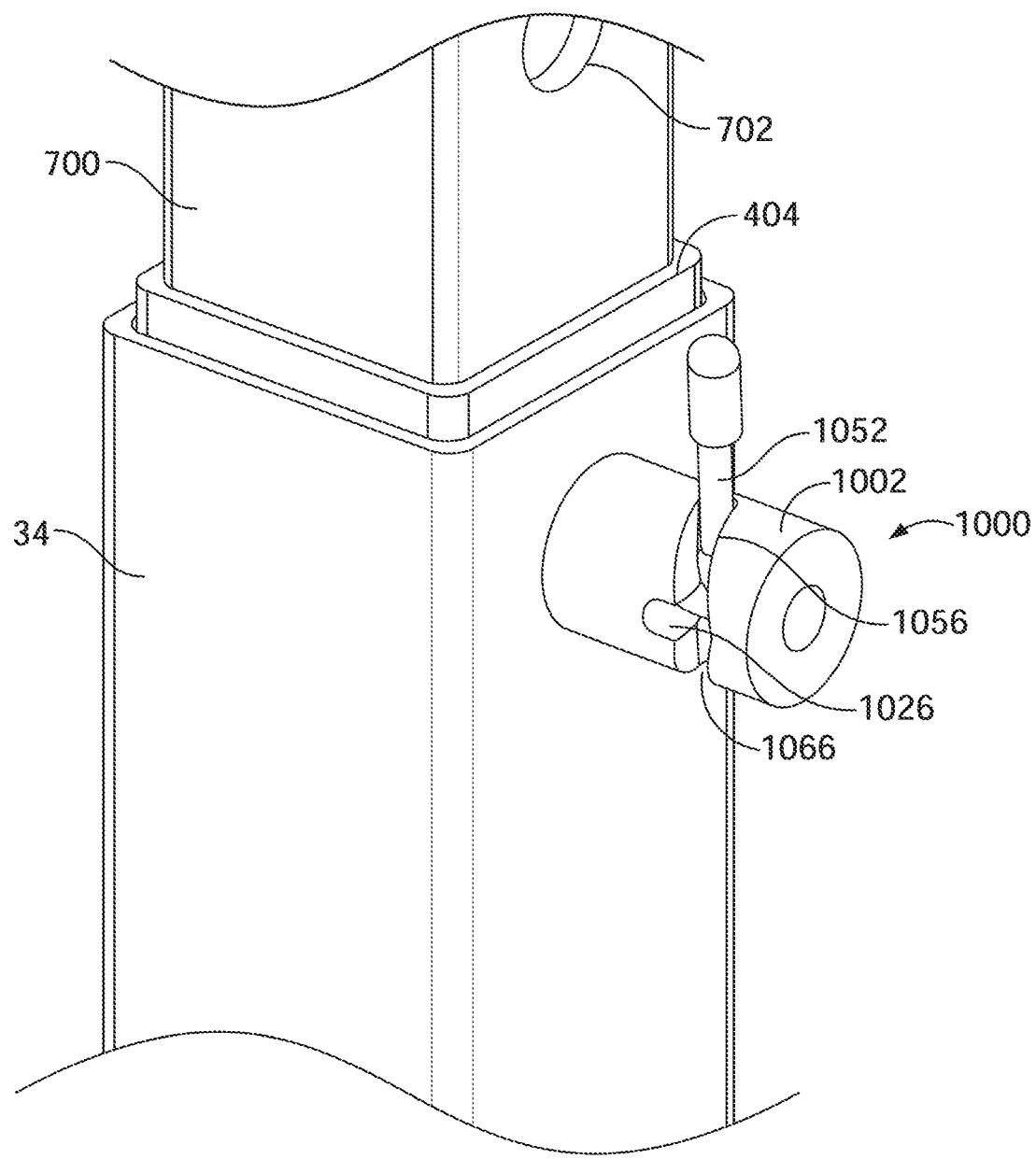
FIG. 58 is a perspective view of the locking mechanism of FIG. 52, the boom and a portion of the wheel assembly, the locking mechanism being shown in a first unlocked position.
Figure 59:
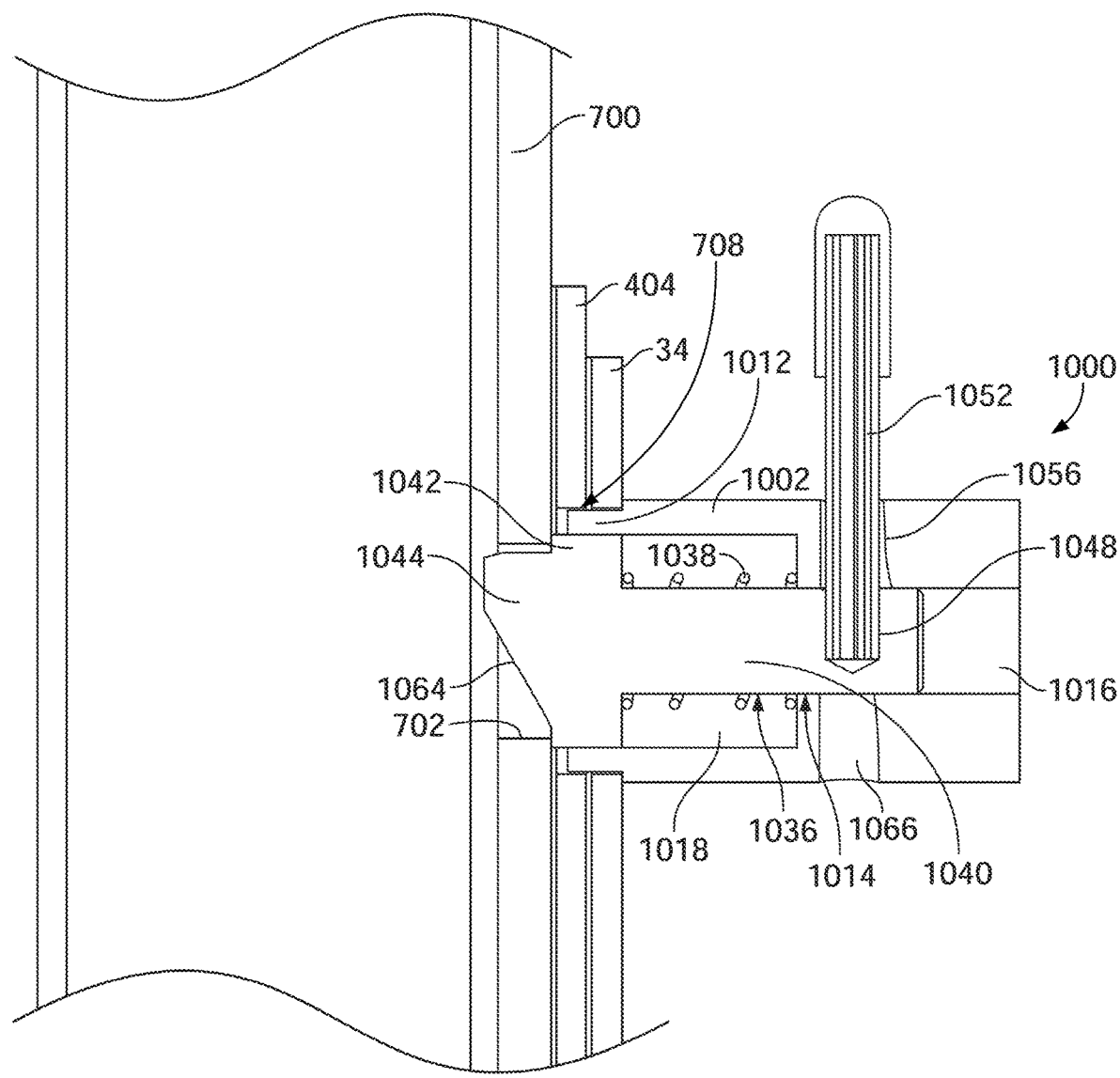
FIG. 59 is a cross-sectional view of the locking mechanism of FIG. 52, the boom and a portion of the wheel assembly, the locking mechanism being shown in the first unlocked position.

The locking mechanism 1000 can be placed into a first unlocked position, see FIGS. 58 and 59, such that the extension member 700 can be ratcheted upwardly, that is, the extension member 700 is pulled out of the body 34/column 404 in a ratcheting movement. To effect this, the handle 1052 is translated along the slot 1026 and then into the upper slot 1056 until the handle 1052 abuts against the outer wall 1058 and the outermost end of the inner wall 1060. As the handle 1052 is moved into the upper slot 1056, the handle 1052 rotates relative to the barrel 1002. When in this first unlocked position, the locking mechanism 1000 prevents the retraction of the extension member 700 into the body 34/column 404. In this first unlocked position, the spring 1038 is in an expanded condition and bears against the shoulder 1042 to bias the head 1044 of the plunger 1036 outwardly from the inner end 1002b of the barrel 1002. The inner end 1042b of the shoulder 1042 engages against the area of the extension member 700 surrounding the aperture 702 and the head 1044 extends into the aperture 702. The angled front face 1064 is proximate to and engages the lower edge of the aperture 702. When the extension member 700 is pushed into the body 34/column 404, the upper edge of the aperture 702 engages the cylindrical portion of the head 1044 and this thereby prevents the extension member 700 from being pushed into the body 34/column 404. When in this first unlocked position, however, the extension member 700 can be pulled outwardly from the body 34/column 404. When the extension member 700 is pulled outwardly, the lower edge of the aperture 702 engages the angled front face 1064 of the plunger 1036 which causes the plunger 1036 to move outwardly and into the barrel 1002 as the lower edge of the aperture 702 moves along the angled front face 1064 and causes the handle 1052 to slide along the upper slot 1056 toward the slot 1026. Once the head 1044 is retracted out of the aperture 702, the extension member 700 can be further slid relative to the body 34/column 404 until a new aperture 702 is aligned with the head 1044. Once the new aperture 702 is aligned with the plunger 1036, the spring 1038 will expand to cause the handle 1052 to slide along the upper slot 1056 away from the slot 1026, thereby causing the plunger 1036 to slide along slot 1026 of the barrel 1002 and the head 1044 enters into the new aperture 702. If desired, the extension member 700 may be further pulled out of the body 34/column 404 and the process repeats itself with the new aperture 702 such that the extension member 700 is ratcheted outwardly out of the body 34/column 404. Once the extension member 700 is in the desired position, the handle 1052 is rotated to align with slot 1026 and the head 1044 is allowed to enter into the appropriate aperture 702 to place the handle 1052 into the position shown in FIGS. 52 and 57.

Figure 60:
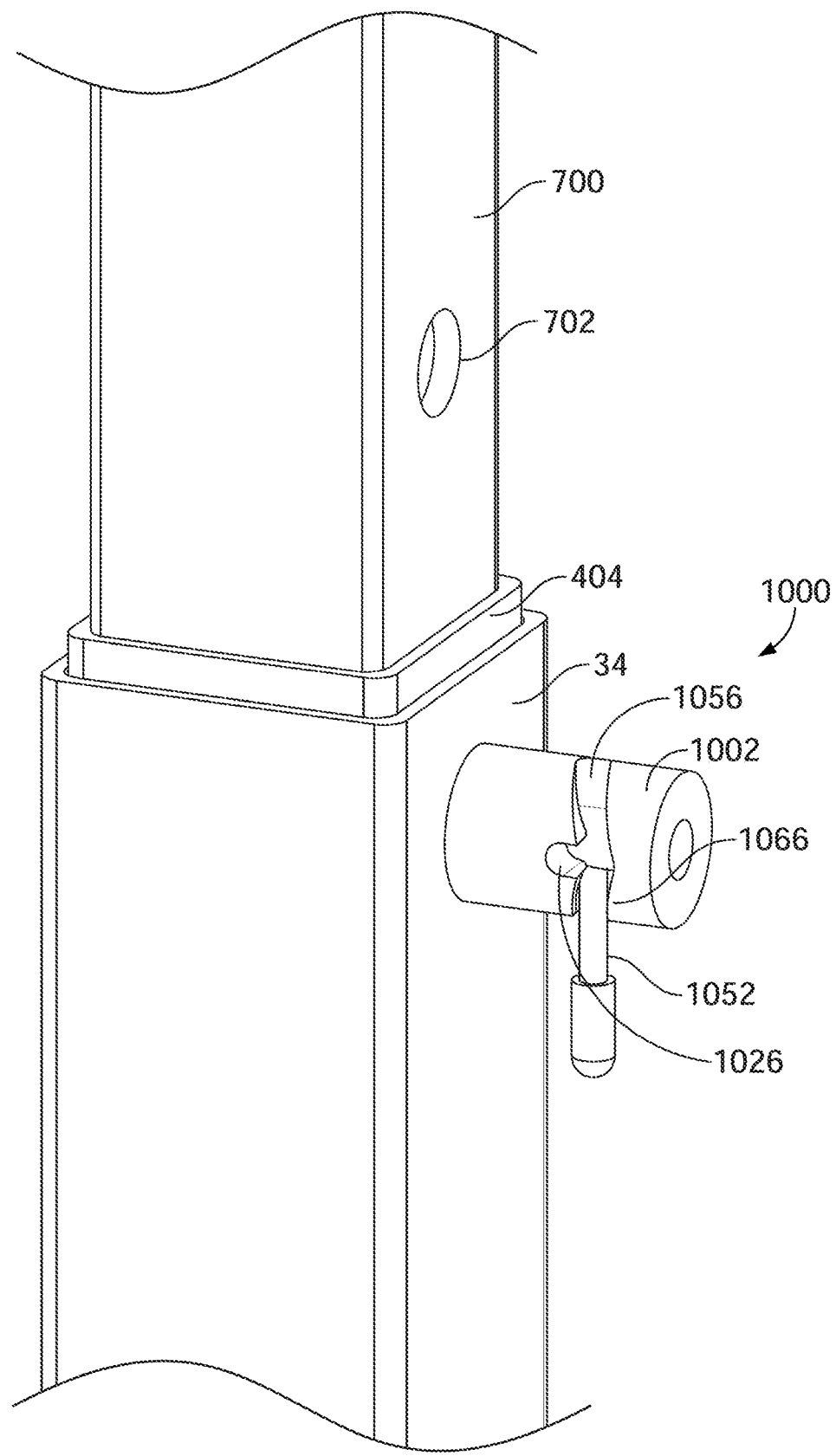
FIG. 60 is a perspective view of the locking mechanism of FIG. 52, the boom and a portion of the wheel assembly, the locking mechanism being shown in a second unlocked position.
Figure 61:
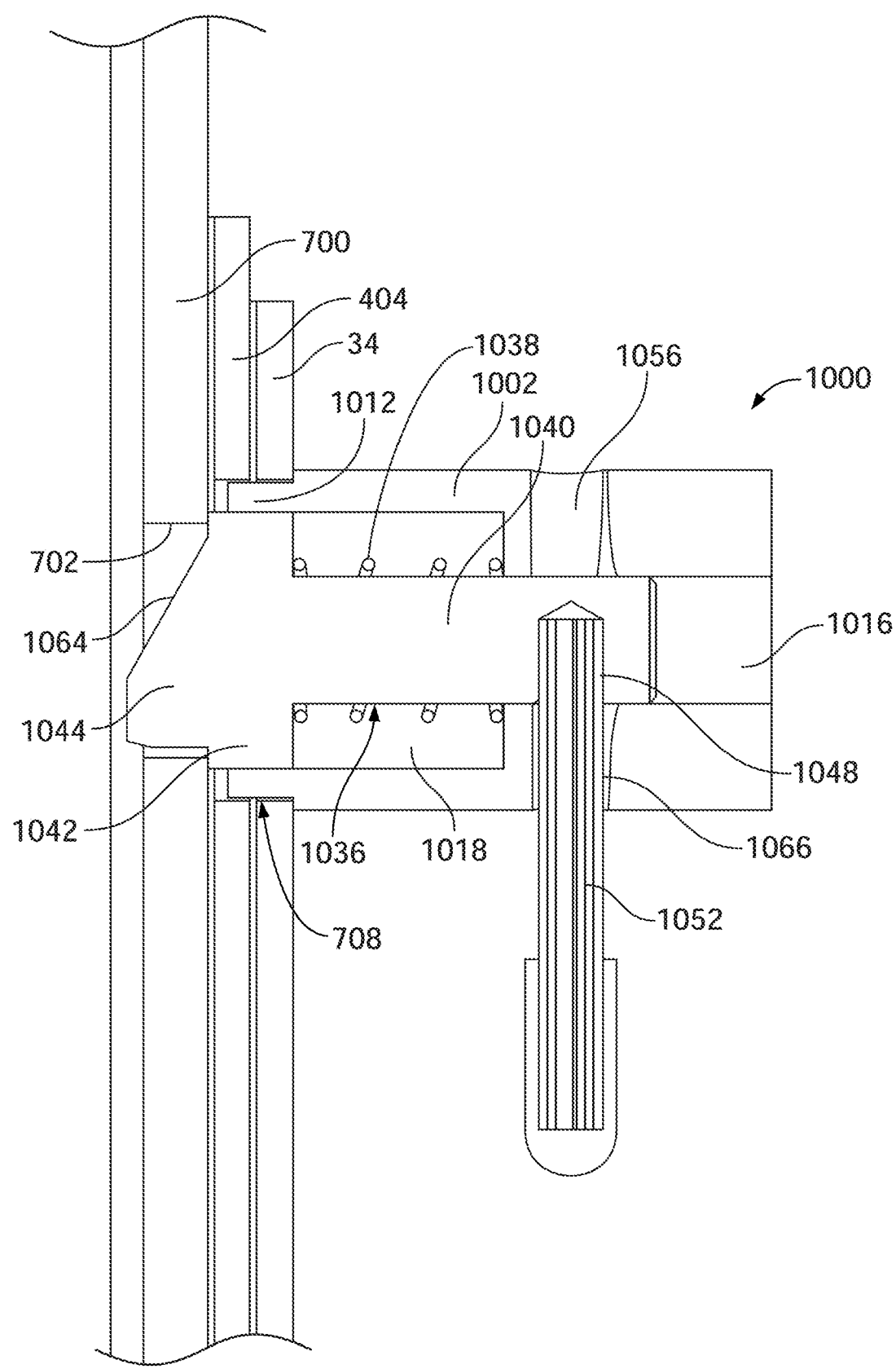
FIG. 61 is a cross-sectional view of the locking mechanism of FIG. 52, the boom and a portion of the wheel assembly, the locking mechanism being shown in the second unlocked position.

The locking mechanism 1000 can be placed into a second unlocked position, see FIGS. 60 and 61, such that the extension member 700 can be ratcheted downwardly, that is, the extension member 700 is pushed into the body 34/column 404 in a ratcheting movement. To effect this, the handle 1052 is translated along the slot 1026 and then into the lower slot 1066 until the handle 1052 abuts against the outer wall 1068 and the outermost end of the inner wall 1070. As the handle 1052 is moved into the lower slot 1066, the handle 1052 rotates relative to the barrel 1002. When in this second unlocked position, the locking mechanism 1000 prevents the extension of the extension member 700 out of the body 34/column 404. In this second unlocked position, the spring 1038 is in an expanded condition and bears against the shoulder 1042 to bias the head 1044 of the plunger 1036 outwardly from the inner end 1002b of the barrel 1002. The inner end 1042b of the shoulder 1042 engages against the area of the extension member 700 surrounding the aperture 702 and the head 1044 extends into the aperture 702. The angled front face 1064 is proximate to and engages the upper edge of the aperture 702. When the extension member 700 is pulled out of the body 34/column 404, the lower edge of the aperture 702 engages the cylindrical portion of the head 1044 and this thereby prevents the extension member 700 from being pulled out of the body 34/column 404. When in this second unlocked position, however, the extension member 700 can be pushed into the body 34/column 404. When the extension member 700 is pushed inwardly, the upper edge of the aperture 702 engages the angled front face 1064 of the plunger 1036 which causes the plunger 1036 to move outwardly and into the barrel 1002 as the lower edge of the aperture 702 moves along the angled front face 1064 and causes the handle 1052 to slide along the lower slot 1066 toward the slot 1026. Once the head 1044 is retracted out of the aperture 702, the extension member 700 can be further slid relative to the body 34/column 404 until a new aperture 702 is aligned with the head 1044. Once the new aperture 702 is aligned with the plunger 1036, the spring 1038 will expand to cause the handle 1052 to slide along the lower slot 1066 away from the slot 1026, thereby causing the plunger 1036 to slide along slot 1026 of the barrel 1002 and the head 1044 enters into the new aperture 702. If desired, the extension member 700 may be further pushed inwardly into the body 34/column 404 and the process repeats itself with the new aperture 702 such that the extension member 700 is ratcheted inwardly into the body 34/column 404. Once the extension member 700 is in the desired position, the handle 1052 is rotated to align with slot 1026 and the head 1044 is allowed to enter into the appropriate aperture 702 to place the handle 1052 into the position shown in FIGS. 52 and 57.

Figure 62:
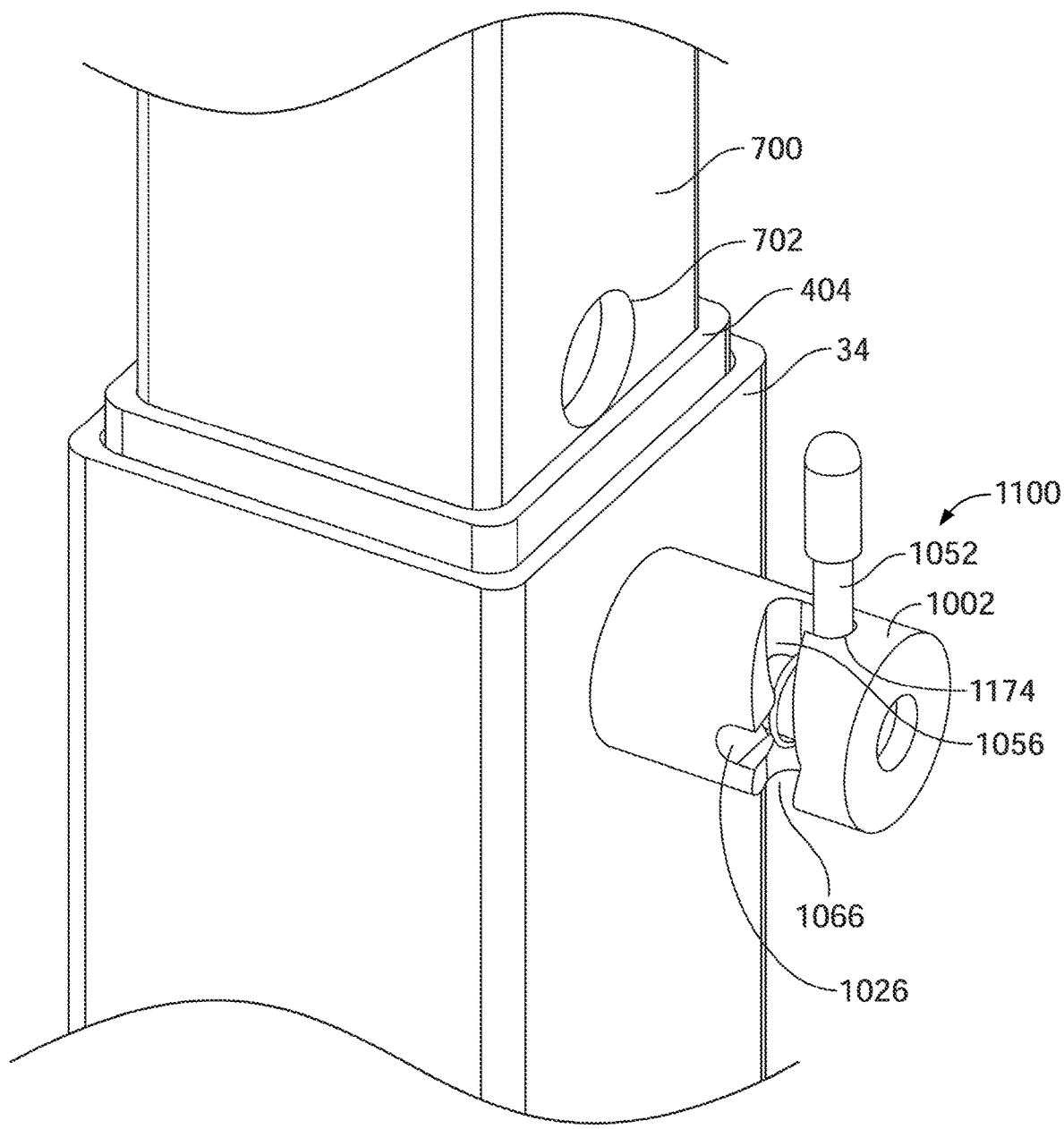
FIG. 62 is a perspective view showing an embodiment of a locking mechanism of the boom, the locking mechanism being shown in a first locked position.
Figure 63:
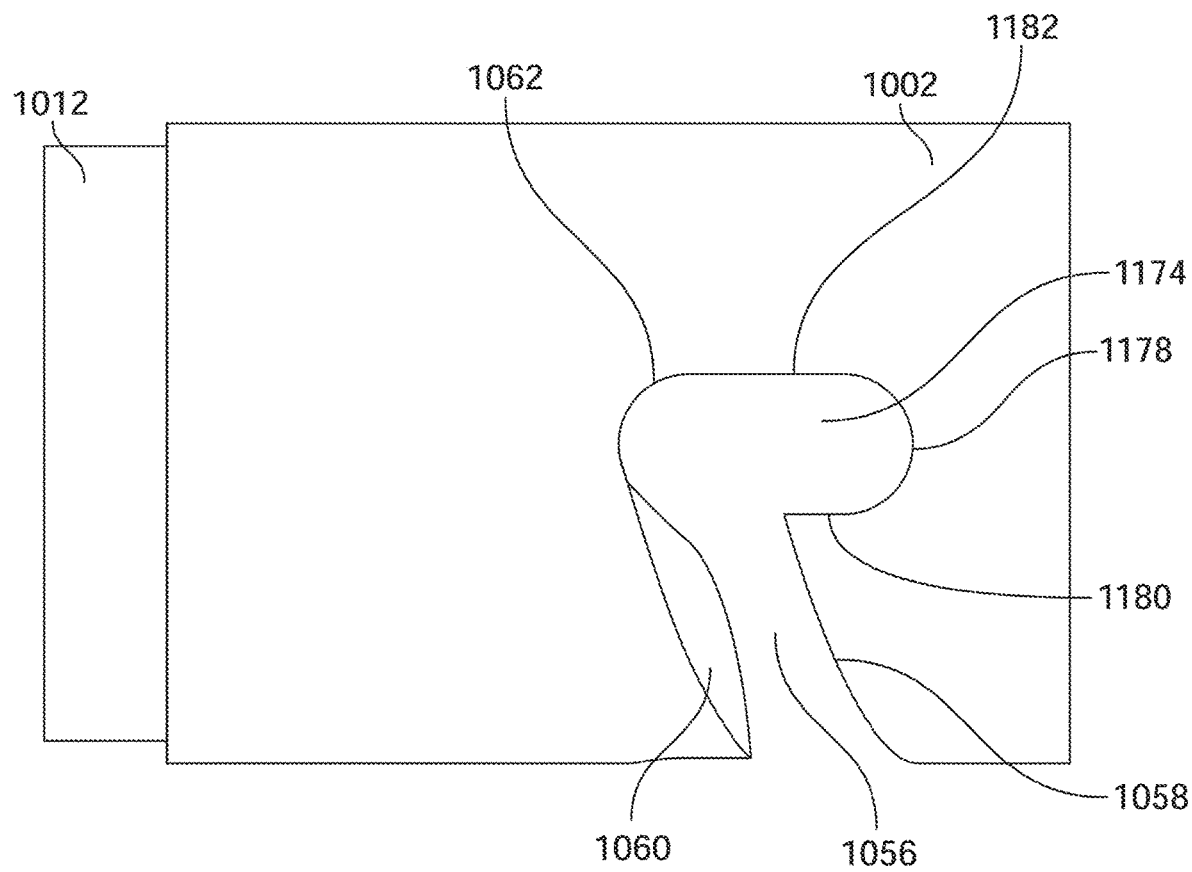
FIG. 63 is a first side elevation view of a barrel of the locking mechanism of FIG. 62.
Figure 64:
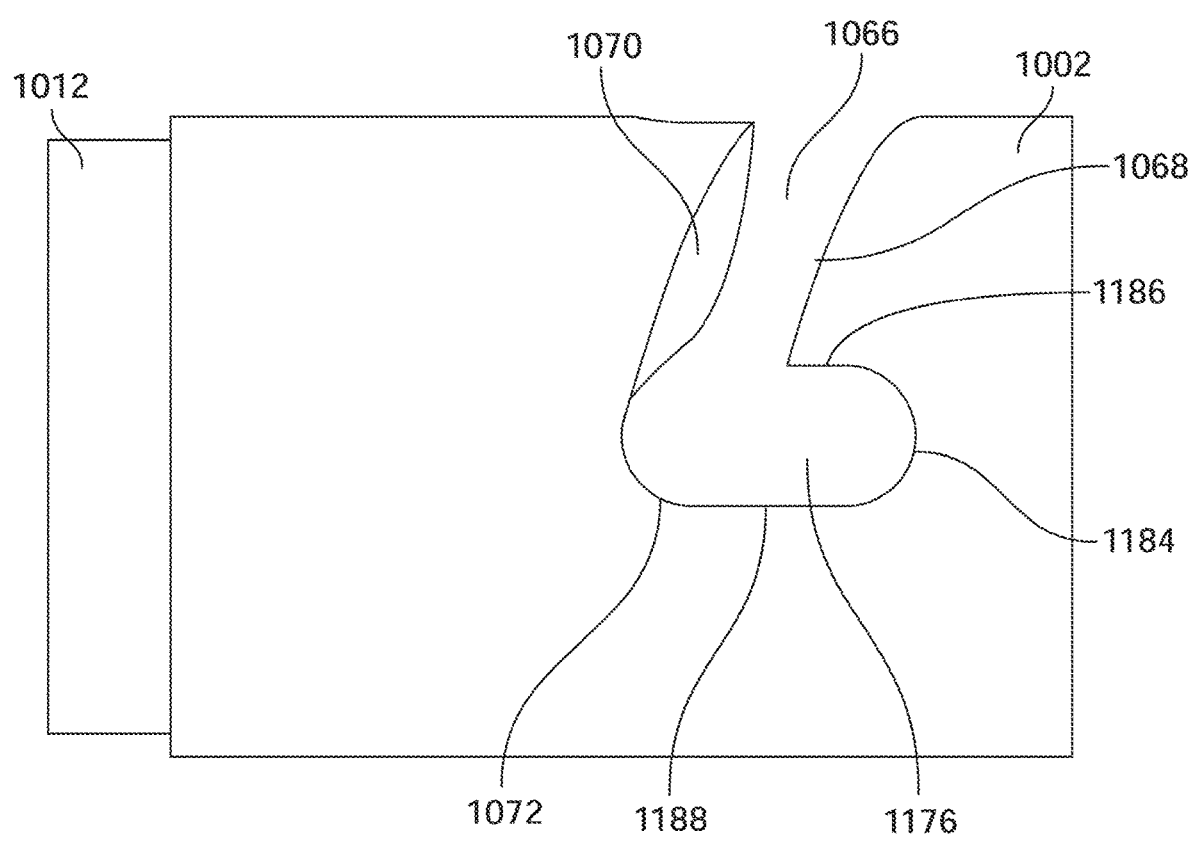
FIG. 64 is a second side elevation view of a barrel of the locking mechanism of FIG. 62.
Figure 65:
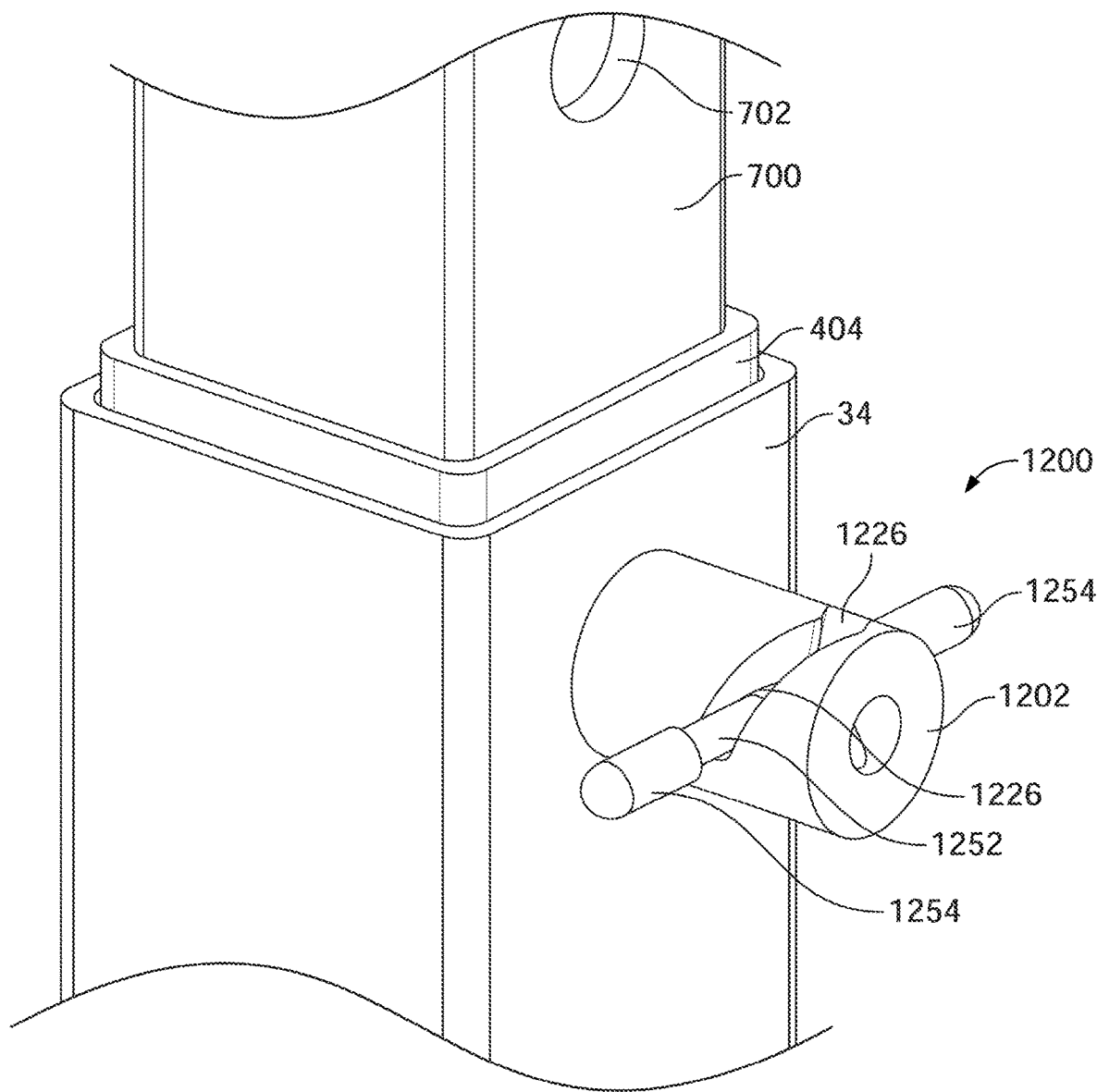
FIG. 65 is a perspective view showing an embodiment of a locking mechanism of the boom, the locking mechanism being shown in a locked position.
Figure 66:
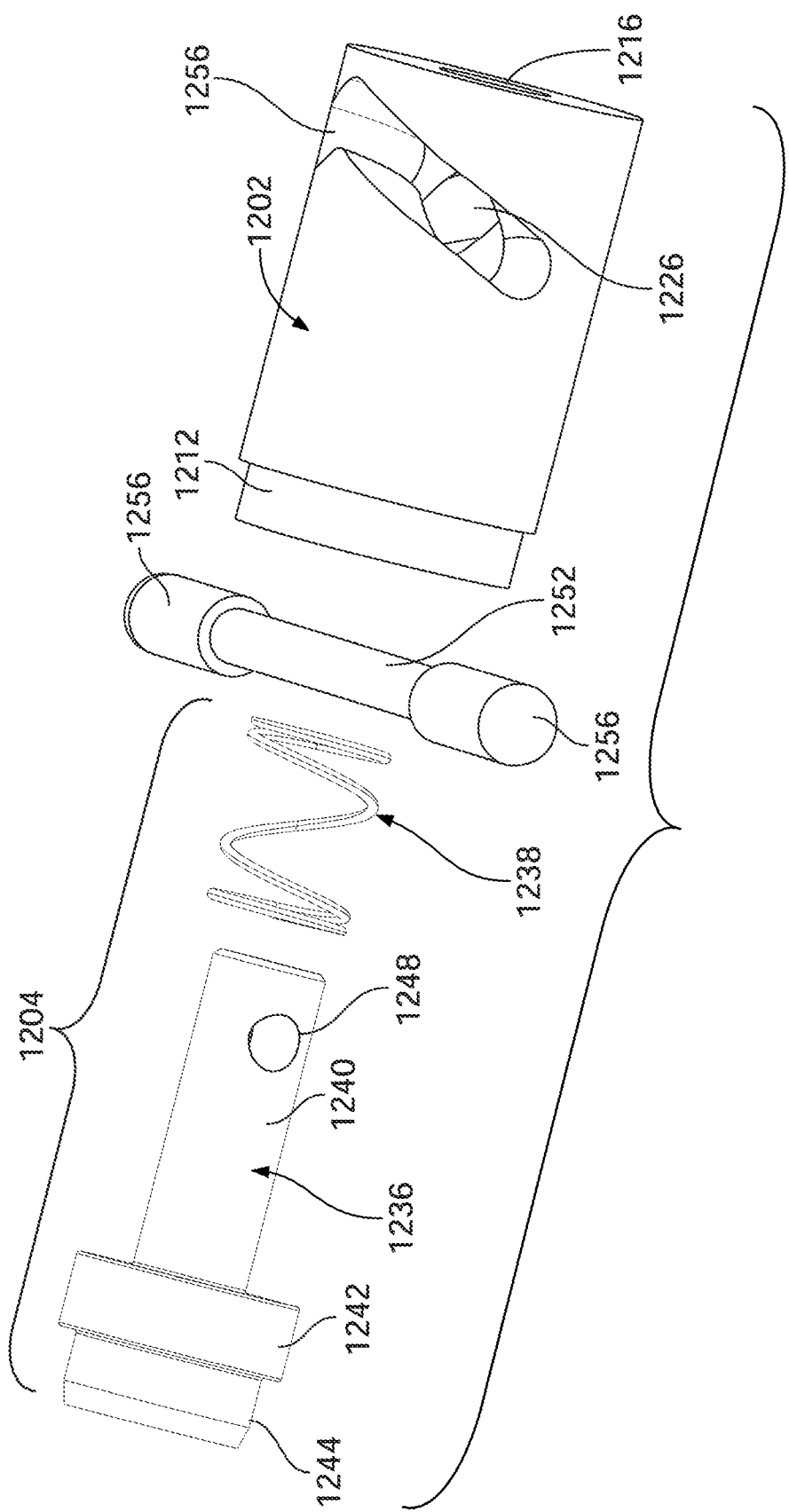
FIG. 66 is an exploded perspective view of the locking mechanism of FIG. 65.
Figure 67:
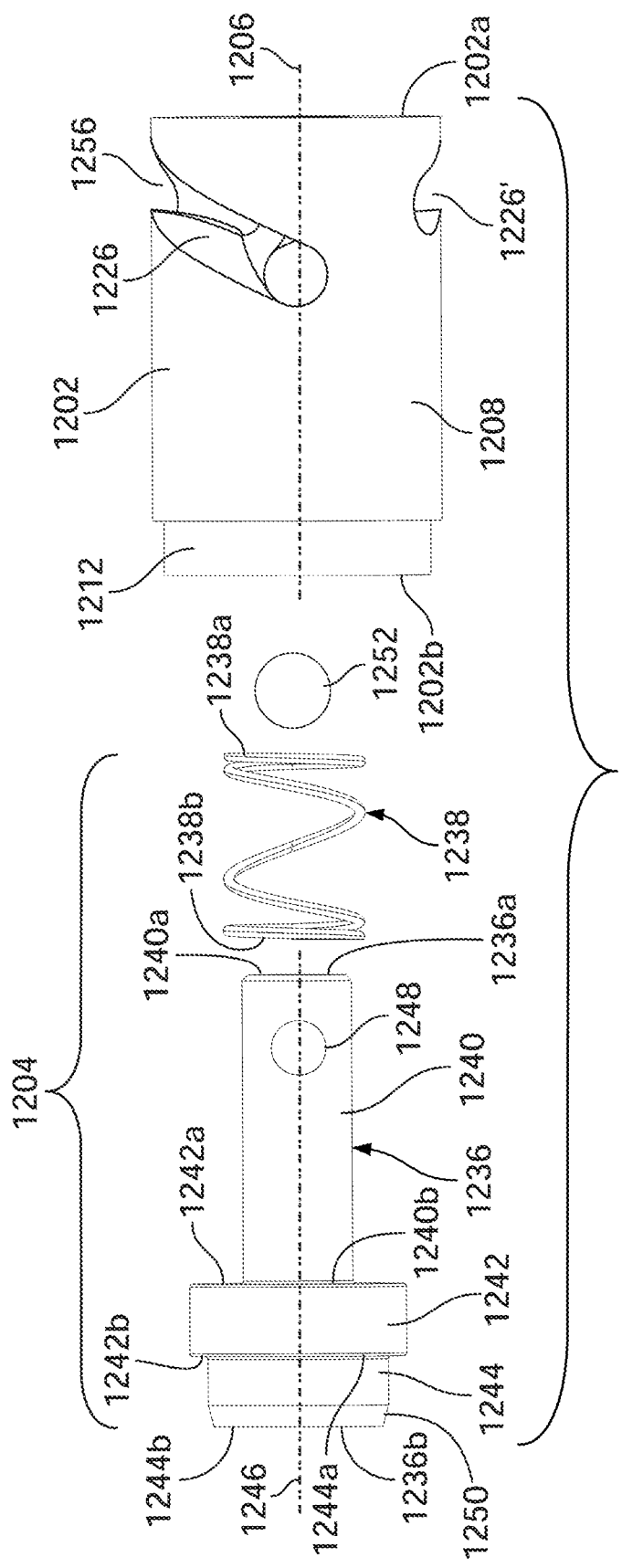
FIG. 67 is an exploded side elevation view of the locking mechanism of FIG. 65.
Figure 68:
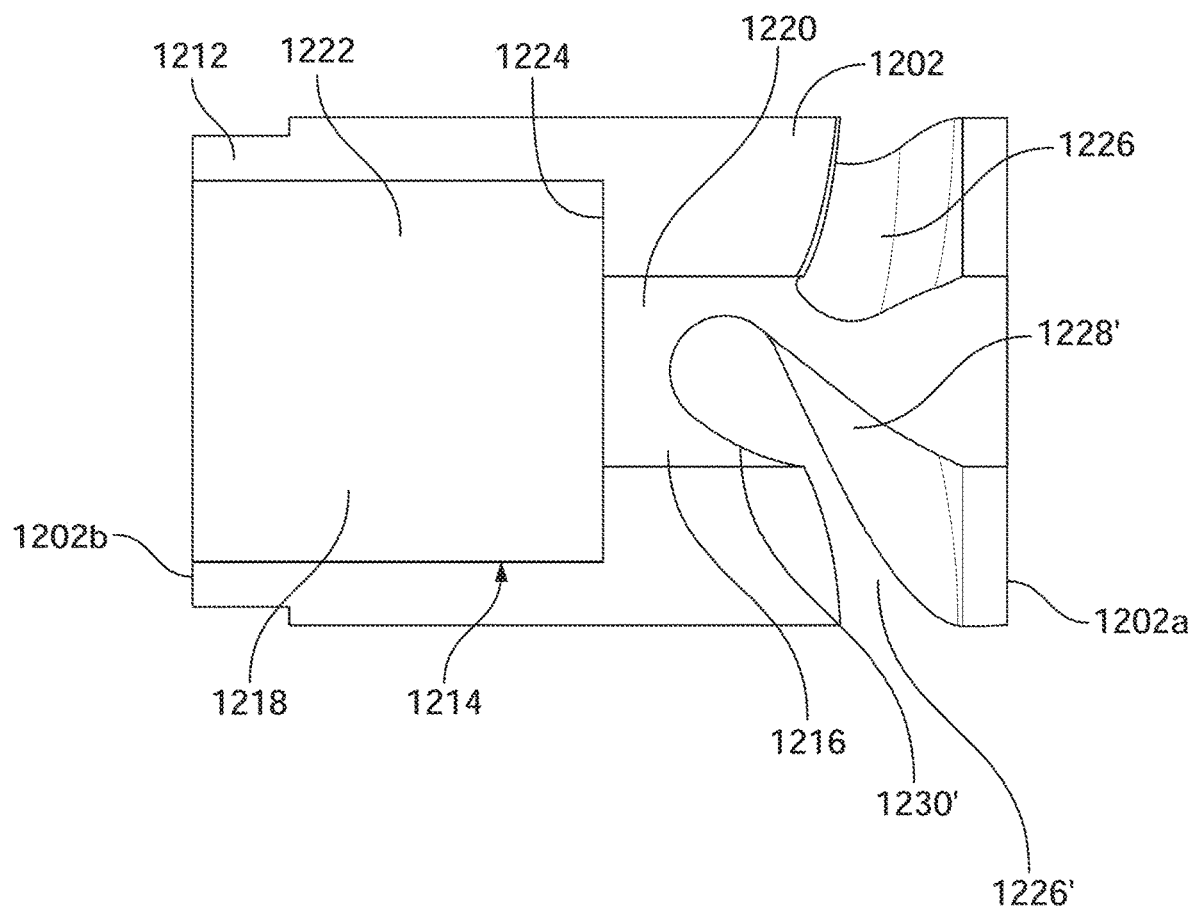
FIG. 68 is a cross-sectional view of a barrel of the locking mechanism of FIG. 65.
Figure 69:
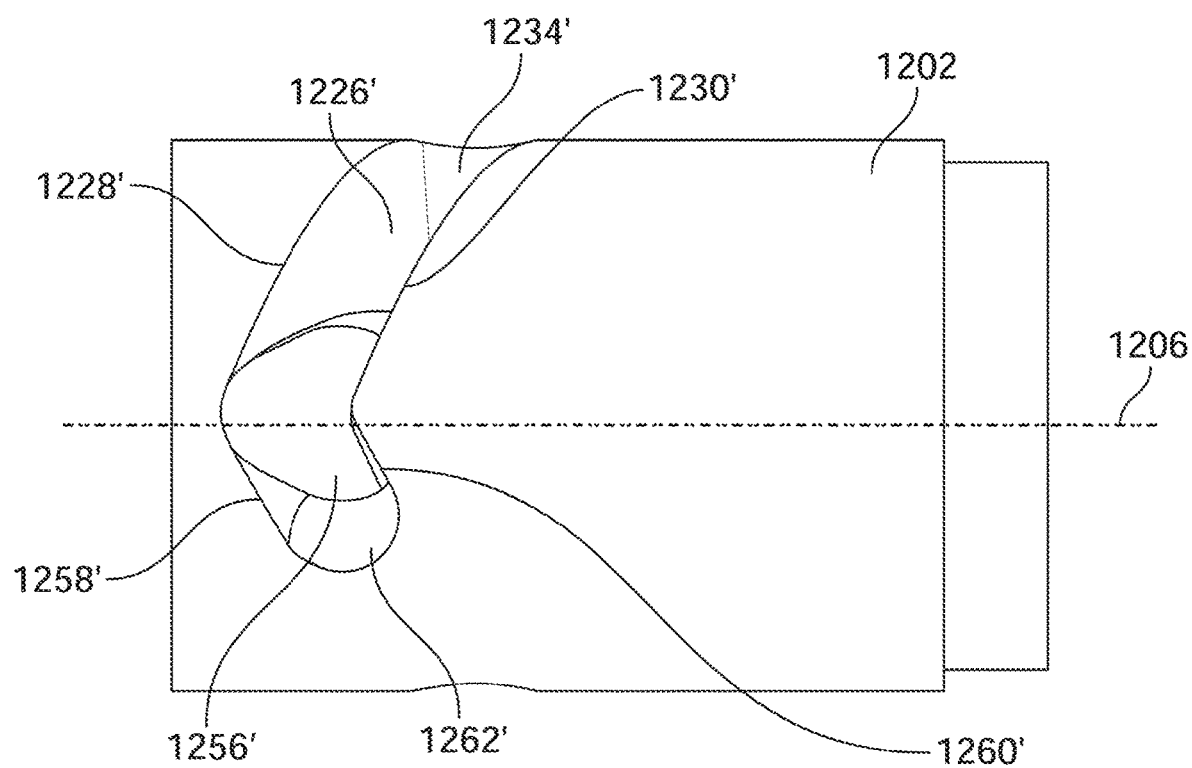
FIG. 69 is a side elevation view of the barrel of the locking mechanism of FIG. 65.
Figure 70:
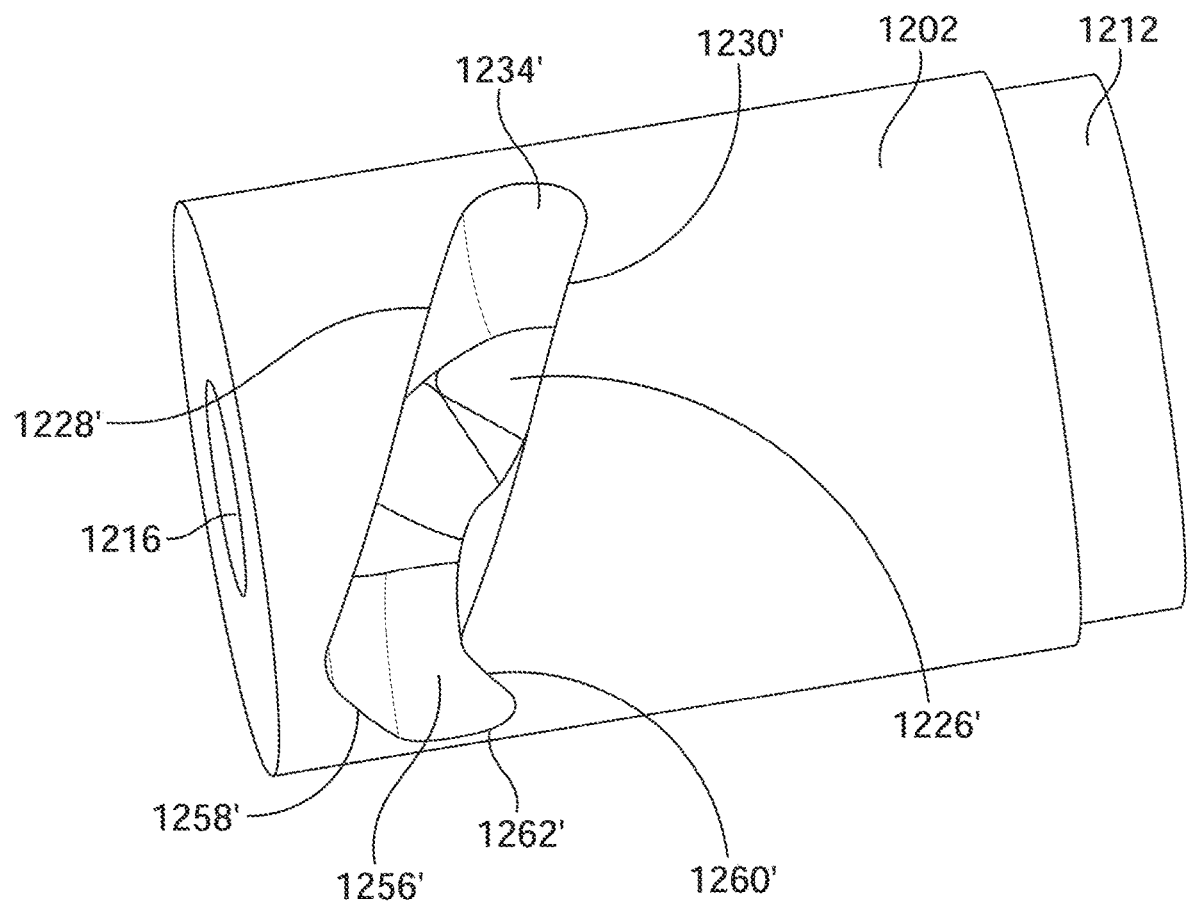
FIG. 70 is a perspective elevation view of the barrel of the locking mechanism of FIG. 65.
Figure 71:
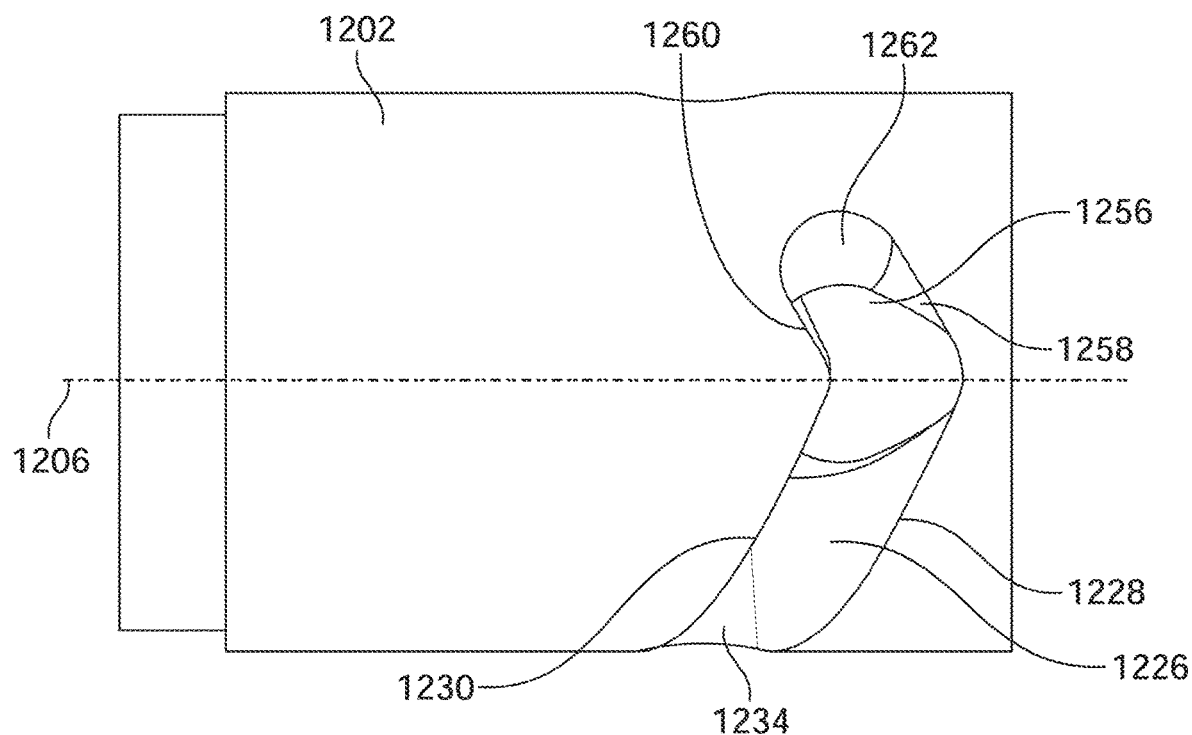
FIG. 71 is an alternate side elevation view of the barrel of the locking mechanism of FIG. 65.
Figure 72:
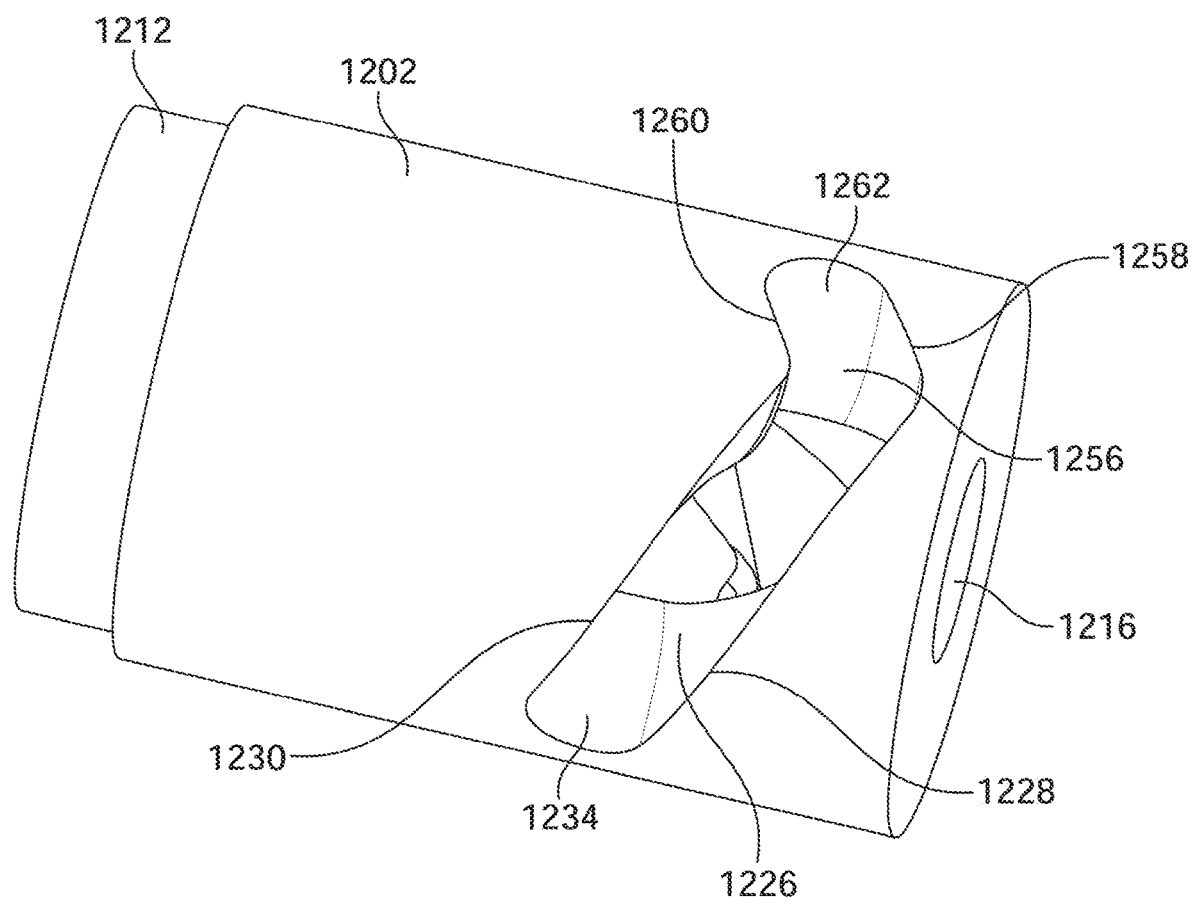
FIG. 72 is an alternate perspective elevation view of the barrel of the locking mechanism of FIG. 65.
Figure 73:
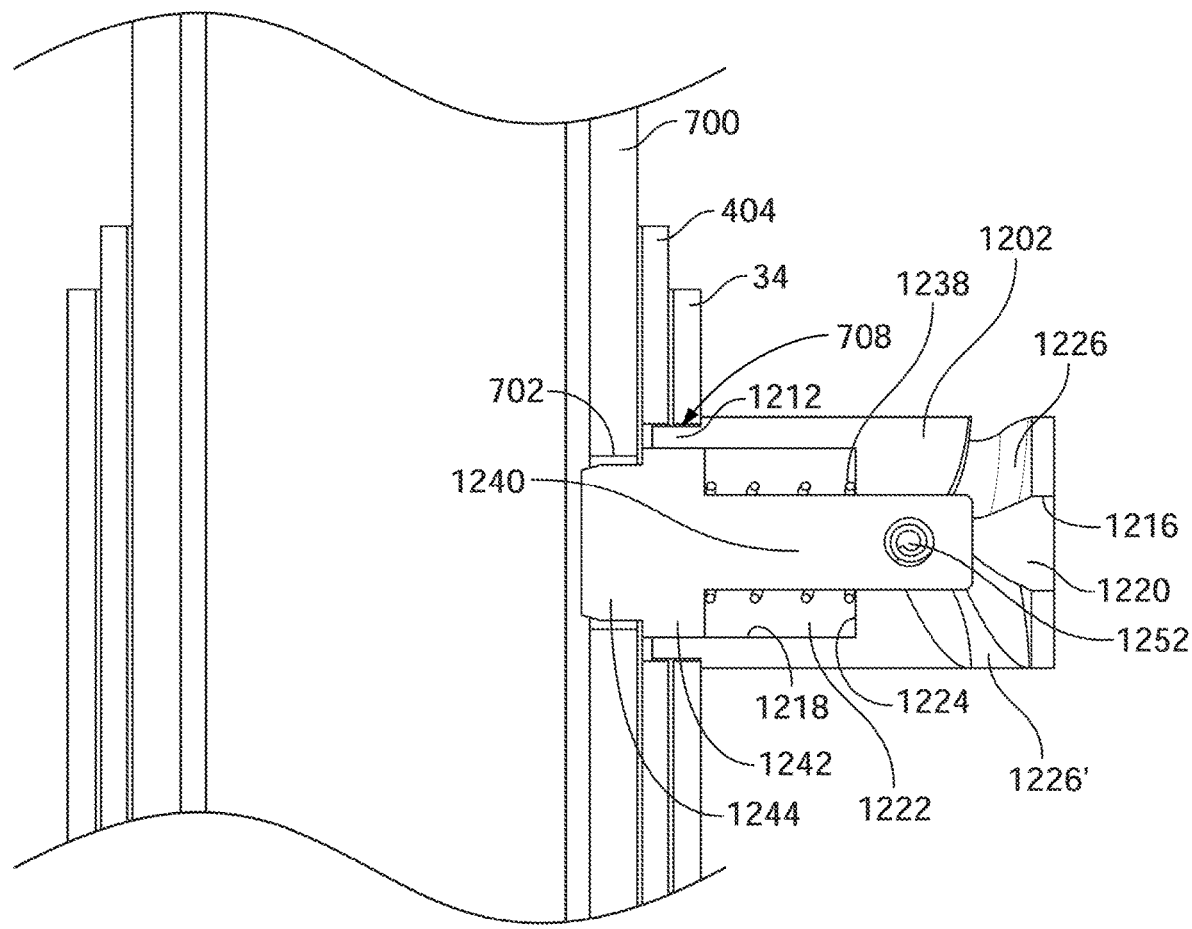
FIG. 73 is a cross-sectional view of the locking mechanism of FIG. 65, the boom and a portion of the wheel assembly, the locking mechanism being shown in a locked position.
Figure 74:
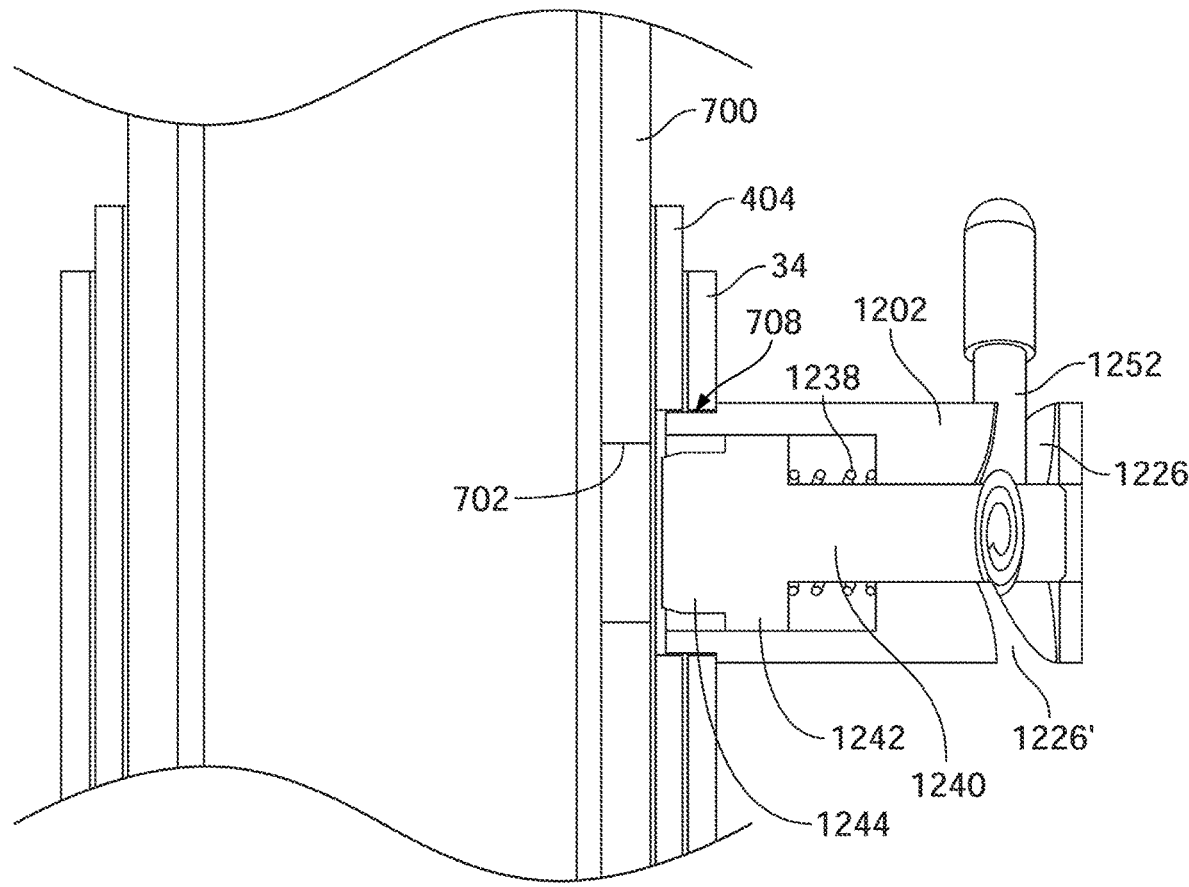
FIG. 74 is a perspective view of the locking mechanism of FIG. 65, the boom and a portion of the wheel assembly, the locking mechanism being shown in an unlocked position.

In an embodiment, a further pair of linear slots 1174, 1176 are provided in the locking mechanism 1000 as shown in FIGS. 62-64 and this embodiment is denoted as locking mechanism 1100. Like elements in the locking mechanism 1100 to that of locking mechanism 1000 are denoted with identical reference numbers.

An upper linear slot 1174 extends outwardly from the outer end of the upper slot 1056, extends from the outer surface 1008 of the barrel 1002 to the outer portion 1016 of the central passageway 1014, and is parallel to the axial centerline 1006 of the barrel 1002 and parallel to the slot 1026. The upper linear slot 1174 is formed by an outer wall 1178 which is proximate to, but spaced from the outer end 1002a of the barrel 1002, a lower wall 1180 extending from the upper end of the outer wall 1058 to the outer wall 1178, and an upper wall 1174 extending from an upper end of the inner wall 1060 to the outer wall 1178. The lower and upper walls 1180, 1182 are parallel to each other, parallel to the axial centerline 1006 and parallel to the lower and upper walls 1032, 1034 of the slot 1026. The outer wall 1178 is aligned with the outer wall 1028 of the slot 1026.

A lower linear slot 1176 extends outwardly from the outer end of the lower slot 1066, extends from the outer surface 1008 of the barrel 1002 to the outer portion 1016 of the central passageway 1014, and is parallel to the axial centerline 1006 of the barrel 1002 and parallel to the slots 1026, 1174. The lower linear slot 1176 is formed by an outer wall 1184 which is proximate to, but spaced from the outer end 1002a of the barrel 1002, an upper wall 1186 extending from the lower end of the outer wall 1068 to the outer wall 1184, and a lower wall 1188 extending from a lower end of the inner wall 1070 to the outer wall 1184. The upper and lower walls 1186, 1188 are parallel to each other, parallel to the axial centerline 1006 and parallel to the lower and upper walls 1032, 1034 of the slot 1026. The outer wall 1184 is aligned with the outer wall 1028 of the slot 1026.

When the locking mechanism 1100 is placed into the first unlocked position as described above such that the extension member 700 can be ratcheted upwardly, when the extension member 700 is pulled outwardly, the lower edge of the aperture 702 engages the angled front face 1064 of the plunger 1036 which causes the plunger 1036 to move outwardly and into the barrel 1002 as the lower edge of the aperture 702 moves along the angled front face 1064 and causes the handle 1052 to slide along the upper slot 1174. Once the head 1044 is retracted out of the aperture 702, the extension member 700 can be further slid relative to the body 34/column 404 until a new aperture 702 is aligned with the head 1044. Once the new aperture 702 is aligned with the plunger 1036, the spring 1038 will expand to cause the handle 1052 to slide along the upper slot 1174, thereby causing the plunger 1036 to slide along slot 1026 of the barrel 1002 and the head 1044 enters into the new aperture 702. If desired, the extension member 700 may be further pulled out of the body 34/column 404 and the process repeats itself with the new aperture 702 such that the extension member 700 is ratcheted outwardly out of the body 34/column 404. Once the extension member 700 is in the desired position, the handle 1052 is rotated to align with slot 1026 and the head 1044 is allowed to enter into the appropriate aperture 702 to place the handle 1052 into the position shown in FIG. 62.

When the locking mechanism 1100 is placed into the second unlocked position as described above such that the extension member 700 can be ratcheted downwardly, when the extension member 700 is pushed inwardly, the upper edge of the aperture 702 engages the angled front face 1064 of the plunger 1036 which causes the plunger 1036 to move outwardly and into the barrel 1002 as the lower edge of the aperture 702 moves along the angled front face 1064 and causes the handle 1052 to slide along the lower slot 1176. Once the head 1044 is retracted out of the aperture 702, the extension member 700 can be further slid relative to the body 34/column 404 until a new aperture 702 is aligned with the head 1044. Once the new aperture 702 is aligned with the plunger 1036, the spring 1038 will expand to cause the handle 1052 to slide along the lower slot 1176, thereby causing the plunger 1036 to slide along slot 1026 of the barrel 1002 and the head 1044 enters into the new aperture 702. If desired, the extension member 700 may be further pushed inwardly into the body 34/column 404 and the process repeats itself with the new aperture 702 such that the extension member 700 is ratcheted inwardly into the body 34/column 404. Once the extension member 700 is in the desired position, the handle 1052 is rotated to align with slot 1026 and the head 1044 is allowed to enter into the appropriate aperture 702.

In an embodiment as shown in FIGS. 65-74, the locking mechanism 1200 includes a barrel 1202, a spring biased plunger assembly 1204 mounted within the barrel 1202, and a handle 1252 attached to the plunger assembly 1204. The locking mechanism 1200 may be placed into a locked position wherein the extension member 700 cannot move relative to the body 34/column 404, or may be placed into an unlocked position wherein the extension member 700 is moveable relative to the body 34/column 404.

In an embodiment, the barrel 1202 has an outer end 1202*a* and an opposite inner end 1202*b* which defines an axial centerline 1206 of the barrel 1202 which extends along the length of the barrel 1202, and an outer surface 1208. A transverse centerline is defined relative to the axial centerline 1206. In an embodiment, the outer surface 1208 of the barrel 1202 is cylindrical. In an embodiment, an end portion 1212 of the barrel 1202 has a reduced outer dimension relative to the remainder of the barrel 1202. In an embodiment, the reduced dimension end portion 1212 seats within, and is affixed to, the passageway 708 through the body 34 and the column 404. The engagement of the end portion 1212 with the body 34 and column 404 prevents the movement of the body 34 and column 404 relative to each other. Other structures for preventing movement of the body 34 and column 404 relative to each other are within the scope of the present disclosure.

A central passageway 1214 extends along the axial centerline 1206 of the barrel 1202 from the outer end 1202*a* to the inner end 1202*b*. The central passageway 1214 has an outer portion 1216 which extends from the outer end 1202*a* and an inner portion 1218 which extends from the inner end 1202*b*. The outer portion 1216 is formed by a side wall 1220 having a dimension. The inner portion 1218 is formed by a side wall 1222 having a dimension and an end wall 1224. The end wall 1224 meets with the side wall 1220 of the outer portion 1216 at a corner. The side wall 1220 of the outer portion 1216 has a dimension which is smaller than the dimension of the side wall 1222 of the inner portion 1218. In an embodiment, the outer portion 1216 is cylindrical, the inner portion 1218 is cylindrical, and the dimensions are diameters.

A first slot 1226 extends from the outer surface 1208 of the barrel 1202 to the outer portion 1216 of the central passageway 1214. The first slot 1226 extends as a helix around a portion of the circumference of the barrel 1202. In an embodiment, the helix has a pitch of 1.4375" and ¼" revolutions (90 degrees). The first slot 1226 is formed by an outer wall 1228 which is proximate to, but spaced from the outer end 1202*a* of the barrel 1202, an inner wall 1230 which is proximate to, but spaced from the inner end 1202*b* of the barrel 1202, and a lower wall 1234 extending between the lower ends of the outer and inner walls 1228, 1230. When viewed in side elevation, in an embodiment, the lower wall 1234 is curved.

A slot 1256 extends from the upper end of the first slot 1226 and extends from the outer surface 1208 of the barrel 1202 to the outer portion 1216 of the central passageway 1214. The slot 1256 extends as a helix around a portion of the circumference of the barrel 1202. In an embodiment, the helix has a pitch of 1.75" and ¹⁄₁₆" revolutions (22.5 degrees). The slots 1226, 1256 generally form a V-shaped slot. The slot 1256 is formed by an outer wall 1258 extending from the outer wall 1228 of the first slot 1226, an inner wall 1260 extending from the inner wall 1230 of the first slot 1226 and parallel to the outer wall 1258, and an upper wall 1262 extending between the upper ends of the outer and inner walls 1258, 1260. When viewed in side elevation, in an embodiment, the lower wall 1262 is curved.

A second slot 1226' extends from the outer surface 1208 of the barrel 1202 to the outer portion 1216 of the central passageway 1214. The second slot 1226' extends as a helix around a portion of the circumference of the barrel 1202. In an embodiment, the helix has a pitch of 1.4375" and ¼" revolutions (90 degrees). The second slot 1226' is formed by an outer wall 1228' which is proximate to, but spaced from the outer end 1202*a* of the barrel 1202, an inner wall 1230' which is proximate to, but spaced from the inner end 1202*b* of the barrel 1202, and an upper wall 1234' extending between the upper ends of the outer and inner walls 1228', 1230'. When viewed in side elevation, in an embodiment, the upper wall 1234 is curved.

The outer walls 1228, 1228' of the first and second slots 1226, 1226' are in the same plane and the inner walls 1230, 1230' of the first and second slots 1226, 1226' are in the same plane.

A slot 1256' extends from the lower end of the first slot 1226' and extends from the outer surface 1208 of the barrel 1202 to the outer portion 1216 of the central passageway 1214. The slot 1256' extends as a helix around a portion of the circumference of the barrel 1202. In an embodiment, the helix has a pitch of 1.75" and ⅟₁₆" revolutions (22.5 degrees). The slots 1226', 1256' generally form a V-shaped slot. The slot 1256' is formed by an outer wall 1258' extending from the outer wall 1228 of the first slot 1226, an inner wall 1260' extending from the inner wall 1230 of the first slot 1226 and parallel to the outer wall 1258', and a lower wall 1262' extending between the lower ends of the outer and inner walls 1258', 1260'. When viewed in side elevation, in an embodiment, the lower wall 1262' is curved.

The outer walls 1258, 1258' of the slots 1256, 1256' are in the same plane and the inner walls 1260, 1260' of the slots 1256, 1256' are in the same plane.

The spring biased plunger assembly 1204 includes a plunger 1236 and a spring 1238.

In an embodiment, the plunger 1236 includes an elongated shaft 1240, a shoulder 1242 connected to the shaft 1240, and a head 1244 connected to the shoulder 1242. A centerline 1246 is defined between an outer end 1236a of the plunger 1236 and an inner end 1236b of the plunger 1236. The shaft 1240 has outer and inner opposite ends 1240a, 1240b and an outer dimension which is slightly smaller than the outer portion 1216 of the passageway 1214 in the barrel 1202. In an embodiment, a bore 1248 is provided through the shaft 1240 transverse to the centerline 1246 of the plunger 1236 and proximate to, but spaced from, the outer end 1240a of the shaft 1240. The shoulder 1242 has outer and inner opposite ends 1242a, 1242b and an outer dimension which is greater than the outer dimension of the shaft 1240 and which is slightly smaller than the inner portion 1218 of the passageway 1214 in the barrel 1202. The outer end 1242a of the shoulder 1242 is connected to the inner end 1240b of the shaft 1240. The head 1244 has outer and inner opposite ends 1244a, 1244b and an outer dimension which is less than the outer dimension of the shoulder 1242. The outer end 1244a of the head 1244 is connected to the inner end 1242b of the shoulder 1242. In an embodiment, each of the shaft 1240, the shoulder 1242 and the head 1244 are cylindrical and the outer dimensions defines outer diameters. In an embodiment, the cylindrical head 1244 has a chamfer 1250 at the inner end 1244b of the head 1244.

The plunger 1236 seats within the passageway 1214 such that the shaft 1240 seats within the outer portion 1216 of the passageway 1214 and extends into the inner portion 1218 of the passageway 1214 and the shoulder 1242 and the head 1244 seat within the inner portion 1218 of the passageway 1214. The plunger 1236 is moveable relative to the barrel 1202 as described herein.

In an embodiment, the spring 1238 is a metal coil spring having outer and inner ends 1238a, 1238b. The spring 1238 surrounds the shaft 1240 of the plunger 1236 and seats within the inner portion 1218 of the passageway 1214. The outer end 1238a of the spring 1238 engages against the end wall 1224 of the inner portion 1218 and the inner end 1238b of the spring 1238 engages against the outer end 1242a of the shoulder 1242. In an embodiment, the spring 1238 is formed of a compressible member, such as rubber.

In an embodiment, the handle 1252 is attached to the plunger 1236 for moving the plunger 1236 relative to the barrel 1202. The handle 1252 includes an elongated linear body. In an embodiment, grip material 1254 is provided on ends of the handle 1252. In an embodiment, the handle 1252 is a one-piece member and is attached to the plunger 1236 by extending through the bore 1248 in the shaft 1240. In an embodiment, the handle 1252 is formed of two parts, each of which are attached to the shaft 1240. The handle 1252 extends through the first and second slots 1226, 1226' or through the slots 1256, 1256' as discussed herein.

In a locked position, the locking mechanism 1200 prevents the relative movement between the extension member 700 and the body 34/column 404. In this locked position, the spring 1238 is in an expanded condition and bears against the shoulder 1242 to bias the head 1244 of the plunger 1236 outwardly from the inner end 1202b of the barrel 1202. The inner end 1242b of the shoulder 1242 engages against the area of the extension member 700 surrounding the aperture 702 and the head 1244 extends into the aperture 702, thereby preventing the relative movement between the body 34, the column 404 and the extension member 700. In this locked position, the handle 1252 may be proximate to the inner walls 1230, 1230' of the first and second slots 1226, 1226'.

To move the locking mechanism 1200 to the unlocked position so that the extension member 700 can move relative to the body 34/column 404, the handle 1252 is rotated and slid along slots 1226, 1226' and the plunger 1236 translates outwardly along the passageway 1214. During this translation, the spring 1238 compresses between the shoulder 1242 and the end wall 1224. This causes the head 1244 of the plunger 1236 to withdraw from the aperture 702 in the extension member 700 and into the barrel 1202. Once the head 1244 is withdrawn from the extension member 700, the extension member 700 can be moved to extend the extension member 700 relative to the body 34/column 404 or to retract the extension member 700 into the body 34/column 404, until a new aperture 702 in the extension member 700 is positioned in alignment with the barrel 1202 and the apertures 704, 706 in the body 34/column 404. In order to maintain the unlocked position, the handle 1252 is rotated into the slots 1256, 1256' so that the handle 1252 translates along the slots 1256, 1256'. This may allow a user to more easily manipulate the extension member 700. Once the extension member 700 is moved to the new position, the handle 1252 is rotated to first translate along slots 1256, 1256' until the handle 1252 aligns with slots 1226, 1226' and then the handle 1252 is released. The spring 1238 then expands which causes the handle 1252 and to translate inwardly along the first and second slots 1226, 1226', and causes the plunger 1236 to translate inwardly along the passageway 1214 such that the head 1244 moves into the new aperture 702 in the extension member 700 which is aligned with the barrel 1202. The chamfer 1250 assists in the head 1244 moving into the new aperture 702.

While the boom 26 is shown in some embodiments as being separate from and attached to the cable puller 20, the boom 26 can be integrally formed with the puller frame 24.

While the boom 26 is shown in some embodiments as being separate from and attached to the wheel assembly 400, it is to be understood that the boom 26 may be integrally formed with the wheel assembly 400.

It is to be understood that the wheel assembly 400 is not required for use of the cable puller 20.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. A cable puller configured to pull rope or cable through a conduit comprising:
   a puller frame including a first upright wall, a second opposite upright wall, and side walls extending between the first and second upright walls;
   a first capstan rotatably mounted on and extending outwardly from the first upright wall, the first capstan defining a first axis of rotation which is parallel to a ground surface, the first capstan having a conical outer surface portion around which the rope or cable is configured to be wrapped;
   a second capstan rotatably mounted on and extending outwardly from the first upright wall, the second capstan defining a second axis of rotation which is parallel to the ground surface, the second capstan having a cylindrical outer surface around which the rope or cable is configured to be wrapped, the capstans being separate from each other and spaced apart from each other;
   a motor mounted on the second upright wall and being operatively coupled to the second capstan and configured to rotate the first and second capstans at the same time; and
   a gearbox operatively coupled with the motor, the gearbox being configured to operate at multiple speeds to rotate the first capstan at a first speed and to rotate the second capstan at a second speed which is different from the first speed.

2. The cable puller of claim 1,
   further comprising a shaft non-rotatably mounted on the first upright wall to which the first capstan is rotatably mounted; and
   a chain coupling the first and second capstans such that the first capstan rotates when the second capstan is driven by the motor to effect rotation of the second capstan.

3. The cable puller of claim 1, further comprising:
   a shaft non-rotatably mounted on the first upright wall to which the first capstan is rotatably mounted;
   a first toothed sprocket rotatably operatively coupled with the shaft mounted on the first upright wall, the first capstan being affixed to the first toothed sprocket; and
   further comprising a second toothed sprocket operatively coupled with the motor; and
   a chain coupling the first toothed sprocket with the second toothed sprocket.

4. The cable puller of claim 3, wherein the first capstan further has a cylindrical outer surface portion around which the rope or cable is configured to be wrapped, the cylindrical outer surface portion extending from the conical outer surface portion and proximate to the first toothed sprocket.

5. The cable puller of claim 3, wherein each toothed sprocket has a diameter and the diameter of the first toothed sprocket is greater than the diameter of the second toothed sprocket.

6. The cable puller of claim 1, further comprising processing circuitry configured to control the motor.

7. The cable puller of claim 1, wherein the first capstan further has a cylindrical outer surface portion around which the rope or cable is configured to be wrapped and extending from the conical outer surface portion.

8. The cable puller of claim 7, wherein the conical outer surface portion of the first capstan defines a diameter, and the cylindrical outer surface of the second capstan defines a diameter, the diameter of the second capstan being the same as the diameter of the first capstan.

9. The cable puller of claim 7, wherein the conical outer surface portion of the first capstan defines a diameter, and the cylindrical outer surface of the second capstan defines a diameter, the diameter of the second capstan being different than the diameter of the first capstan.

10. The cable puller of claim 1, further comprising an idler roller connected to the puller frame.

11. A combination comprising:
    a cable puller configured to pull rope or cable through a conduit comprising:
      a puller frame including a first upright wall defining a first side of the cable puller, a second opposite upright wall defining a second side of the cable puller, side walls extending between the first and second upright walls, and first and second walls extending outwardly from the second upright wall, wherein the first and second walls and a portion of the second upright wall form a pocket,
      a first capstan rotatably mounted on and extending outwardly from the first upright wall, the first capstan defining a first axis of rotation which is parallel to a ground surface,
      a second capstan rotatably mounted on and extending outwardly from the first upright wall, the second capstan defining a second axis of rotation which is parallel to the ground surface, the capstans being separate from each other and spaced apart from each other, and
      a motor mounted on the second upright wall and being operatively coupled to the second capstan and configured to rotate the first and second capstans at the same time, the motor being spaced from the pocket, and
      a gearbox operatively coupled with the motor, the gearbox being configured to operate at multiple speeds to rotate the first capstan at a first speed and to rotate the second capstan at a second speed which is different from the first speed; and
    a boom mounted in the pocket of the puller frame, the boom extending from the puller frame.

12. The combination of claim 11, wherein the boom is releasably mounted to the puller frame.

13. The combination of claim 11, further comprising a wheeled base attached to the boom.

14. The combination of claim 13, further comprising a conduit engaging assembly mounted at an opposite end of the boom.

15. The combination of claim 13, wherein the wheeled base is releasably attached to the boom.

16. The combination of claim 11, further comprising a conduit engaging assembly mounted at an end of the boom.

17. The combination of claim 11, wherein the first capstan has an outer surface around which the rope or cable is configured to be wrapped and which defines a diameter, and the second capstan has an outer surface around which the rope or cable is configured to be wrapped and which defines a diameter, the diameter of the second capstan being the same as the diameter of the first capstan.

18. The combination of claim 11, wherein the first capstan has a cylindrical outer surface portion around which the rope or cable is configured to be wrapped and a conical outer surface portion around which the rope or cable is configured to be wrapped and extending from the cylindrical outer surface portion, and the second capstan has a cylindrical outer surface around which the rope or cable is configured to be wrapped.

19. The combination of claim 11, wherein one of the capstans partially overlaps the pocket.

20. The cable puller of claim 11, wherein the first capstan has an outer surface around which the rope or cable is configured to be wrapped and which defines a diameter, and the second capstan has an outer surface around which the rope or cable is configured to be wrapped and which defines a diameter, the diameter of the second capstan being different than the diameter of the first capstan.

\* \* \* \* \*

UNITED STATES PATENT AND TRADEMARK OFFICE
CERTIFICATE OF CORRECTION

PATENT NO. : 10,892,607 B2  
APPLICATION NO. : 15/406193  
DATED : January 12, 2021  
INVENTOR(S) : James Donald Schmidt et al.

Page 1 of 1

It is certified that error appears in the above-identified patent and that said Letters Patent is hereby corrected as shown below:

On the Title Page

In Item (72), under "Inventors:", in Column 1, delete "Matt Stephen Hayes" and insert -- Matthew Stephen Hayes --.

Signed and Sealed this  
Sixth Day of July, 2021

Drew Hirshfeld  
*Performing the Functions and Duties of the  
Under Secretary of Commerce for Intellectual Property and  
Director of the United States Patent and Trademark Office*